US008503743B2

(12) United States Patent
Otsuka

(10) Patent No.: US 8,503,743 B2
(45) Date of Patent: Aug. 6, 2013

(54) IMAGE PROCESSING SYSTEM, IMAGE PROCESSING DEVICE AND IMAGE PROCESSING TERMINAL

(75) Inventor: Takeshi Otsuka, Tokyo (JP)

(73) Assignee: Olympus Corporation, Tokyo (JP)

( * ) Notice: Subject to any disclaimer, the term of this patent is extended or adjusted under 35 U.S.C. 154(b) by 774 days.

(21) Appl. No.: 12/691,319

(22) Filed: Jan. 21, 2010

(65) Prior Publication Data
US 2010/0189321 A1 Jul. 29, 2010

(30) Foreign Application Priority Data

Jan. 23, 2009 (JP) ................................ 2009-013636

(51) Int. Cl.
*G06K 9/00* (2006.01)
(52) U.S. Cl.
USPC ......................................... 382/128; 382/133
(58) Field of Classification Search
USPC ................................................ 380/128, 133
See application file for complete search history.

(56) References Cited

U.S. PATENT DOCUMENTS

2010/0054574 A1* 3/2010 Marcelpoil et al. ........... 382/133

FOREIGN PATENT DOCUMENTS

| JP | 7-120324 | 5/1995 |
|---|---|---|
| JP | 2005021627 A | 1/2005 |
| JP | 2007121375 A | 5/2007 |
| JP | 2007141152 A | 6/2007 |
| JP | 2008215820 A | 9/2008 |
| JP | 2009008481 A | 1/2009 |

OTHER PUBLICATIONS

Fujii et al., "Development of support systems for pathology using spectral transmittance—The quantification method of stain conditions", 2002, Medical Imaging 2002: Image Processing, Proceedings of SPIE vol. 4684.
Abe et al., "Color Correction of Pathological Images Based on Dye Amount Quantification", 2005, Optical Review, vol. 12, No. 4, pp. 293-300.
Japanese Official Action dated Mar. 26, 2013 received in related application JP 2009-013636.

* cited by examiner

*Primary Examiner* — Luke Gilligan
(74) *Attorney, Agent, or Firm* — Scully, Scott, Murphy & Presser, P.C.

(57) ABSTRACT

An image processing system includes an image processing device and an image processing terminal which are connected to each other via a network. The image processing device includes a dye-amount estimating unit that estimates a dye amount of a stained sample stained with a predetermined dye based on a stained sample image obtained by capturing a multiband image of the stained sample, for each pixel of the stained sample image; and a dye-amount transmitting unit that transmits the estimated dye amount of the stained sample to the image processing terminal. The image processing terminal includes a dye-amount receiving unit that receives a dye amount of the stained sample transmitted from the image processing device; a pixel-value calculating unit that calculates a pixel value of a display image of the stained sample by using a predetermined dye-amount correction coefficient based on the received dye amount of the stained sample; and an image display unit that displays a display image of the stained sample based on the calculated pixel value of the display image of the stained sample.

14 Claims, 37 Drawing Sheets

COLOR FILTER ARRAY OF CCD

PIXEL ARRAY OF RESPECTIVE RGB BANDS

FIG.22

| ORIGINAL DATA | PRIMARY FLOATING-POINT-DATA PORTION | ERROR |
|---|---|---|
| 0.001234 | 0.001233 | 0.0810% |
| 0.003333 | 0.003332 | 0.0300% |
| 0.005432 | 0.005428 | 0.0736% |
| 0.012340 | 0.012337 | 0.0243% |
| 0.033330 | 0.033325 | 0.0150% |
| 0.054320 | 0.054291 | 0.0534% |
| 0.123400 | 0.123352 | 0.0389% |
| 0.333300 | 0.333252 | 0.0144% |
| 0.543200 | 0.542969 | 0.0425% |

| | |
|---|---|
| AVERAGE ERROR | 0.0415% |
| MAXIMUM ERROR | 0.0810% |

IMAGE PROCESSING SYSTEM, IMAGE PROCESSING DEVICE AND IMAGE PROCESSING TERMINAL

CROSS-REFERENCE TO RELATED APPLICATIONS

This application is based upon and claims the benefit of priority from Japanese Patent Application No. 2009-013636, filed on Jan. 23, 2009, the entire contents of which are incorporated herein by reference.

BACKGROUND OF THE INVENTION

1. Field of the Invention

The present invention relates to an image processing system in which an image processing device and an image processing terminal are connected to each other via a network, and also relates to an image processing device and an image processing terminal used in the image processing system.

2. Description of the Related Art

One of physical quantities expressing a physical property specific to a subject of imaging is a spectral transmittance spectrum. Spectral transmittance is a physical quantity expressing a ratio of transmitted light to incident light at each wavelength, and is specific information of an object, whose value does not change due to an extrinsic influence. It is different from color information that depends on a change of illumination light, such as an RGB value. Therefore, the spectral transmittance is used in various fields as information for reproducing the color of the subject itself. For example, for a body tissue sample, particularly in the field of pathological diagnosis using pathological specimens, spectral transmittance has been used as an example of a spectral characteristic value for analysis of images acquired by imaging samples.

In pathological diagnosis, a process is widely practiced such that a pathological specimen is magnified to be observed using a microscope after slicing a block sample obtained by excision of an organ or a pathological specimen obtained by needle biopsy into pieces having a thickness of about several microns to obtain various findings. Transmission observation using an optical microscope is one of observation methods most widely practiced, because materials for optical microscopes are relatively inexpensive and easy to handle, and this method has been used for many years. In a case of transmission observation, because a sliced sample hardly absorbs or scatters light and is substantially transparent and colorless, it is common to stain the sample with a dye prior to observation.

Various methods have been proposed as the staining method, and there have been more than a hundred methods in total. Particularly for pathological specimens, hematoxylin-eosin stain (hereinafter, "H&E stain") using bluish purple hematoxylin and red eosin has been generally used.

Hematoxylin is a natural substance extracted from plants, and has no stainability itself. However, hematin, which is an oxide of hematoxylin, is a basophilic dye and combines with a substance negatively charged. Because deoxyribonucleic acid (DNA) included in a cell nucleus is negatively charged due to a phosphate group included therein as a structural element, the DNA combines with hematin to be stained bluish purple. As described above, substance having stainability is not hematoxylin but its oxide, namely hematin. However, because it is common to use hematoxylin as the name of dye, this applies to the following explanations. Meanwhile, eosin is an acidophilic dye, and combines with a substance positively charged. Amino acid and protein are charged positively or negatively depending on its pH environment, and have a strong tendency to be charged positively under acidity. For this reason, there are cases that acetic acid is added to eosin. The protein included in a cytoplasm combines with eosin to be stained red or light red.

In a sample subjected to H&E stain (a stained sample), cell nucleuses, bone tissues or the like are stained bluish purple, and cytoplasm, connective tissues, red corpuscles or the like are stained red, to have them become easily visible. Accordingly, an observer can ascertain the size, positional relation or the like of elements structuring a cell nuclei or the like, thereby enabling to determine a state of the sample morphologically.

Observation of samples is performed by multiband imaging the samples to be displayed on a display screen of an external device, in addition to visual inspection by an observer. In a case of displaying images on a display screen, processing for estimating spectral transmittance at each sample point from the obtained multiband image, processing for estimating a dye amount of a dye with which the sample is stained based on the estimated spectral transmittance, processing for correcting the color of the image based on the estimated dye amount or the like are performed. Variation in the property of camera, the stained state or the like are then corrected, and an RGB image for display of the samples is composed. FIG. 38 is an example of a composed display image. When the estimation of a dye amount is appropriately performed, samples stained darker or stained lighter can be corrected to an image in a color equivalent to a sample that is properly stained.

As a method of estimating spectral transmittance at each sample point from a multiband image of samples, for example, an estimation method by principal component analysis (see, for example, "Development of support systems for pathology using spectral transmittance—The quantification method of stain conditions", Proceedings of SPIE, Vol. 4684, 2003, p. 1516 to 1523), and an estimation method by the Wiener estimation (for example, see "Color Correction of Pathological Images Based on Dye Amount Quantification", OPTICAL REVIEW, Vol. 12, No. 4, 2005, p. 293-300) can be mentioned. The Wiener estimation is widely known as a technique of linear filtering methods for estimating an original signal from an observed signal on which noise is superimposed, which is a method for minimizing an error, by taking into consideration statistical properties of an observed object and properties of imaging noise (observation noise). Because some noise is included in signals from a camera, the Wiener estimation is very useful as a method for estimating an original signal.

A method of combining display images from multiband images of a sample is explained below. First, a multiband image of a sample is captured. For example, a technique disclosed in Japanese Laid-open Patent Publication No. 07-120324 is used to capture a multiband image according to a frame sequential method, while switching 16 pieces of bandpass filters by rotating a filter wheel. In this way, multiband images having a pixel value of 16 bands at each point of the sample can be obtained. Although the dye is three-dimensionally distributed in the sample as the original observed object, it cannot be captured as a three-dimensional image as it is with an ordinary transmission observation system, and is observed as a two-dimensional image in which illumination light that has passed the sample is projected on an imaging element of the camera. Accordingly, each point mentioned herein signifies a point on the sample corresponding to each projected pixel of the imaging element.

For an arbitrary point (pixel) x of a captured multiband image, a relation expressed by the following Equation (1) based on a response system of the camera is established between a pixel value g(x,b) in a band b and spectral transmittance t(x,λ) of a corresponding point on the sample.

$$g(x,b) = \int_\lambda f(b,\lambda) s(\lambda) e(\lambda) t(x,\lambda) d\lambda + n(b) \quad (1)$$

In Equation (1), λ denotes a wavelength, f(b,λ) denotes a spectral-transmittance of a bth filter, s(λ) denotes a spectral sensitivity characteristic of the camera, e(λ) denotes a spectral emission characteristic of illumination, and n(b) denotes imaging noise in the band b. B denotes a serial number for identifying the band, and is an integer satisfying $1 \leq b \leq 16$.

In practical calculation, the following Equation (2) obtained by the discretizing Equation (1) in a wavelength direction is used.

$$G(x) = FSET(x) + N \quad (2)$$

When the number of samples in the wavelength direction is designated as D, and the number of bands is designated as B (here, B=16), G(x) denotes a matrix of B rows by one column corresponding to a pixel value g(x,b) at a point x. Similarly, T(x) denotes a matrix of D rows by one column corresponding to t(x,λ), and F denotes a matrix of B rows by D columns corresponding to f(b,λ). On the other hand, S denotes a diagonal matrix of D rows by D columns, and a diagonal element corresponds to s(λ). Similarly, E denotes a diagonal matrix of D rows by D columns, and a diagonal element corresponds to e(λ). N denotes a matrix of B rows by one column corresponding to n(b). In Equation (2), because expressions of a plurality of bands are put together using a matrix, a variable b expressing the band is not explicitly described. Further, an integral of a wavelength λ is replaced by a product of matrices.

To simplify description, a matrix H defined by the following Equation (3) is introduced. H is also called as a system matrix.

$$H = FSE \quad (3)$$

Thus, Equation (3) is replaced by the following Equation (4)

$$G(x) = HT(x) + N \quad (4)$$

The spectral transmittance at each sample point is then estimated from the captured multiband image by using the Wiener estimation. An estimate value (spectral transmittance data) $\hat{T}(x)$ of the spectral transmittance can be calculated by the following Equation (5).

$$\hat{T}(x) = WG(x) \quad (5)$$

W is expressed by the following Equation (6), and is referred to as "Wiener estimation matrix" or "estimation operator used in the Wiener estimation".

$$W = R_{SS} H^t (H R_{SS} H^t + R_{NN})^{-1} \quad (6)$$

where $()^t$: transposed matrix, $()^{-1}$: inverse matrix.

In Equation (5), $R_{SS}$ is a matrix of D rows by D columns and represents an autocorrelation matrix of the spectral transmittance of the sample. $R_{NN}$ is a matrix of B rows by B columns and represents an autocorrelation matrix of noise of the camera used for imaging.

After thus estimating spectral transmittance data $\hat{T}(x)$, amounts of dyes at a corresponding point on the sample (a sample point) are estimated based on the $\hat{T}(x)$. Dyes to be estimated are three kinds of dyes, which are hematoxylin, eosin that stains a cell cytoplasm, and eosin that stains red blood cells or an original dye of the red blood cells that are not stained. These three kinds of dyes are abbreviated as a dye H, a dye E, and a dye R, respectively. To be strict, the red blood cells have a specific color itself even in an unstained state, and after the H&E stain is performed, the color of the red blood cells and the color of eosin that has changed in a staining process are superposed on each other at the time of observation. Therefore, in precise, color obtained by combining the both is referred to as the dye R.

Generally, in a substance that transmits light, it is known that the Lambert-Beer law represented by the following Equation (7) is established between an intensity $I_0(\lambda)$ of incident light and an intensity $I(\lambda)$ of emitted light at each wavelength λ.

$$\frac{I(\lambda)}{I_0(\lambda)} = e^{-k(\lambda) \cdot d} \quad (7)$$

In Equation (7), k(λ) denotes a value specific to a substance determined depending on the wavelength, and d denotes a thickness of the substance.

The left side of Equation (7) indicates a spectral transmittance t(λ), and Equation (7) is replaced by the following Equation (8).

$$t(\lambda) = e^{-k(\lambda) \cdot d} \quad (8)$$

Further, a spectral absorbance a(λ) is represented by the following Equation (9).

$$a(\lambda) = k(\lambda) \cdot d \quad (9)$$

Thus, Equation (8) is replaced by the following Equation (10).

$$t(\lambda) = e^{-a(\lambda)} \quad (10)$$

When an H&E stained sample is stained with three kinds of dyes of the dye H, the dye E, and the dye R, the following Equation (11) is established at each wavelength λ by the Lambert-Beer law.

$$\frac{I(\lambda)}{I_0(\lambda)} = e^{-(k_H(\lambda) \cdot d_H + k_E(\lambda) \cdot d_E + k_R(\lambda) \cdot d_R)} \quad (11)$$

where $k_H(\lambda)$, $k_E(\lambda)$, and $k_R(\lambda)$ denote k(λ) corresponding to the dye H, the dye E, and the dye R, respectively, and for example, are dye spectra of respective dyes that stain the sample (hereinafter, "reference dye spectra"). Further, $d_H$, $d_E$, and $d_R$ indicate a virtual thickness of the dye H, the dye E, and the dye R at each sample point corresponding to each image position of the multiband image. Basically, dyes are dispersed in a sample, and thus the thickness is not a correct idea. However, this can be an index of a relative dye amount that indicates how much amount of dye is present, as compared to a case that the sample is assumed to be stained with a single dye. That is, it can be said that $d_H$, $d_E$, and $d_R$ indicate a dye amount of the dye H, the dye E, and the dye R, respectively. The values $k_H(\lambda)$, $k_E(\lambda)$, and $k_R(\lambda)$ can be easily acquired from the Lambert-Beer law, by preparing samples that are stained individually by using the dye H, the dye E, and the dye R, and measuring a spectral transmittance thereof with a spectrometer.

When it is assumed that a spectral transmittance at a position x is t(x,λ) and a spectral absorbance at the position x is a(x,λ), Equation (9) can be replaced by the following Equation (12).

$$a(x,\lambda) = k_H(\lambda) \cdot d_H + k_E(\lambda) \cdot d_E + k_R(\lambda) \cdot d_R \quad (12)$$

When it is assumed that an estimated spectral transmittance at the wavelength $\lambda$ of the spectral transmittance $\hat{T}(x)$ estimated by using Equation (5) is $\hat{t}(x,\lambda)$, and an estimated absorbance is $\hat{a}(x,\lambda)$, Equation (12) can be replaced by the following Equation (13).

$$\hat{a}(x,\lambda) = k_H + k_E(\lambda) \cdot d_E + k_R(\lambda) \cdot d_R \quad (13)$$

In Equation (13), unknown variables are three variables of $d_H$, $d_E$, and $d_R$. Therefore, when simultaneous Equations are acquired from Equation (13) for at least three different wavelengths $\lambda$, these can be solved. To further improve the accuracy, simultaneous Equations can be acquired from Equation (13) for four or more different wavelengths $\lambda$, to perform multiple regression analysis. For example, simultaneous Equations acquired from Equation (13) for three wavelengths $\lambda_1$, $\lambda_2$, and $\lambda_3$ can be expressed in a matrix as the following Equation (14).

$$\begin{pmatrix} \hat{a}(x,\lambda_1) \\ \hat{a}(x,\lambda_2) \\ \hat{a}(x,\lambda_3) \end{pmatrix} = \begin{pmatrix} k_H(\lambda_1) & k_E(\lambda_1) & k_R(\lambda_1) \\ k_H(\lambda_2) & k_E(\lambda_2) & k_R(\lambda_2) \\ k_H(\lambda_3) & k_E(\lambda_3) & k_R(\lambda_3) \end{pmatrix} \begin{pmatrix} d_H \\ d_E \\ d_R \end{pmatrix} \quad (14)$$

Equation (14) is replaced here by the following Equation (15).

$$\hat{A}(x) = Kd(x) \quad (15)$$

When the number of samples in a wavelength direction is D, $\hat{A}(x)$ is a matrix of D rows and one column corresponding to $\hat{a}(x,\lambda)$, K is a matrix of D rows and three columns corresponding to $k(\lambda)$, and $d(x)$ is a matrix of three rows and one column corresponding to $d_H$, $d_E$, and $d_R$ at point x.

According to Equation (15), the dye amounts $d_H$, $d_E$, and $d_R$ are calculated using a least square method. The least square method is a method of determining $d(x)$ such that a square sum of an error is minimized in a single regression Equation, and the dye amounts can be calculated by the following Equation (16).

$$\hat{d}(x) = (K^T K)^{-1} K^T \hat{A}(x) \quad (16)$$

In Equation (16), $\hat{d}(x)$ is an estimated dye amount.

When dye amounts $\hat{d}_H$, $\hat{d}_E$, $\hat{d}_R$ are estimated for the dye H, the dye E, and the dye R and substituted in Equation (12), a restored spectral absorbance $\tilde{a}(x,y)$ can be obtained according to the following Equation (17).

$$\tilde{a}(x,\lambda) = k_H(\lambda) \cdot \hat{d}_H + k_E(\lambda) \cdot \hat{d}_E + k_R(\lambda) \cdot \hat{d}_R \quad (17)$$

An estimated error $e(\lambda)$ in estimation of dye amount is obtained based on the estimated spectral absorbance $\hat{a}(x,\lambda)$ and the restored spectral absorbance $\tilde{a}(x,y)$ according to the following Equation (18). Hereinafter, $e(\lambda)$ is referred to as "residual spectrum".

$$e(\lambda) = \hat{a}(x,\lambda) - \tilde{a}(x,\lambda) \quad (18)$$

The estimated spectral absorbance $\hat{a}(x, \lambda)$ can be represented by the following Equation (19) based on Equations (17) and (18).

$$\hat{a}(x,\lambda) = k_H(\lambda) \cdot \hat{d}_H + k_E(\lambda) \cdot \hat{d}_E + k_R(\lambda) \cdot \hat{d}_R + e(\lambda) \quad (19)$$

The Lambert-Beer law formulates attenuation of light transmitting through a semi-transparent substance while assuming that there is no refraction or scattering. However, in an actual sample, refraction and scattering can occur. Therefore, when attenuation of light due to the sample is modeled only by the Lambert-Beer law, an error resulting from refraction or scattering occurs. However, it is quite difficult to construct a model including refraction or scattering. Therefore, unnatural color variation by a physical model can be prevented by taking into consideration the residual spectrum $e(\lambda)$, which is a modeling error including influences of refraction and scattering.

When the dye amounts $\hat{d}_H$, $\hat{d}_E$, $\hat{d}_R$ are determined in this manner, a change in the dye amounts in the sample can be simulated by correcting the dye amounts. The dye amounts $\hat{d}_H$ and $\hat{d}_E$ stained by a staining method are corrected here. The dye amount $\hat{d}_R$, which is an original color of the red blood cell, is not corrected. That is, corrected dye amounts $\hat{d}_H^*$, $\hat{d}_E^*$ can be obtained by using appropriate dye-amount correction coefficients $\alpha_H$ and $\alpha_E$, according to the following Equations (20) and (21).

$$\hat{d}_H^* = \alpha_H \hat{d}_H \quad (20)$$

$$\hat{d}_E^* = \alpha_E \hat{d}_E \quad (21)$$

When the obtained corrected dye amounts $\hat{d}_H^*$, $\hat{d}_E^*$ are substituted in Equation (12), a spectral absorbance $\tilde{a}^*(x,y)$ can be obtained according to the following Equation (22).

$$\tilde{a}^*(x,\lambda) = k_H(\lambda) \cdot \hat{d}_H^* + k_E(\lambda) \cdot \hat{d}_E^* + k_R(\lambda) \cdot \hat{d}_R \quad (22)$$

Further, when the residual spectrum $e(\lambda)$ is included, a new spectral absorbance $\hat{a}^*(x, \lambda)$ can be obtained according to Equation (23).

$$\hat{a}^*(x,\lambda) = k_H(\lambda) \cdot \hat{d}_H^* k_E(\lambda) \cdot \hat{d}_E^* k_R(\lambda) \cdot \hat{d}_R + e(\lambda) \quad (23)$$

When the spectral absorbance $\tilde{a}^*(x,y)$ or spectral absorbance $\hat{a}^*(x, \lambda)$ is substituted in Equation (10), a new spectral transmittance $t^*(x,\lambda)$ is obtained according to Equation (24). A spectral absorbance $a^*(x,\lambda)$ is a value of the spectral absorbance $\tilde{a}^*(x,y)$ or spectral absorbance $\hat{a}^*(x, \lambda)$.

$$t^*(x,\lambda) = e^{-a^*(x,\lambda)} \quad (24)$$

When Equation (24) is substituted in Equation (1), a new pixel value $g^*(x,b)$ can be obtained by the following Equation (25). In this case, it can be calculated while assuming that observation noise $n(b)$ is zero.

$$g^*(x,b) = \int_\lambda f(b,\lambda) s(\lambda) e(\lambda) t^*(x,\lambda) d\lambda \quad (25)$$

Equation (4) is replaced here by the following Equation (26).

$$G^*(x) = HT^*(x) \quad (26)$$

$G^*(x)$ is a matrix of B rows and one column corresponding to $g^*(x,b)$, and $T^*(x)$ is a matrix of D rows and one column corresponding to $t^*(x,\lambda)$. Accordingly, a pixel value $G^*(x)$ of the sample in which the dye amount is virtually changed can be synthesized.

As explained above, by estimating the dye amounts at an arbitrary point x in a multiband image by the procedure described above to virtually adjust the dye amounts at each sample point and synthesizing an image of the sample after adjustment, the dye amounts of the sample can be corrected. At this time, the dye amounts at each sample point can be adjusted to an appropriate stained state by automatically performing color normalization. Further, when an appropriate user interface is prepared, a user can adjust the dye amounts manually. A display image synthesized for display is, for example, screen-displayed on a display device, and used for pathological diagnosis by a doctor or the like. Accordingly, even if there is a variation in stain of the sample, an image that is adjusted to an appropriate stained state can be observed.

SUMMARY OF THE INVENTION

An image processing system according to an aspect of the present invention includes an image processing device and an image processing terminal which are connected to each other via a network. The image processing device includes a dye-amount estimating unit that estimates a dye amount of a stained sample stained with a predetermined dye based on a stained sample image obtained by capturing a multiband image of the stained sample, for each pixel of the stained sample image; and a dye-amount transmitting unit that transmits the estimated dye amount of the stained sample to the image processing terminal. The image processing terminal includes a dye-amount receiving unit that receives a dye amount of the stained sample transmitted from the image processing device; a pixel-value calculating unit that calculates a pixel value of a display image of the stained sample by using a predetermined dye-amount correction coefficient based on the received dye amount of the stained sample; and an image display unit that displays a display image of the stained sample based on the calculated pixel value of the display image of the stained sample.

An image processing device according to another aspect of the present invention is used in an image processing system in which the image processing device and an image processing terminal are connected to each other. The image processing device includes a dye-amount estimating unit that estimates a dye amount of a stained sample stained with a predetermined dye based on a stained sample image obtained by capturing a multiband image of the stained sample, for each pixel of the stained sample image; and a dye-amount transmitting unit that transmits the estimated dye amount of the stained sample to the image processing terminal.

An image processing terminal according to still another aspect of the present invention is used in an image processing system in which an image processing device and the image processing terminal are connected to each other. The image processing terminal includes a dye-amount receiving unit that receives a dye amount of the stained sample transmitted from the image processing device; a pixel-value calculating unit that calculates a pixel value of a display image of the stained sample by using a predetermined dye-amount correction coefficient based on the received dye amount of the stained sample; and an image display unit that displays a display image of the stained sample based on the calculated pixel value of the display image of the stained sample.

The above and other features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 22 depicts an error when predetermined data elements are divided into a primary floating-point-data portion and a supplementary floating-point-data portion;

DETAILED DESCRIPTION OF THE PREFERRED EMBODIMENTS

Figure 1:
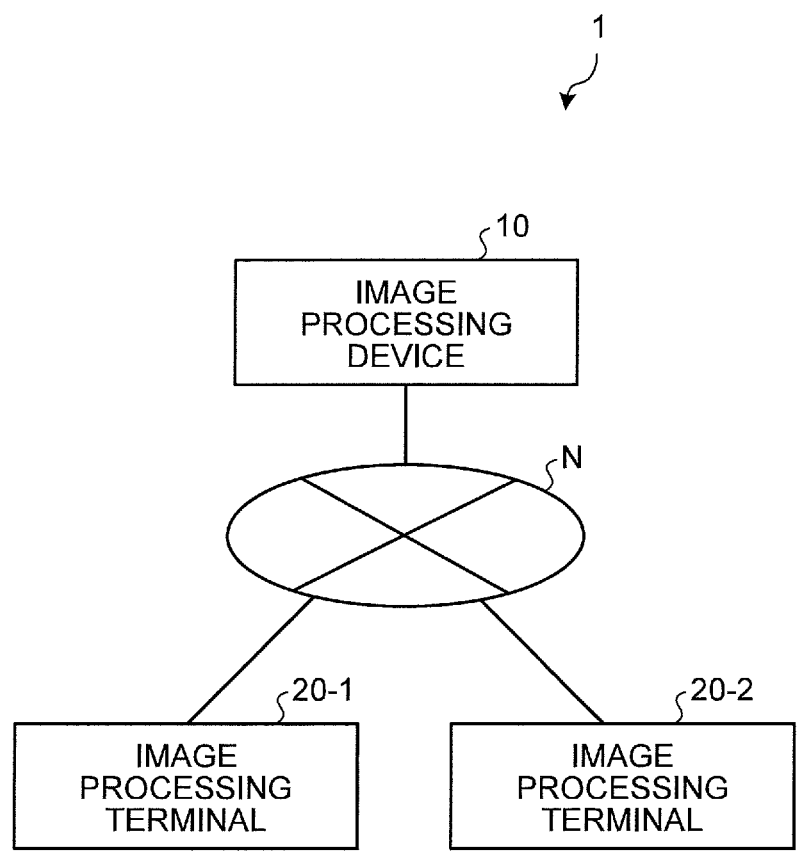
FIG. 1 is a block diagram of an example of an entire configuration of an image processing system.

Exemplary embodiments of the present invention will be explained below in detail with reference to the accompanying drawings. The present invention is not limited to the embodiments. In addition, in the drawings, like parts are designated by like reference letters or numerals.

FIG. 1 is a block diagram of an example of an entire configuration of an image processing system 1 according to a first embodiment. As shown in FIG. 1, in the image processing system 1, an image processing device 10 and image processing terminals 20 (20-1, 20-2, ...) are connected via a network N. The image processing device 10 and the image processing terminals 20 are respectively a computer such as a personal computer. As the network N, various communication networks such as a telephone network, the Internet, a LAN, a dedicated network, and the Intranet can be appropriately adopted and used.

The image processing device 10 estimates dye amounts of a stained sample, and provides data of the estimated dye amounts to the image processing terminal 20 via the network N. The image processing device 10 is installed on a medical facility side having a staining center in which a body tissue sample such as a pathological sample is subjected to H&E stain. The image processing device 10 estimates a spectral transmittance spectrum at each sample point of the stained sample by using Wiener estimation based on a multiband image obtained by imaging a sample after staining (a stained sample), and estimates the dye amounts at each sample by using the Lambert-Beer law. The image processing device 10 transmits the data of the estimated dye amounts to the image processing terminal 20 via the network N.

On the other hand, the image processing terminal 20 is installed, for example, on another medical facility side that requests staining of a sample to the medical facility in which the image processing device 10 is installed. The image processing terminal 20 acquires data of the dye amounts estimated for the sample, whose staining has been requested, by accessing the image processing device 10. The image processing terminal 20 synthesizes an RGB image (a display image) for display of the sample, based on the acquired dye amounts.

Figure 2:
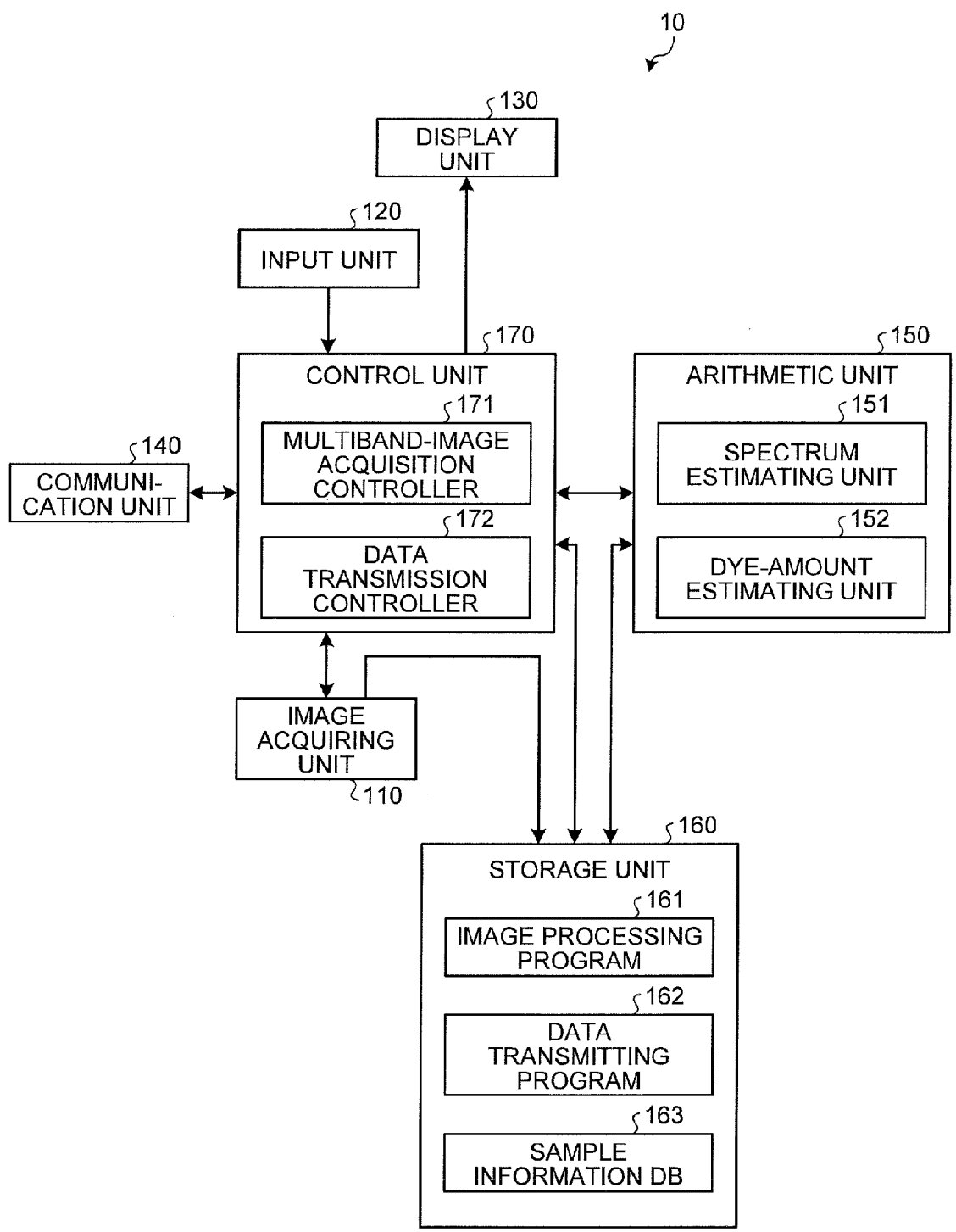
FIG. 2 is a block diagram of an example of a functional configuration of an image processing device according to a first embodiment.

Configurations of the image processing device 10 and the image processing terminal 20 are explained first. FIG. 2 is a block diagram of an example of a functional configuration of the image processing device 10 according to the first embodiment. As shown in FIG. 2, the image processing device 10 includes an image acquiring unit 110, an input unit 120, a display unit 130, a communication unit 140, an arithmetic unit 150, a storage unit 160, and a control unit 170 that controls respective units.

Figure 3:
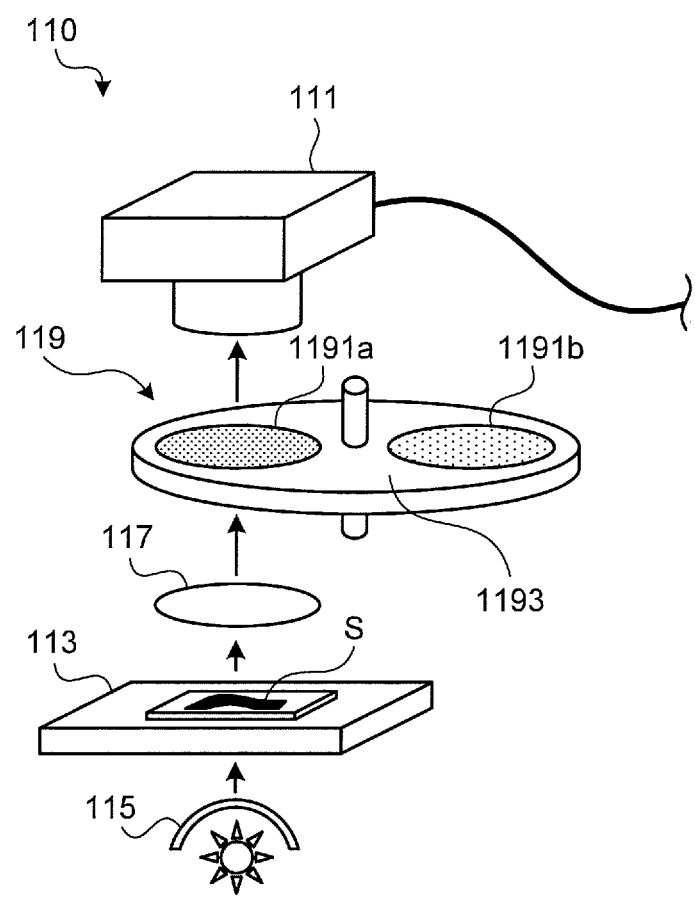
FIG. 3 is a schematic diagram of a configuration of an image acquiring unit.

The image acquiring unit 110 images an H&E-stained sample as a dye-amount estimation target to acquire a 6-band multiband image. FIG. 3 is a schematic diagram of a configuration of the image acquiring unit 110. As shown in FIG. 3, the image acquiring unit 110 images a stained sample by performing an image acquiring operation, to acquire a 6-band multiband image. The image acquiring unit 110 includes an RGB camera 111 including an imaging element such as a CCD, a sample holding unit 113 on which a stained sample S is placed, an illuminating unit 115 that trans-illuminates the stained sample S on the sample holding unit 113, an optical system 117 that collects transmitted light from the stained sample S to form an image, and a filter unit 119 for limiting a wavelength band of imaged light to a predetermined range.

Figure 4:
FIG. 4 is a schematic diagram of an array example of color filters of an RGB camera that constitute the image acquiring unit and pixel arrays of respective RGB bands.

The RGB camera 111 is widely used in a digital camera or the like, and RGB color filters are arranged in a mosaic pattern on a monochrome imaging element. The RGB camera 111 is set up so that the center of an image to be captured is positioned on an optical axis of illumination light. FIG. 4 is a schematic diagram of an array example of the color filters and pixel arrays of the respective RGB bands. In this case, each pixel can image only one component of any one of R, G, and B; however, deficient components of R, G, and B are interpolated by using a near pixel value. This method is disclosed in, for example, Japanese Patent No. 3510037. When a 3CCD camera is used, R, G, and B components in each pixel can be acquired from the very beginning. In the first embodiment, any imaging method can be used; however, it is assumed here that the R, G, and B components have been acquired in the respective pixels of the image captured by the RGB camera 111.

Figure 5:
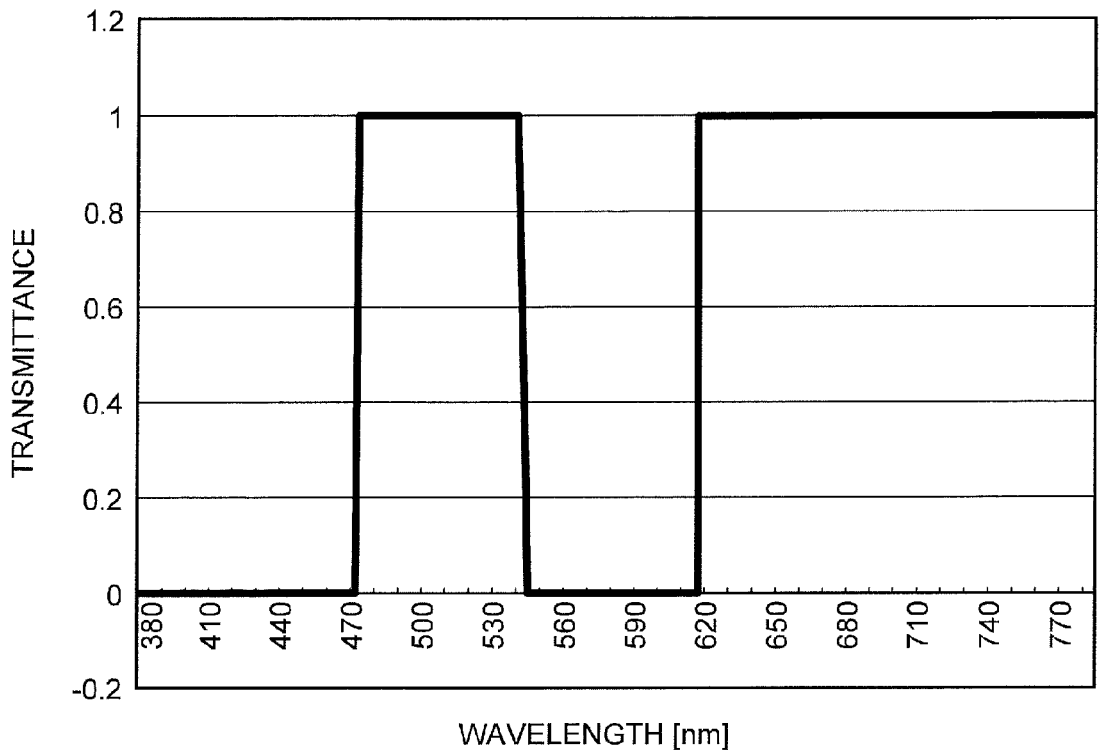
FIG. 5 depicts a spectral transmittance characteristic of one of optical filters that constitute the image acquiring unit.
Figure 6:
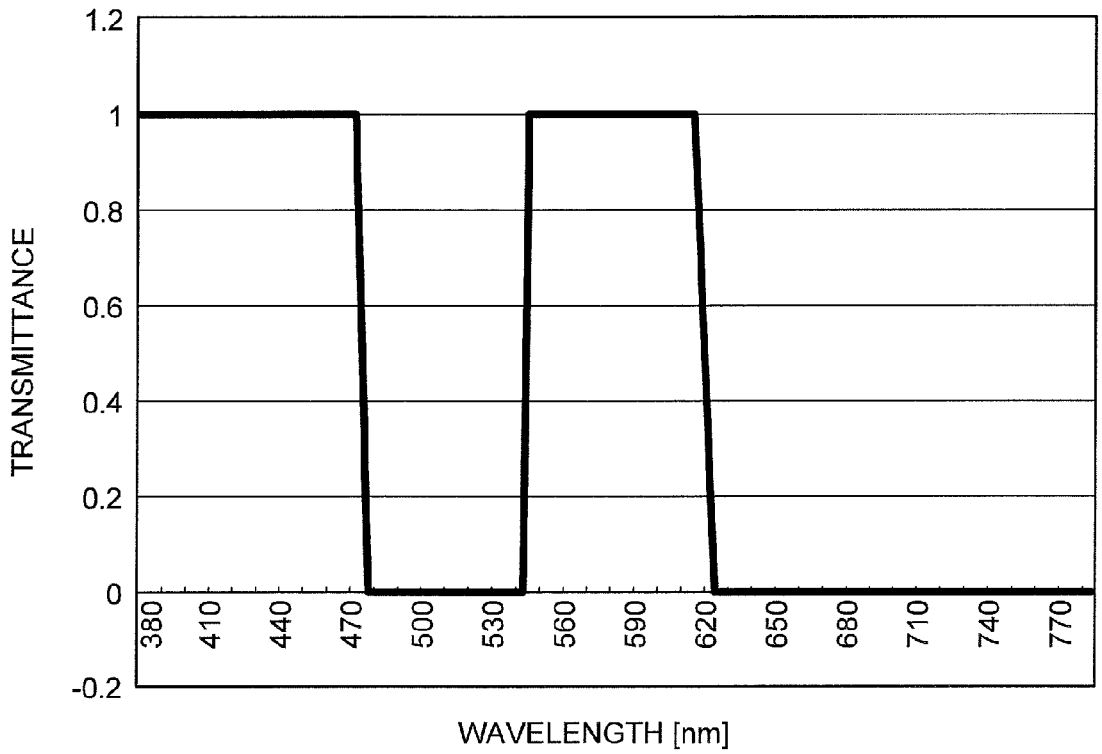
FIG. 6 depicts a spectral transmittance characteristic of the other one of the optical filters that constitute the image acquiring unit.

The filter unit 119 includes two optical filters 1191$a$ and 1191$b$ respectively having a different spectral transmittance characteristic, and these optical filters are held by a rotary optical-filter switching unit 1193. FIG. 5 depicts a spectral transmittance characteristic of one optical filter 1191$a$, and FIG. 6 depicts a spectral transmittance characteristic of the other optical filter 1191$b$. For example, first imaging is performed by using the optical filter 1191$a$. The optical filter to be used is then switched to the optical filter 1191$b$ by rotation of the optical-filter switching unit 1193, to perform second imaging by using the optical filter 1191$b$. A three-band image can be acquired respectively by the first and second imaging, and a 6-band multiband image can be acquired by combining these results. The number of optical filters is not limited to two, and three or more optical filters can be used. The acquired multiband image of the stained sample is held in the storage unit 160 of the image processing device 10 as a stained sample image.

Figure 7:
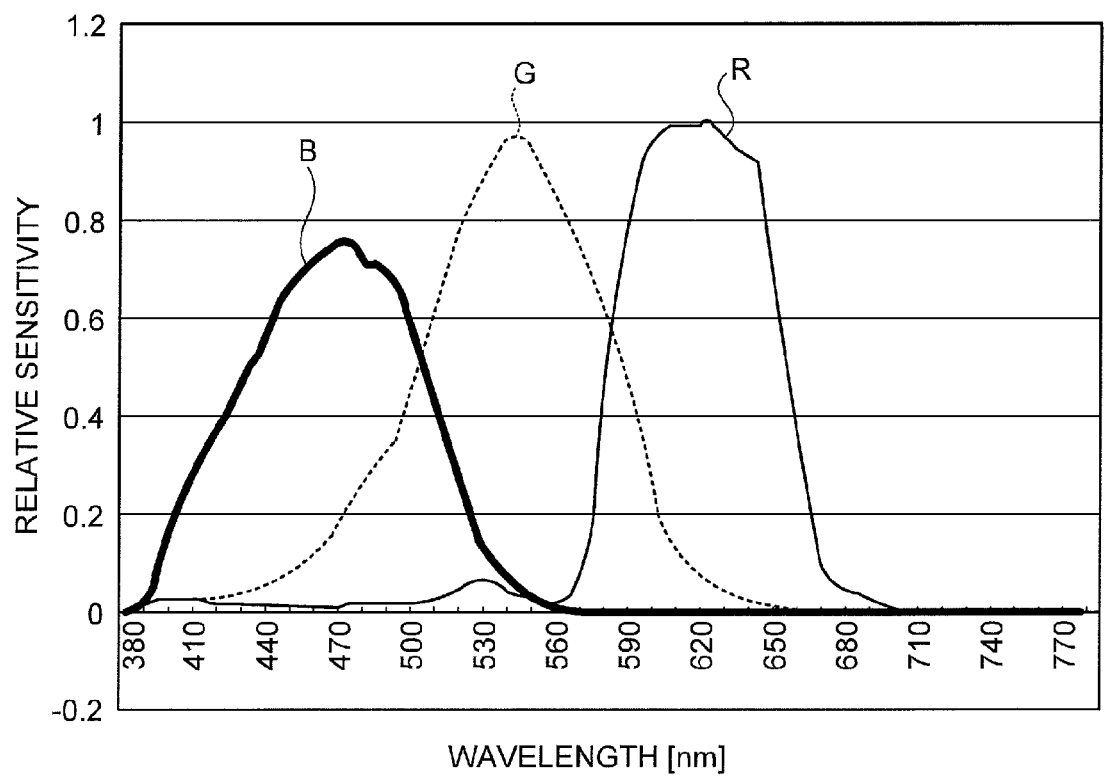
FIG. 7 is an example of spectral sensitivity of respective R, G, and B bands.

In the image acquiring unit 110, illumination light illuminated by the illuminating unit 115 transmits through the stained sample S placed on the sample holding unit 113. Transmitted light transmitted through the stained sample S passes through the optical system 117 and the optical filter 1191$a$ or 1191$b$, and forms an image on the imaging element of the RGB camera 111. The filter unit 119 including the optical filters 1191$a$ and 1191$b$ can be set up at any position on the optical path from the illuminating unit 115 to the RGB camera 111. An example of spectral sensitivity of the respective R, G, and B bands at the time of imaging illumination light from the illuminating unit 115 by the RGB camera 111 via the optical system 117 is shown in FIG. 7.

As shown in FIG. 2, the input unit 120 is realized by various input devices, for example, a keyboard, a mouse, a touch panel, and various switches, and outputs an input signal corresponding to an operation input to the control unit 170. The display unit 130 is realized by a display device such as an LCD, an EL display, or a CRT display, and displays various screens based on a display signal input from the control unit 170. The communication unit 140 performs data communication with outside via the network N. The communication unit 140 is realized by a modem, a TA, a communication cable jack, and a control circuit.

The arithmetic unit 150 is realized by hardware such as a CPU. The arithmetic unit 150 includes a spectrum estimating unit 151 and a dye-amount estimating unit 152. The spectrum estimating unit 151 estimates a spectral transmittance as a spectrum at each sample point on the stained sample corresponding to each pixel constituting the stained sample image. The spectral transmittance estimated by the spectrum estimating unit 151 is referred to as "estimated spectrum". The dye-amount estimating unit 152 estimates corresponding dye amounts at each sample point based on the estimated spectrum estimated respectively for each pixel.

The storage unit 160 is realized by various IC memories such as a ROM and a RAM formed of a flash memory that can update and store data, a hard disk built therein or connected by a data communication terminal, an information storage medium such as a CD-ROM, and a reader thereof. A program for operating the image processing device 10 and realizing various functions held by the image processing device 10, data to be used during execution of the program and the like are stored in the storage unit 160.

An image processing program 161, a data transmitting program 162, and a sample information DB 163 are stored in the storage unit 160. The image processing program 161 realizes a process of estimating a dye amount of a stained sample from a stained sample image and registering the dye amount in the sample information DB 163 (a sample-information registering process). The data transmitting program 162 realizes a process of responding to a request from the image processing terminal 20 (a dye-amount data transmission request) to transmit data of the dye amount estimated for a requested sample to the image processing terminal 20 (a data transmitting process). The sample information DB 163 is a database (DB) that accumulates data of samples requested from a medical facility or the like in which the image processing terminal 20 is installed. Thumbnail images of stained samples, information of medical facilities which have requested staining and the like are appropriately registered in the sample information DB 163, other than image data of a sample image obtained by capturing a multiband image of a stained sample, which is obtained by staining a sample, and data of estimated spectrum and dye amount estimated from the stained sample image, for example, in association with sample identification information for identifying the sample. The sample identification information specifies a sample, and for example, sample name can be used, or a specific ID can be allocated to the sample and used as the sample identification information.

The control unit 170 is realized by hardware such as a CPU. The control unit 170 issues an instruction to the respective units constituting the image processing device 10 or transfers data, based on an input signal input from the input unit 120, image data input from the image acquiring unit 110, a program or data stored in the storage unit 160 or the like, and integrally controls an operation of the entire image processing device 10. Further, the control unit 170 includes a multiband-image acquisition controller 171 and a data transmission controller 172 as a dye-amount transmitting unit. The multiband-image acquisition controller 171 controls the operation of the image acquiring unit 110 to acquire a stained sample image. The data transmission controller 172 responds to a dye-amount data transmission request from the image processing terminal 20 and performs control to transmit the dye amount data of the requested sample registered in the sample information DB 163 to the image processing terminal 20 via the communication unit 140.

Figure 8:
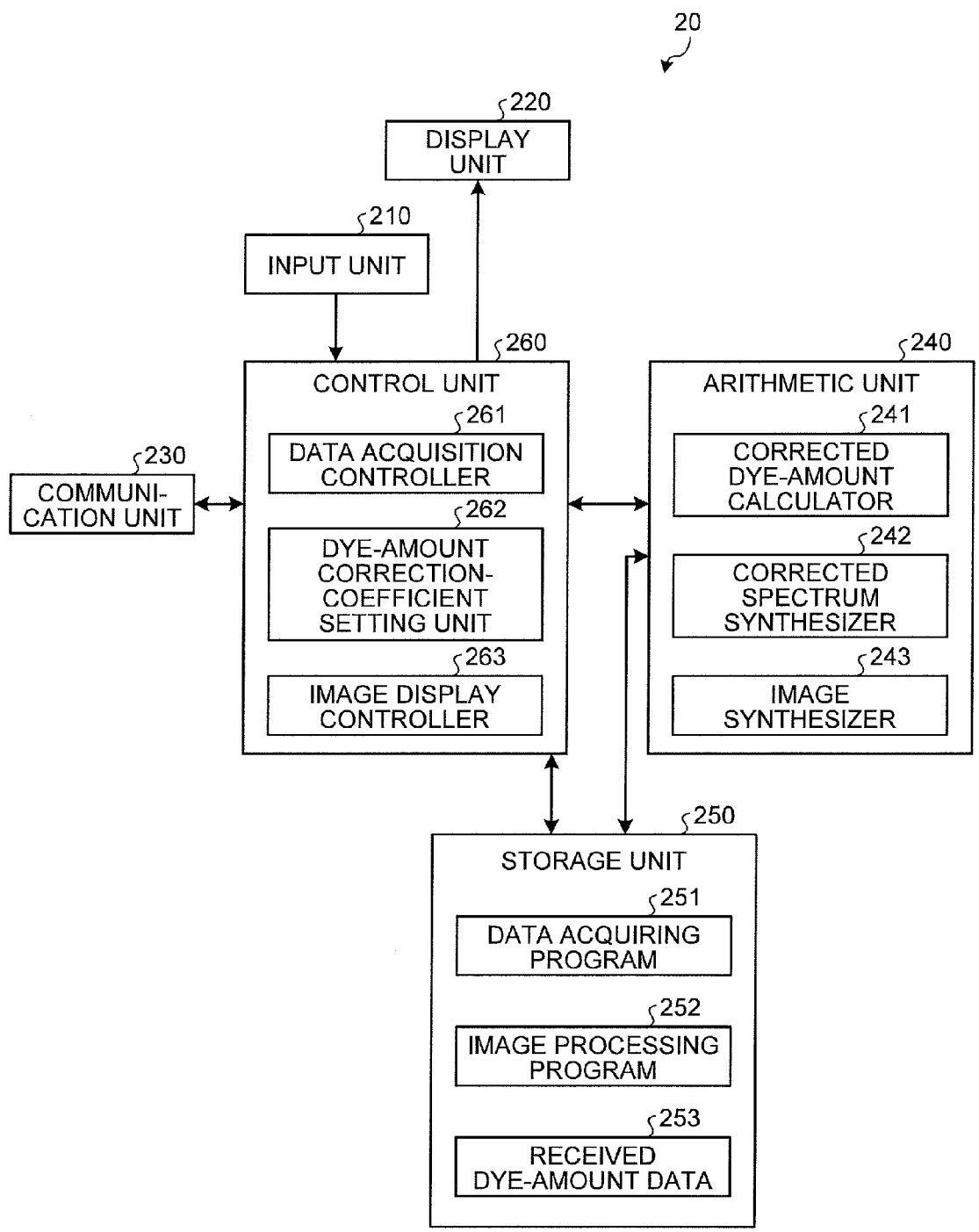
FIG. 8 is a block diagram of an example of a functional configuration of an image processing terminal according to the first embodiment.

FIG. 8 is a block diagram of an example of a functional configuration of the image processing terminal 20 according to the first embodiment. As shown in FIG. 8, the image processing terminal 20 includes an input unit 210, a display unit 220, a communication unit 230, an arithmetic unit 240, a storage unit 250, and a control unit 260 that controls respective units.

In the image processing terminal 20, the arithmetic unit 240 includes a corrected dye-amount calculator 241, a corrected spectrum synthesizer 242, and an image synthesizer 243 as a pixel value calculator. The corrected dye-amount calculator 241 calculates a corrected dye amount based on the dye amount acquired from the image processing device 10 by using a dye-amount correction coefficient. The corrected spectrum synthesizer 242 synthesizes a spectral transmittance based on corrected dye amounts of a dye H and a dye E and a dye amount of a dye R. The spectral transmittance synthesized by the corrected spectrum synthesizer 242 is referred to as "corrected spectrum". The image synthesizer 243 calculates a pixel value by using the corrected spectrum, to synthesize a display image.

A program for operating the image processing terminal 20 and realizing various functions held by the image processing terminal 20, data to be used during execution of the program and the like are stored in the storage unit 250. A data acquiring program 251, an image processing program 252, and received dye-amount data 253 are stored in the storage unit 250. The data acquiring program 251 realizes a process of transmitting a dye-amount data transmission request specifying a sample to the image processing device 10 to acquire dye amount data estimated for the specified sample (a data acquiring process). The image processing program 252 realizes a process of synthesizing a display image based on the dye amount acquired from the image processing device 10 (an image synthesizing process). The dye amount data acquired from the image processing device 10 is set in the received dye-amount data 253 in association with the sample identification information.

The control unit 260 issues an instruction to the respective units constituting the image processing terminal 20 or transfers data based on an input signal input from the input unit 210, image data input from the image acquiring unit 110, a program or data stored in the storage unit 250 or the like, and integrally controls an operation of the entire image processing terminal 20. Further, the control unit 260 includes a data acquisition controller 261 as a dye-amount receiving unit, a dye-amount correction-coefficient setting unit 262 as a correction-coefficient setting unit, and an image display controller 263. The data acquisition controller 261 performs control to transmit a dye-amount data transmission request specifying a sample to the image processing device 10 via the communication unit 230 and acquire the dye amount data. The dye-amount correction-coefficient setting unit 262 receives an input of a dye-amount correction coefficient by a user via the input unit 210 to set an input value as the dye-amount correction coefficient, and outputs the dye-amount correction coefficient to the corrected dye-amount calculator 241 in the arithmetic unit 240. The image display controller 263 performs control to display the display image synthesized by the image synthesizer 243 on the display unit 220 as an image display unit.

Figure 9:
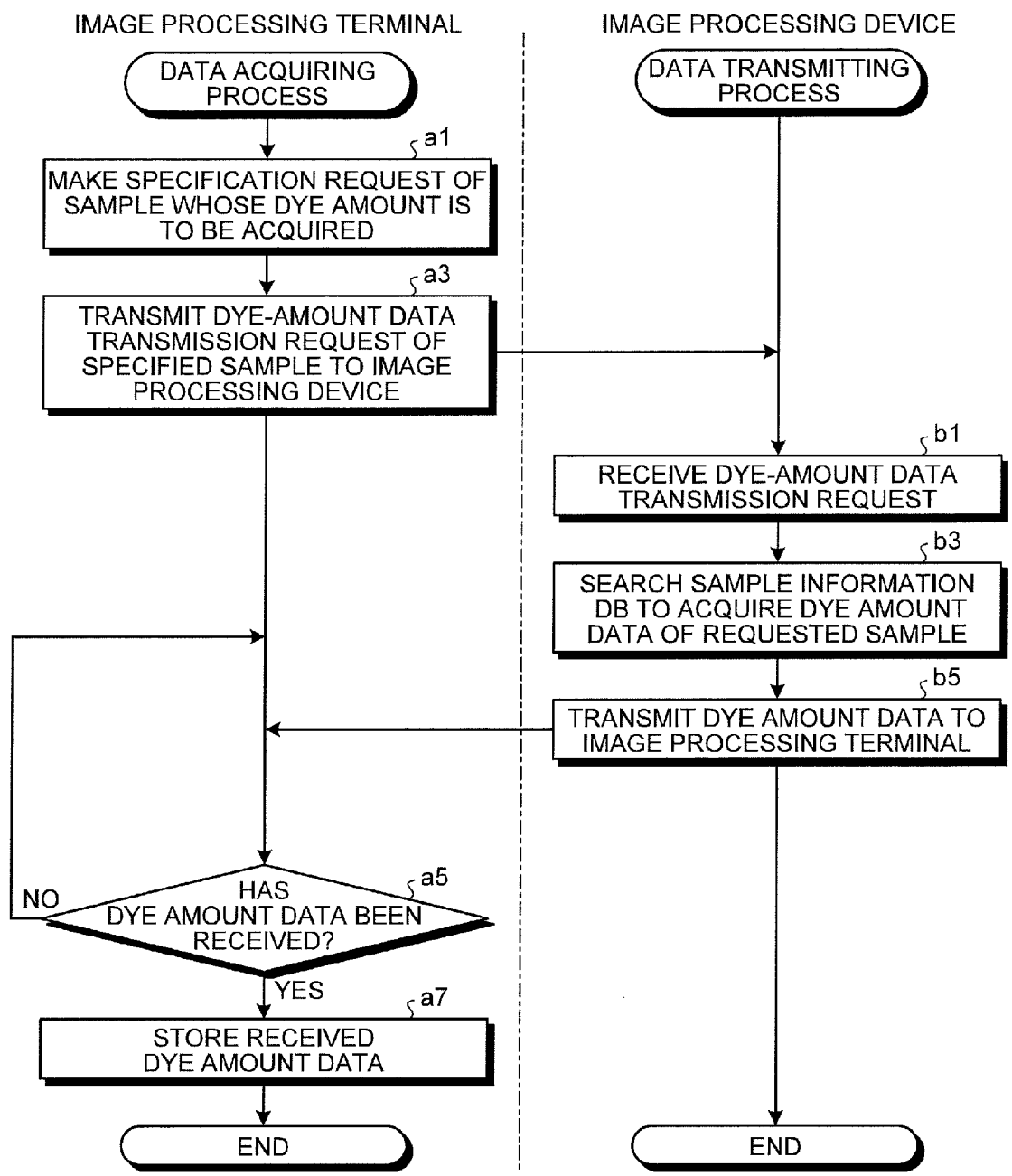
FIG. 9 is a flowchart of a data transmitting process procedure performed by the image processing device and a data acquiring process procedure performed by the image processing terminal according to the first embodiment.

Process procedures performed by the image processing device 10 and the image processing terminal 20 are explained next. Process procedures of the image processing device 10 and the image processing terminal 20 at the time of transmitting and receiving the dye amount data between the image processing device 10 and the image processing terminal 20 are explained first. FIG. 9 is a flowchart of a data transmitting process procedure performed by the image processing device 10 and a data acquiring process procedure performed by the image processing terminal 20 according to the first embodiment. The processes explained here are realized by the respective units of the image processing device 10 that operate according to the data transmitting program 162 stored in the storage unit 160 and by the respective units of the image processing terminal 20 that operate according to the data acquiring program 251 stored in the storage unit 250.

As shown in FIG. 9, in the image processing terminal 20, when the data acquiring process is started, the data acquisition controller 261 performs control to display a specification-request notification screen for a sample whose dye amounts are to be acquired on the display unit 220, thereby making a sample specification request (Step a1). For example, the data acquisition controller 261 performs control to display a notification screen, in which an input box or the like for inputting the sample identification information is arranged, on the display unit 220 together with a message indicating a request to specify a sample, for which data transmission of the dye amount is requested to the image processing device 10. A user inputs the sample identification information via the input unit 210 to specify a desired sample. The sample identification information input by the user is held in the storage unit 250. A specification method of a sample, whose dye amount is to be acquired, is not limited to a method by inputting the sample identification information. For example, a list of samples, for which the user of the image processing terminal 20 has requested staining, can be acquired by communicating with the image processing device 10 and a specification can be received from the acquired list of samples. At this time, a thumbnail image thereof can be acquired together with the list of samples and presented to the user.

The data acquisition controller 261 controls an operation of the communication unit 230 according to a response to a specification request notification, and transmits a dye-amount data transmission request to the image processing device 10 together with the sample identification information of the specified sample (Step a3). This is not limited to a case that the dye amount is acquired for all pixels in the sample, and by specifying a partial range (a visual field), dye amounts can be acquired for pixels in this partial visual field. In this case, for example, information for specifying the visual field such as a size or a central coordinate of the visual field can be transmitted to the image processing device 10 together with the dye-amount data transmission request. The data acquisition controller 261 becomes a standby state until it receives the dye amount data of the specified sample from the image processing device 10.

On the other hand, in the image processing device 10, as the data transmitting process, the data transmission controller 172 controls the operation of the communication unit 140 to receive the dye-amount data transmission request transmitted from the image processing terminal 20 (Step b1). Subsequently, the data transmission controller 172 searches the sample information DB 163 based on the sample identification information transmitted together with the dye-amount data transmission request, to acquire the dye amount data associated with the sample identification information (Step b3). The data transmission controller 172 then controls the operation of the communication unit 140 to transmit the acquired dye amount data to the image processing terminal 20 that has transmitted the dye-amount data transmission request (Step b5).

In the image processing terminal 20, upon reception of the dye amount data transmitted from the image processing device 10 (YES at Step a5), the data acquisition controller 261 stores the received dye amount data in the received dye-amount data 253 in association with the sample identification information (Step a7).

Figure 10:
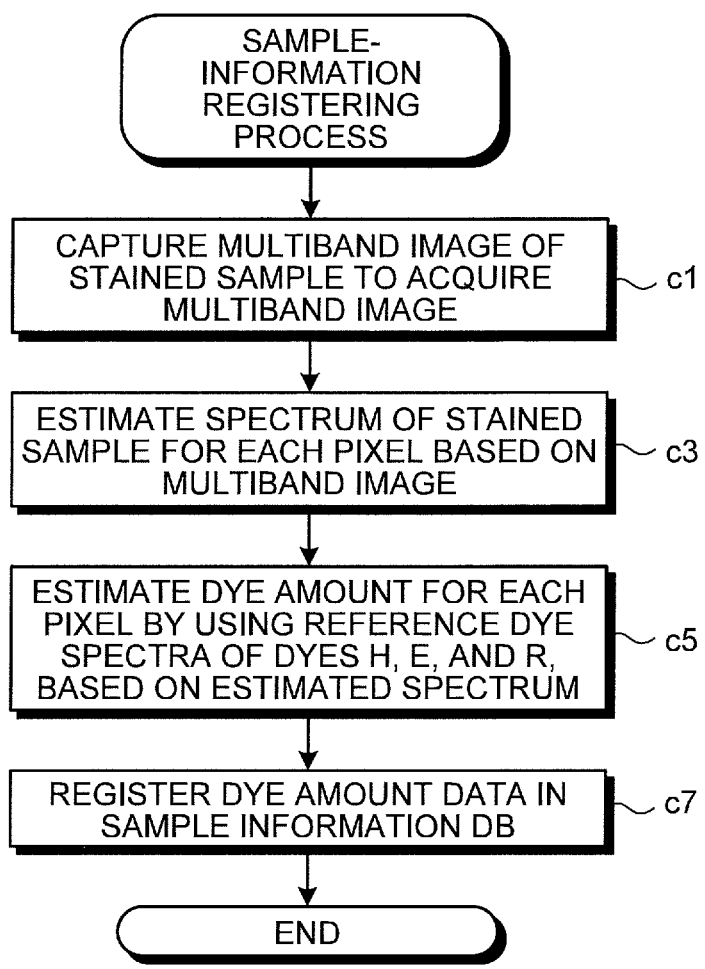
FIG. 10 is a flowchart of a sample-information registering process procedure according to the first embodiment.

A sample-information registering process procedure performed by the image processing device 10 is explained next. FIG. 10 is a flowchart of the sample-information registering process procedure according to the first embodiment. The process explained here is realized by the respective units of the image processing device 10 that operate according to the image processing program 161 stored in the storage unit 160.

As shown in FIG. 10, in the sample-information registering process, the multiband-image acquisition controller 171 controls an operation of the image acquiring unit 110 to capture a multiband image of a stained sample as a dye-amount estimation target, and acquires a stained sample image (Step c1).

Subsequently, the spectrum estimating unit 151 estimates a spectrum (an estimated spectrum) of the stained sample for each pixel based on a pixel value of the acquired stained sample image (Step c3). Specifically, the respective pixels of the stained sample image are sequentially designated as an estimation target pixel. An estimated spectral transmittance $\hat{T}(x)$ at a corresponding sample point on the stained sample is calculated as the estimated spectrum based on matrix representation G(x) of the pixel value at a point x of the stained sample image, which is the estimation target pixel, according to the following Equation (5) shown in the related art. The obtained estimated spectral transmittance $\hat{T}(x)$ is stored in the storage unit 160.

$$\hat{T}(x) = WG(x) \quad (5)$$

Subsequently, the dye-amount estimating unit 152 estimates dye amounts of the stained sample for each pixel by using reference dye spectra of the dye H, the dye E, and the dye R measured beforehand and stored in the storage unit 160, based on the estimated spectrum (estimated spectral transmittance $\hat{T}(x)$) (Step c5). The dyes to be estimated here are hematoxylin (the dye H), eosin (the dye E) that stains a cell cytoplasm, and eosin that stains red blood cells or a dye of the red blood cells that are not stained (the dye R). The dye-amount estimating unit 152 respectively estimates the dye amounts of the dye H, the dye E, and the dye R fixed to respective corresponding sample points based on the estimated spectral transmittance $\hat{T}(x)$ of each pixel estimated designating each point x of the stained sample image as the estimation target pixel. That is, $\hat{d}_H$, $\hat{d}_E$, $\hat{d}_R$ are solved according to the following Equation (16) shown in the related art.

$$\hat{d}(x) = (K^T K)^{-1} K^T \hat{A}(x) \quad (16)$$

The arithmetic unit 150 registers data of the estimated dye amounts $\hat{d}_H$, $\hat{d}_E$, $\hat{d}_R$ in the sample information DB 163 in association with the sample identification information of the stained sample (Step c7). At this time, the arithmetic unit 150 can register not only the dye amount data but also image data of the stained sample image and data of the estimated spectrum in the sample information DB 163, as sample information with respect to the sample identification information.

Management of the data of the sample such as the dye amount is not limited to management by the database, and management by text data or management by file names in which data of the dye amount or the like is recorded can be used.

Figure 11:
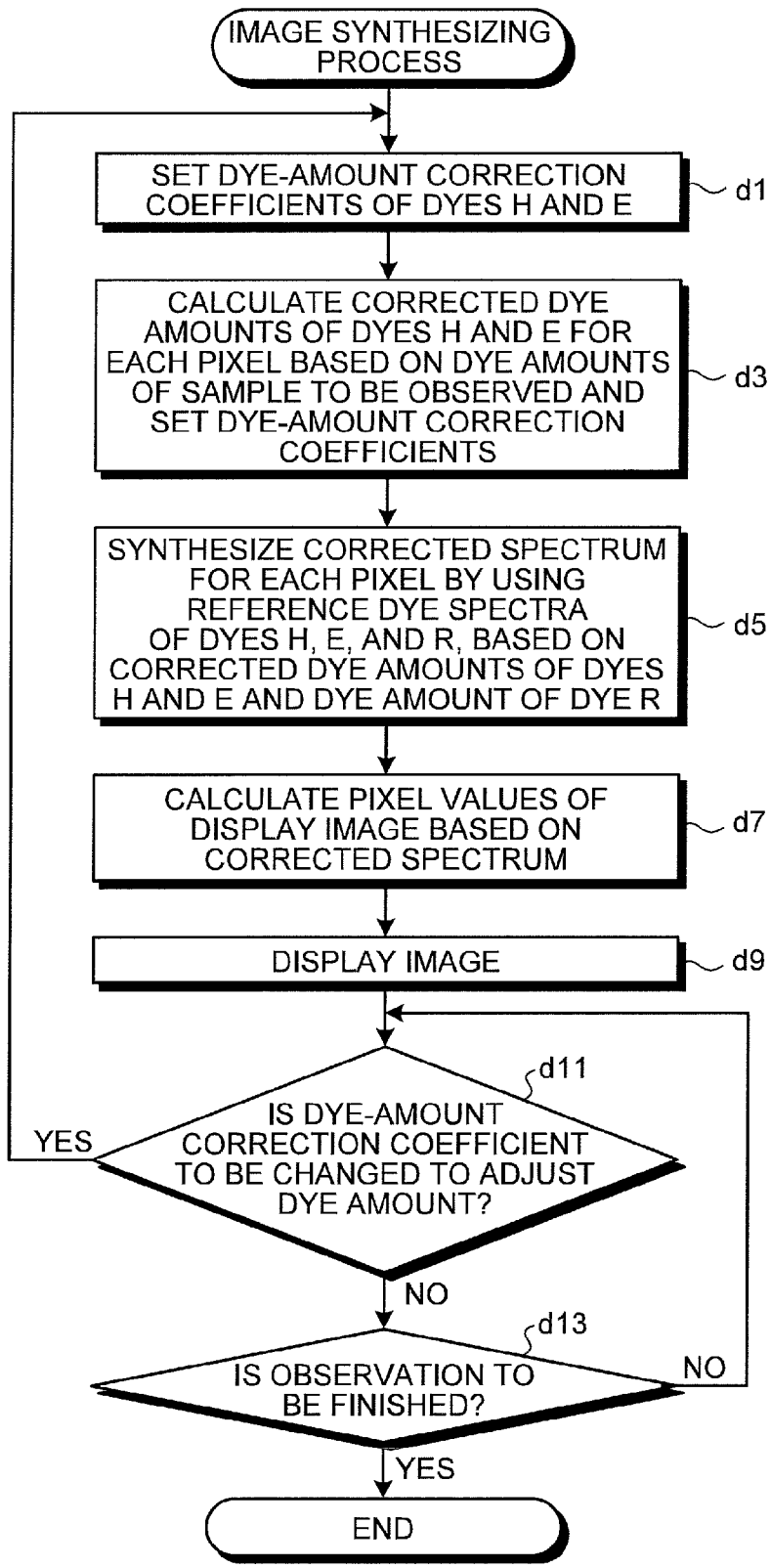
FIG. 11 is a flowchart of an image synthesizing process procedure according to the first embodiment.

An image synthesizing process procedure performed by the image processing terminal 20 is explained next. FIG. 11 is a flowchart of the image synthesizing process procedure according to the first embodiment. The process explained here is realized by the respective units of the image processing terminal 20 that operate according to the image processing program 252 stored in the storage unit 250.

In the image synthesizing process, an input of the sample identification information or the like is requested beforehand, and a specification of a sample to be observed by a user is received. As shown in FIG. 11, the dye-amount correction-coefficient setting unit 262 performs control to display an input request notification of the dye-amount correction coefficients of the dye H and the dye E on the display unit 220, and sets the dye-amount correction coefficients of the dye H and the dye E according to, for example, a user operation to output the dye-amount correction coefficients to the corrected dye-amount calculator 241 (Step d1). For example, the dye-amount correction-coefficient setting unit 262 performs control to display a message indicating a request for an input of the dye-amount correction coefficients and display a notification screen, in which an input box or the like for inputting respective values of a dye-amount correction coefficient $\alpha_H$ of the dye H and a dye-amount correction coefficient $\alpha_E$ of the dye E is arranged, on the display unit 220. A user inputs a desired value of the dye-amount correction coefficient $\alpha_H$ and a desired value of the dye-amount correction coefficient $\alpha_E$ via the input unit 210. A slider for inputting respective values of dye-amount correction coefficients $\alpha_H$ and $\alpha_E$ can be arranged to receive the input operation. The input dye-amount correction coefficients $\alpha_H$ and $\alpha_E$ are held in the storage unit 250.

Subsequently, the corrected dye-amount calculator 241 reads the data of dye amounts $\hat{d}_H$, $\hat{d}_E$, $\hat{d}_R$ of the sample to be observed, which is acquired from the image processing device 10 and stored in the received dye-amount data 253. The corrected dye-amount calculator 241 calculates corrected dye amounts $\hat{d}_H^*$, $\hat{d}_E^*$ of the dye H and the dye E for each pixel according to the following Equations (20) and (21) shown in the related art, based on the dye amounts $\hat{d}_H$, $\hat{d}_E$ and the set dye-amount correction coefficients $\alpha_H$ and $\alpha_E$ (Step d3). The calculation of the corrected dye amounts $\hat{d}_H^*$, $\hat{d}_E^*$ is not limited to a form in which the dye amounts $\hat{d}_H$, $\hat{d}_E$ shown in Equations (20) and (21) are multiplied by the dye-amount correction coefficients $\alpha_H$ and $\alpha_E$, and the corrected dye amounts can be calculated by adding these values. The acquired corrected dye amounts $\hat{d}_H^*$, $\hat{d}_E^*$ are held in the storage unit 250.

$$\hat{d}_H^* = \alpha_H \hat{d}_H \tag{20}$$

$$\hat{d}_E^* = \alpha_E \hat{d}_E \tag{21}$$

Subsequently, the corrected spectrum synthesizer 242 synthesizes the corrected spectrum for each pixel by using the reference dye spectra $k_H(\lambda)$, $k_E(\lambda)$, and $k_R(\lambda)$ of the dye H, the dye E, and the dye R, based on the corrected dye amounts $\hat{d}_H^*$, $\hat{d}_E^*$ of the dye H and the dye E and the dye amount $\hat{d}_E$ of the dye R (Step d5). Specifically, the corrected spectrum synthesizer 242 obtains a spectral absorbance $\tilde{a}^*(x,y)$ at each point x according to the following Equation (22) shown in the related art. The reference dye spectra of the dye H, the dye E, and the dye R are values that do not depend on the sample, and these values are distributed beforehand from the image processing device 10. The image processing terminal 20 stores the distributed reference dye spectra of the respective dyes in the storage unit 250, reads the reference dye spectra from the storage unit 250, and uses the reference dye spectra at the time of synthesizing the corrected spectrum.

$$\tilde{a}^*(x,\lambda) = k_H(\lambda) \cdot \hat{d}_H^* + k_E(\lambda) \cdot \hat{d}_E^* + k_R(\lambda) \cdot \hat{d}_R \tag{22}$$

Subsequently, a new spectral transmittance $t^*(x,\lambda)$ at each point x is obtained based on the obtained spectral absorbance $\tilde{a}^*(x,y)$ according to the following Equation (24) shown in the related art.

$$t^*(x,\lambda) = e^{-\tilde{a}^*(x,\lambda)} \tag{24}$$

The spectral transmittance $t^*(x,\lambda)$ is obtained by repeating this process D-times in a wavelength direction, thereby obtaining a corrected spectral transmittance $T^*(x)$, which is a corrected spectrum. The corrected spectral transmittance $T^*(x)$ is a matrix of D rows and one column corresponding to $t^*(x,\lambda)$. The obtained corrected spectral transmittance $T^*(x)$ is stored in the storage unit 250.

Subsequently, the image synthesizer 243 repeatedly performs a process of converting the corrected spectrum (corrected spectral transmittance $T^*(x)$) synthesized for each pixel to an RGB value over the entire image, and calculates pixel values of the respective pixels in the display image to synthesize a display image (Step d7). Specifically, the image synthesizer 243 obtains a new pixel value $G^*(x)$ at a point x for each pixel according to the following Equation (26) shown in the related art. The display image synthesized by obtaining the pixel value $G^*(x)$ is held in the storage unit 250.

$$G^*(x) = HT^*(x) \tag{26}$$

Subsequently, the image display controller 263 performs control to display the synthesized display image on the display unit 220 (Step d9). The display image is observed by a doctor or the like, and is used for the pathological diagnosis or the like.

According to the procedures described above, the image processing terminal 20 can synthesize and display a display image of a sample, in which dye amounts of respective dyes are virtually changed using the dye-amount correction coefficients set according to a user operation or the like, based on the dye amounts of the sample to be observed acquired from the image processing device 10. When the dye-amount correction coefficients are changed to adjust (correct) the dye amounts of respective dyes and a display image is synthesized and displayed again (YES at Step d11), control returns to Step d1 to repeat the process described above. When observation of the sample based on the display image is to be finished (YES at Step d13), the process is finished.

As explained above, according to the image processing system of the first embodiment, the image processing device 10 can estimate the dye amounts and transmit the dye amount data to the image processing terminal 20 via the network N. On the other hand, the image processing terminal 20 can synthesize and display the display image of the sample based on the dye amounts acquired from the image processing device 10, and for example, the display image can be used for the pathological diagnosis. At this time, the display image can be synthesized and displayed, while the dye amount of each dye is corrected based on the dye-amount correction coefficient set according to a user operation or the like. According to the image processing system 1, because only one communication between the image processing device 10 and the image processing terminal 20 is required for acquiring data used for synthesizing and displaying the display image, synthesis and display of the display image can be efficiently performed without increasing the communication load.

In a configuration of the image processing system such that a display image of a stained sample is synthesized on the image processing device side and the image processing terminal acquires the display image, when the image processing terminal wishes to correct a dye amount of each dye, the display processing terminal needs to access the image processing device 10 again, to request correction of the dye amount, and re-acquire the display image. On the other hand, according to the image processing system 1 of the first embodiment, because the dye-amount correction coefficient can be changed on the image processing terminal 20 side to correct the dye amount, it is not necessary to communicate with the image processing device 10 many times, thereby enabling to reduce the communication load. Further, an observer can efficiently observe the display image, while changing the dye-amount correction coefficient. On the other hand, compared with a case that an image processing system is configured such that the image processing terminal acquires a multiband image of a stained sample (a stained sample image) or data of estimated spectrum estimated based on the multiband image from the image processing device, and spectral data for the number of dimensions in the wavelength direction is transmitted and received, dye amounts for the number of dyes need only to be transmitted and received. Therefore, a data amount to be transmitted and received via the network N can be reduced, to reduce the communication load. Further, because estimation of the dye amounts need not be performed in the image processing terminal 20, the processing load of the image processing terminal 20 is not increased.

The pixel value G*(x) can be obtained beforehand, while assuming all combinations of the corrected dye amounts $\hat{d}_H^*$, $\hat{d}_E^*$ and the dye amount $\hat{d}_R$, of the dye R, and can be stored in the storage unit as a dye amount/pixel value correspondence table. The image synthesizer can synthesize a display image, referring to the dye amount/pixel value correspondence table. In this case, the image processing terminal can be realized in a configuration not including the corrected spectrum synthesizer. Accordingly, the image synthesizing process can be performed at high speed, and thus user's waiting time since a specification of a sample to be observed until a display image is displayed can be reduced.

In the first embodiment, a case that the image processing terminal 20 requests a user to specify a sample and receives dye amount data for the sample specified in response to the request from the image processing device 10 is explained. However, the number of samples that can be specified and acquired at a time is not limited to one, and the dye amounts of respective samples can be collectively acquired by specifying a plurality of samples.

In the first embodiment, it is explained that the reference dye spectra used by the image processing terminal 20 at the time of synthesizing the corrected spectrum are distributed beforehand from the image processing device 10 to the image processing terminal 20. However, the present invention is not limited thereto. That is, data elements of the reference dye spectra $k_H(\lambda)$, $k_E(\lambda)$, and $k_R(\lambda)$ are, respectively, matrix data of one row and D columns, and the data amount is small as compared with the dye amount data. Therefore, these data elements can be acquired together with the dye amount data at the time of acquiring the dye amounts from the image processing device 10. In this case, the data transmission controller 172 in the image processing device 10 functions as a dye-spectrum transmitting unit and the data acquisition controller 261 in the image processing terminal 20 functions as a dye-spectrum receiving unit. Accordingly, the image processing device 10 can estimate dye amounts by using the reference dye spectra corresponding to a stained state of a stained sample and the image processing terminal 20 can synthesize an estimated spectrum by using the reference dye spectra used for estimation of the dye amounts. When the dye amounts of a plurality of samples estimated by using the same reference dye spectra are collectively transmitted, the reference dye spectra need not be transmitted together with data of the respective dye amounts. For example, the reference dye spectra can be transmitted at the time of starting communication, and subsequently, the data of the respective dye amounts can be sequentially transmitted.

Further, setting of the dye-amount correction coefficients of the dye H and the dye E is not limited to a case that the setting is performed according to a user operation, and the dye-amount correction coefficients can be set automatically.

Figure 12:
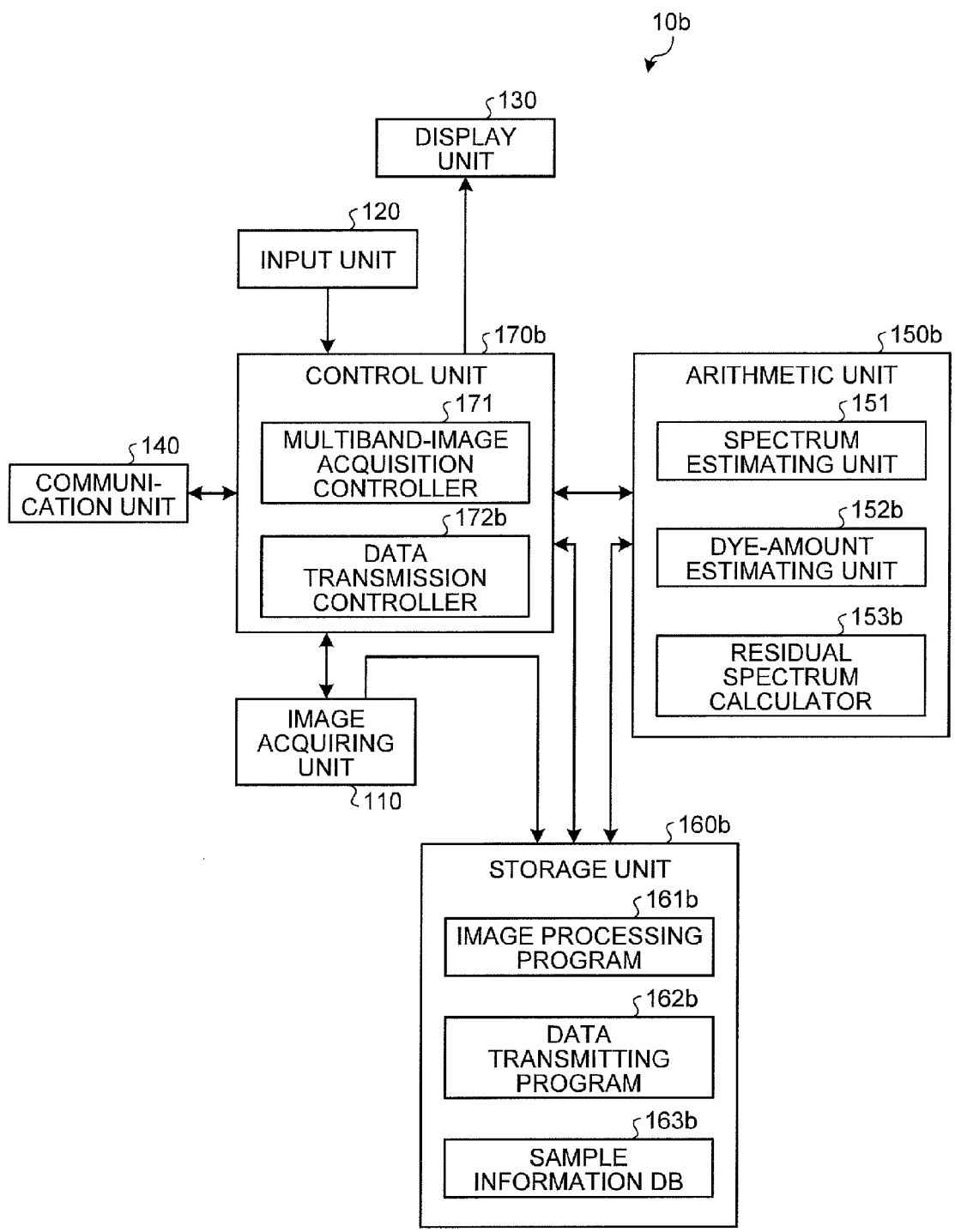
FIG. 12 is a block diagram of a functional configuration of an image processing device according to a second embodiment.

A second embodiment is explained next. FIG. 12 is a block diagram of a functional configuration of an image processing device 10b according to the second embodiment. Like reference letters or numerals refer to like parts explained in the first embodiment. As shown in FIG. 12, the image processing device 10b includes the image acquiring unit 110, the input unit 120, the display unit 130, the communication unit 140, an arithmetic unit 150b, a storage unit 160b, and a control unit 170b that controls respective units.

The arithmetic unit 150b includes the spectrum estimating unit 151, a dye-amount estimating unit 152b, and a residual spectrum calculator 153b. The residual spectrum calculator 153b calculates a residual spectrum, which is an estimation error in estimation of the dye amounts, based on an estimated spectral absorbance obtained from the estimated spectrum estimated by the spectrum estimating unit 151 and a restored spectral absorbance restored from the dye amounts estimated by the dye-amount estimating unit 152b. The residual spectrum is transmitted to an image processing terminal 20b as data used for synthesizing and displaying a display image of a stained sample.

An image processing program 161b, the data transmitting program 162, and a sample information DB 163b are stored in the storage unit 160b. The image processing program 161b realizes a process of estimating dye amounts of a stained sample from a stained sample image, calculating a residual spectrum at the time of estimation, and registering the estimated dye amounts and the calculated residual spectrum in the sample information DB 163b (a sample information registering process). A data transmitting program 162b realizes a process of responding to a request (a synthesis data transmission request) from the image processing terminal 20b to transmit data of the dye amounts estimated and the residual spectrum calculated for the requested sample to the image processing terminal 20b (the data transmitting process). The data of the calculated residual spectrum is registered, in addition to the image data of the stained sample image, the estimated spectrum, and the dye amount data explained in the first embodiment, in the sample information DB 163b in association with the sample identification information.

The control unit 170b includes the multiband-image acquisition controller 171 and a data transmission controller 172b as the dye-amount transmitting unit and a residual-spectrum transmitting unit. The data transmission controller 172b performs control to transmit synthesis data, which is the data of the dye amounts and the residual spectrum of the requested sample registered in the sample information DB 163b, in response to the synthesis data transmission request transmitted from the image processing terminal 20b, to the image processing terminal 20b via the communication unit 140.

Figure 13:
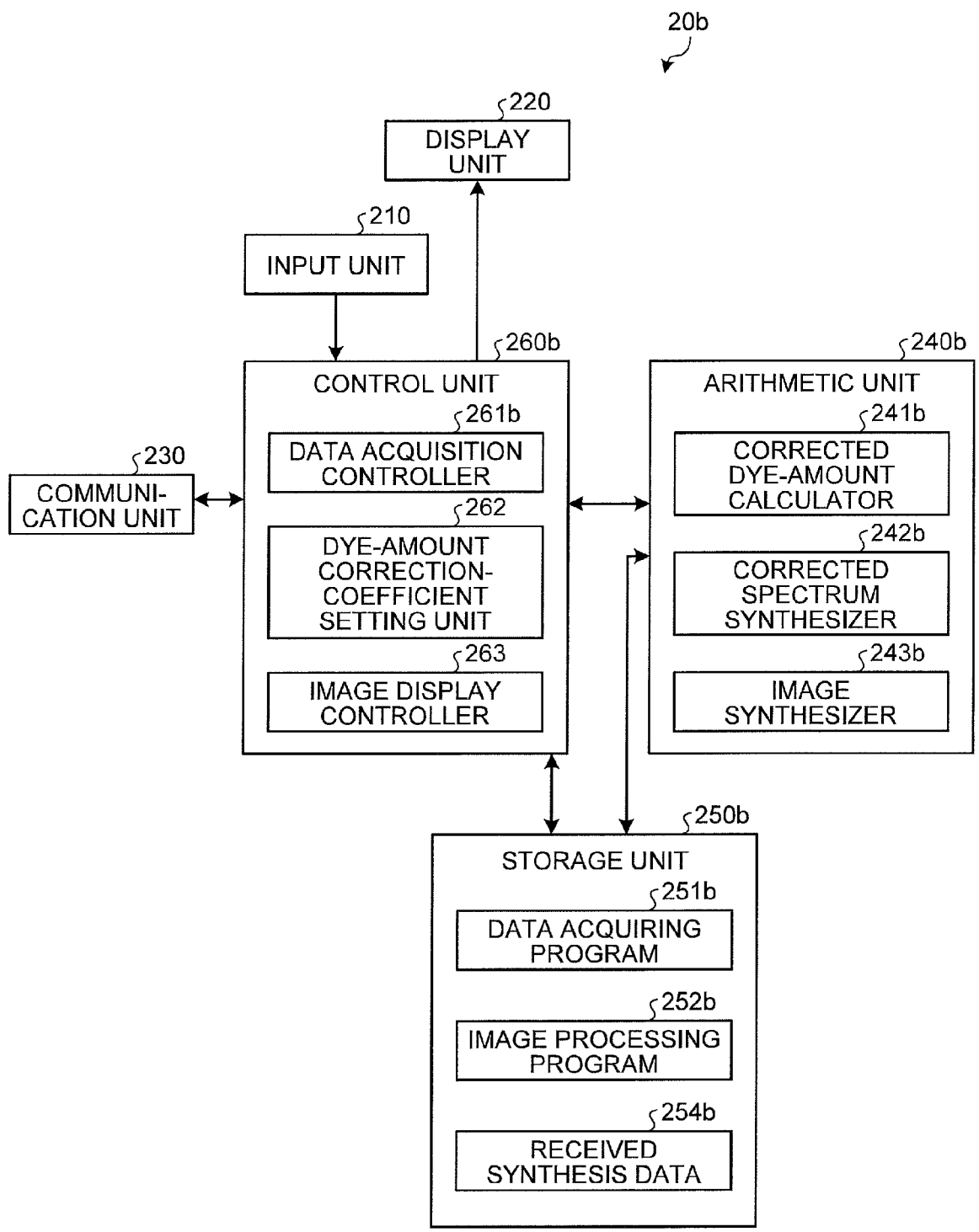
FIG. 13 is a block diagram of an example of a functional configuration of an image processing terminal according to the second embodiment.

FIG. 13 is a block diagram of an example of a functional configuration of the image processing terminal 20b according to the second embodiment. Like reference letters or numerals refer to like parts explained in the first embodiment. As shown in FIG. 13, the image processing terminal 20b includes the input unit 210, the display unit 220, the communication unit 230, an arithmetic unit 240b, a storage unit 250b, and a control unit 260b that controls respective units.

The arithmetic unit 240b includes a corrected dye-amount calculator 241b, a corrected spectrum synthesizer 242b, and an image synthesizer 243b as a pixel-value calculating unit and a first corrected-pixel-value calculating unit. The corrected spectrum synthesizer 242b synthesizes a spectral transmittance based on corrected dye amounts of the dye H and the dye E, a dye amount of the dye R, and a residual spectrum to calculate a corrected spectrum. The image synthesizer 243b calculates a corrected pixel value taking the residual spectrum into consideration (first corrected pixel values) by using the corrected spectrum synthesized by the corrected spectrum synthesizer 242b, to synthesize a display image.

A data acquiring program 251b, an image processing program 252b, and received synthesis data 254b are stored in the storage unit 250b. The data acquiring program 251b realizes a process of transmitting a synthesis data transmission request specifying a sample to the image processing device 10b and acquiring data (synthesis data) of the dye amounts estimated and the residual spectrum calculated for the specified sample (the data acquiring process). The image processing program 252b realizes a process of synthesizing the corrected spectrum, taking the residual spectrum into consideration, to calculate a pixel value and synthesizing a display image (the image synthesizing process). The data of the dye amounts and the residual spectrum acquired as the synthesis data from the image processing device 10b is set in association with the sample identification information thereof.

The control unit 260b includes a data acquisition controller 261b as the dye-amount receiving unit, the dye-amount correction-coefficient setting unit 262 as the correction-coefficient setting unit, and the image display controller 263. The data acquisition controller 261b performs control to transmit a synthesis data transmission request specifying a sample to the image processing device 10b via the communication unit 230 and acquire the synthesis data.

Figure 14:
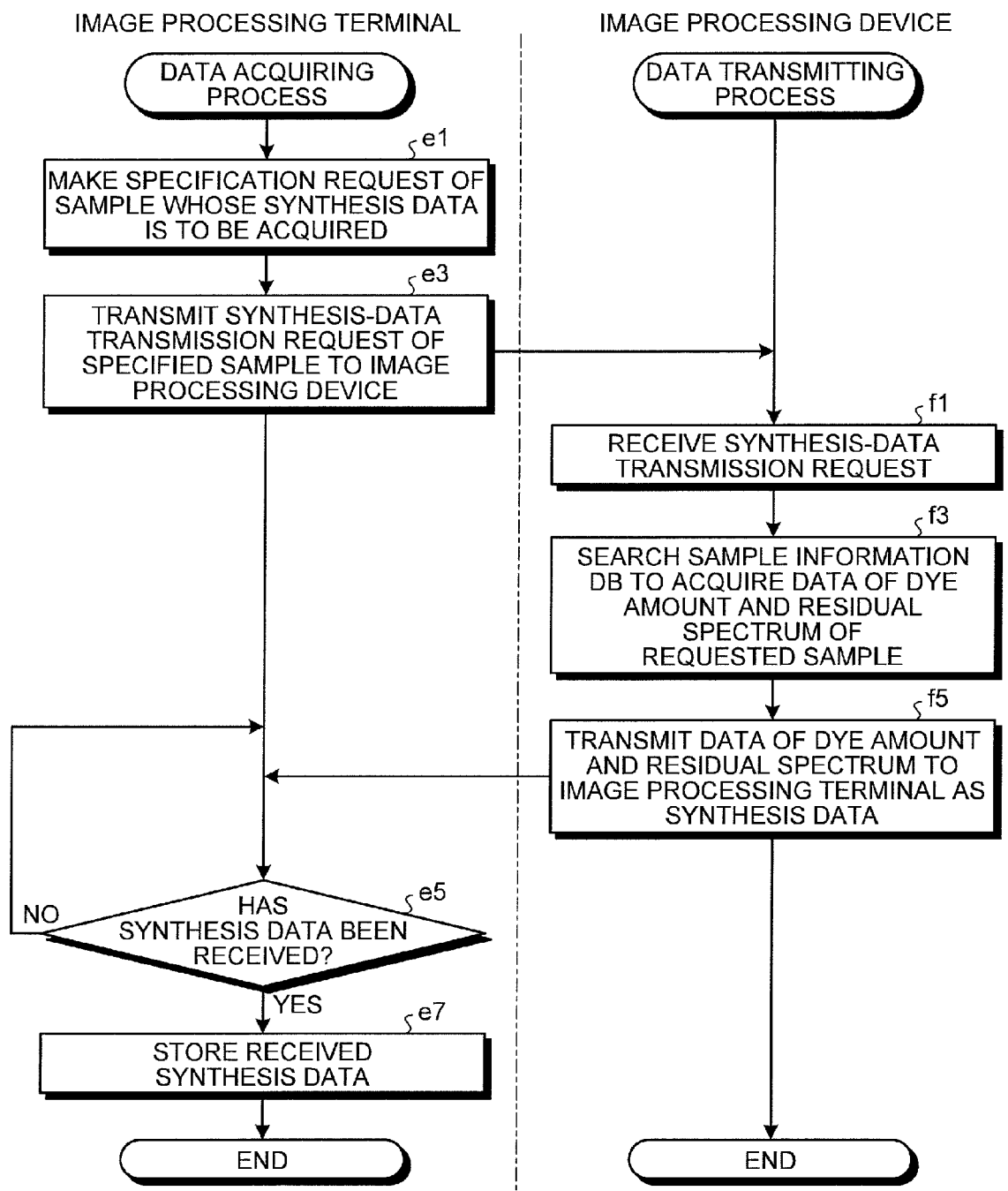
FIG. 14 is a flowchart of a data transmitting process procedure performed by the image processing device and a data acquiring process procedure performed by the image processing terminal according to the second embodiment.

Process procedures performed by the image processing device 10b and the image processing terminal 20b are explained next. Process procedures of the image processing device 10b and the image processing terminal 20b at the time of transmitting and receiving the synthesis data between the image processing device 10b and the image processing terminal 20b are explained first. FIG. 14 is a flowchart of a data transmitting process procedure performed by the image processing device 10b and a data acquiring process procedure performed by the image processing terminal 20b according to the second embodiment. The processes explained here are realized by the respective units of the image processing device 10b that operate according to the data transmitting program 162b stored in the storage unit 160b and by the respective units of the image processing terminal 20b that operate according to the data acquiring program 251b stored in the storage unit 250b.

As shown in FIG. 14, in the image processing terminal 20b, when the data acquiring process is started, the data acquisition controller 261b performs control to display a specification-request notification screen for a sample whose synthesis data is to be acquired on the display unit 220, thereby making a sample specification request (Step e1). The data acquisition controller 261b performs control to transmit a synthesis data transmission request to the image processing device 10b together with the sample identification information of the specified sample, according to a response to the specification request notification (Step e3). The data acquisition controller 261b becomes a standby state until it receives the synthesis data of the specified sample from the image processing device 10b.

On the other hand, in the image processing device 10b, the data transmission controller 172b first performs control to receive the synthesis data transmission request transmitted from the image processing terminal 20b (Step f1) as the data transmitting process. Subsequently, the data transmission controller 172b searches the sample information DB 163b based on the sample identification information transmitted together with the synthesis data transmission request, to acquire the data of the dye amounts and the residual spectrum associated with the sample identification information (Step f3). The data transmission controller 172b then performs control to transmit the acquired data of the dye amount data and the residual spectrum to the image processing terminal 20b that has transmitted the synthesis data transmission request as the synthesis data (Step f5).

In the image processing terminal 20b, upon reception of the synthesis data transmitted from the image processing device 10b (YES at Step e5), the data acquisition controller 261b stores the received synthesis data in the received synthesis data 254b in association with the sample identification information (Step e7).

Figure 15:
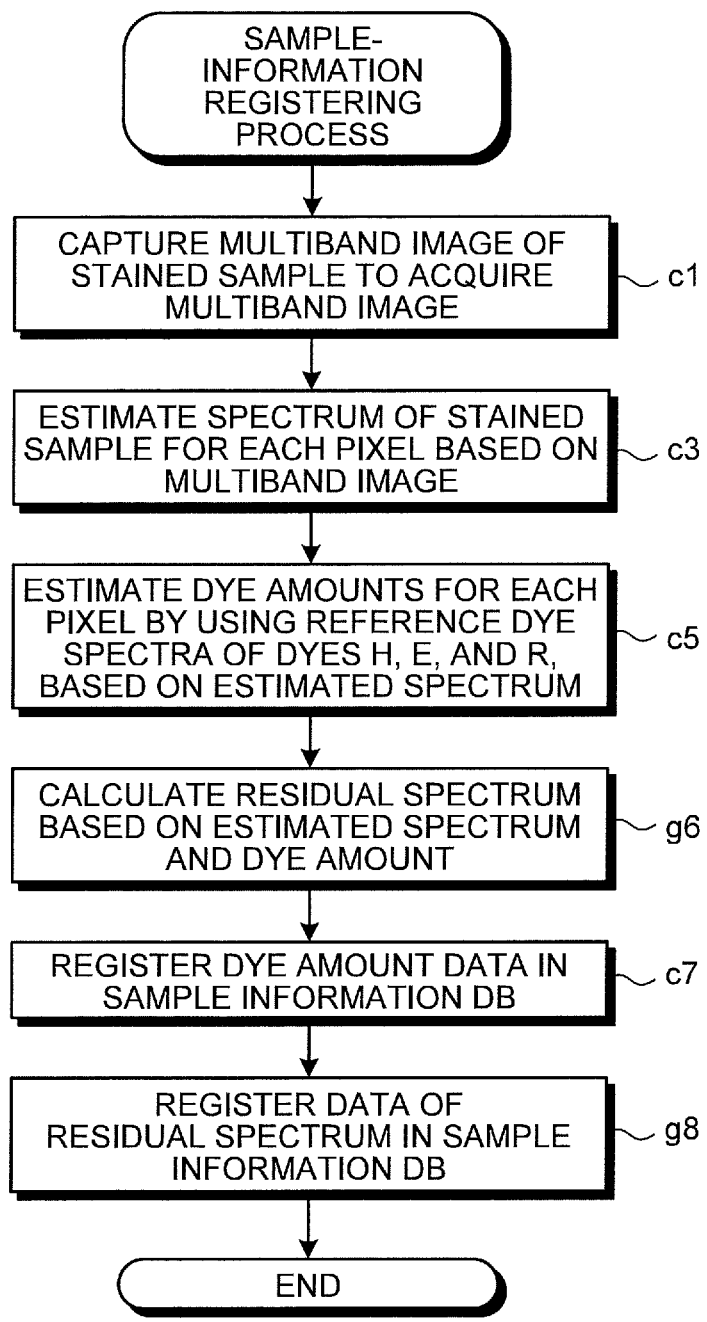
FIG. 15 is a flowchart of a sample-information registering process procedure according to the second embodiment.

A sample-information registering process procedure performed by the image processing device 10b is explained next. FIG. 15 is a flowchart of the sample-information registering process procedure according to the second embodiment. The process explained here is realized by the respective units of the image processing device 10b that operate according to the image processing program 161b stored in the storage unit 160b. In FIG. 15, like reference signs refer to like processing steps explained in the first embodiment.

As shown in FIG. 15, in the sample-information registering process according to the second embodiment, the dye-amount estimating unit 152b estimates dye amounts of a stained sample for each pixel at Step c5. The residual spectrum calculator 153b calculates a residual spectrum based on an estimated spectral absorbance obtained from the estimated spectrum estimated at Step c3 and a restored spectral transmittance restored based on the dye amounts $\hat{d}_H$, $\hat{d}_E$, $\hat{d}_R$ estimated at Step c5 (Step g6). That is, a restored spectral absorbance $\tilde{a}(x,y)$ is calculated first from dye amounts $\hat{d}_H$, $\hat{d}_E$, $\hat{d}_R$ according to the following Equation (17) shown in the related art.

$$\tilde{a}(x,\lambda)=k_H(\lambda)\cdot\hat{d}_H+k_E(\lambda)\cdot\hat{d}_E+k_R(\lambda)\cdot\hat{d}hd\, R \tag{17}$$

A residual spectrum $e(\lambda)$, which is a difference between the estimated spectral absorbance $\hat{a}(x,y)$ and the restored spectral absorbance $\tilde{a}(x,y)$ based on the estimated spectral absorbance and the restored spectral absorbance obtained from an estimated spectral transmittance $\hat{t}(x, \lambda)$ according to the following Equation (18).

$$e(\lambda)=\hat{a}(x,\lambda)-\tilde{a}(x,\lambda) \tag{18}$$

The arithmetic unit 150b registers data of the estimated dye amounts $\hat{d}_H$, $\hat{d}_E$, $\hat{d}_R$ in the sample information DB 163b in association with the sample identification information of the stained sample (Step c7). The arithmetic unit 150b registers data of the calculated residual spectrum $e(\lambda)$ in the sample information DB 163b in association with the sample identification information of the stained sample (Step g8).

Figure 16:
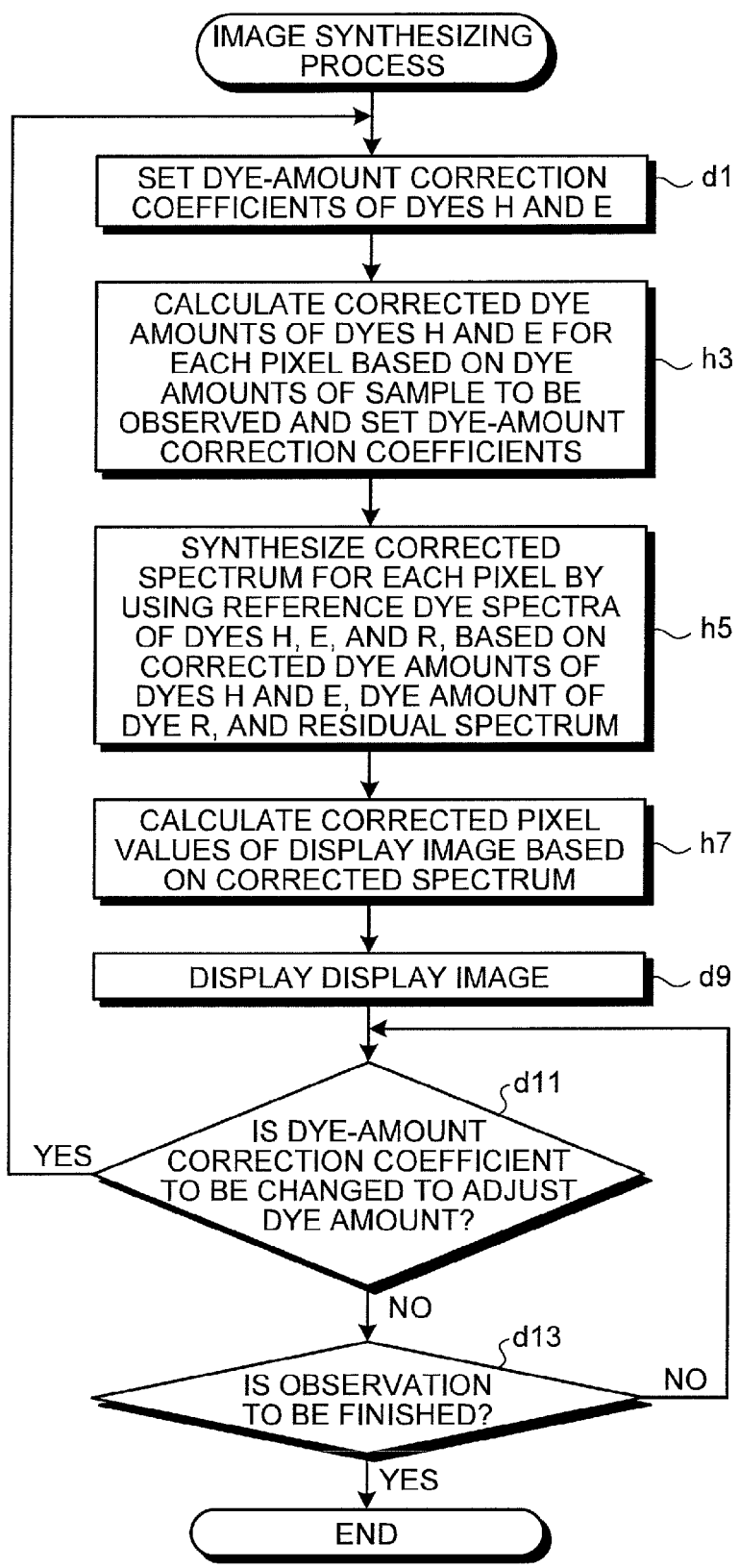
FIG. 16 is a flowchart of an image synthesizing process procedure according to the second embodiment.

An image synthesizing process procedure performed by the image processing terminal 20b is explained next. FIG. 16 is a flowchart of the image synthesizing process procedure according to the second embodiment. The process explained here is realized by the respective units of the image processing terminal 20b that operate according to the image processing program 252b stored in the storage unit 250b. In FIG. 16, like reference signs refer to like processing steps explained in the first embodiment.

As shown in FIG. 16, in the image synthesizing process according to the second embodiment, the dye-amount correction-coefficient setting unit 262 sets the dye-amount correction coefficients of the dye H and the dye E at Step d1. Thereafter, the corrected dye-amount calculator 241b reads the dye amount data of the sample to be observed, which is acquired from the image processing device 10b and stored in the received synthesis data 254b. The corrected dye-amount calculator 241b calculates corrected dye amounts $\hat{d}_H^*$, $\hat{d}_E^*$ of the dye H and the dye E for each pixel (Step h3).

Subsequently, the corrected spectrum synthesizer 242b reads the data of residual spectrum of the sample to be observed stored in the received synthesis data 254b. The corrected spectrum synthesizer 242b synthesizes a corrected spectrum for each pixel by using the reference dye spectra $k_H(\lambda)$, $k_E(\lambda)$, and $k_R(\lambda)$ of the dye H, the dye E, and the dye R, based on the corrected dye amounts $\hat{d}_H^*$, $\hat{d}_E^*$ of the dye H and the dye E, the dye amount $\hat{d}_R$ of the dye R, and the read residual spectrum $e(\lambda)$ (Step h5). That is, the corrected spectrum synthesizer 242b obtains a spectral absorbance $\hat{a}^*(x, \lambda)$ at each point x according to the following Equation (23) shown in the related art.

$$\hat{a}^*(x,\lambda) = k_H(\lambda) \cdot \hat{d}_H^* + k_E(\lambda) \cdot \hat{d}_E^* + k_R(\lambda) \cdot \hat{d}_R + e(\lambda) \quad (23)$$

Subsequently, a new spectral transmittance $t^*(x,\lambda)$ at each point x is obtained from the obtained spectral absorbance $\hat{a}^*(x,\lambda)$ according to the following Equation (24) shown in the related art, to synthesize a corrected spectrum.

$$t^*(x,\lambda) = e^{-\hat{a}^*(x,\lambda)} \quad (24)$$

Subsequently, the image synthesizer 243b calculates corrected pixel values of the respective pixels in the display image based on the corrected spectrum to synthesize a display image (Step h7), and the image display controller 263 performs control to display the synthesized display image on the display unit 220 (Step d9).

As explained above, according to the second embodiment, identical effects as those of the first embodiment can be obtained. Further, the image processing device 10b can calculate the residual spectrum at the time of estimating the dye amounts of the stained sample, and can transmit the residual spectrum together with the dye amounts in response to a request from the image processing terminal 20b. On the other hand, the image processing terminal 20b can acquire the data of residual spectrum together with the dye amounts at the time of acquiring the dye amounts, and can synthesize a display image, taking the residual spectrum into consideration. Accordingly, such a situation can be prevented that the synthesized display image unnaturally changes the color due to an estimation error at the time of estimating the dye amounts or the like, and synthesis accuracy of the display image can be improved.

In the second embodiment, a case that the dye amounts and the residual spectrum are transmitted in response to the synthesis data transmission request from the image processing terminal 20b is explained. However, the residual spectrum can be transmitted when there is a request from the image processing terminal 20b separately.

Figure 17:
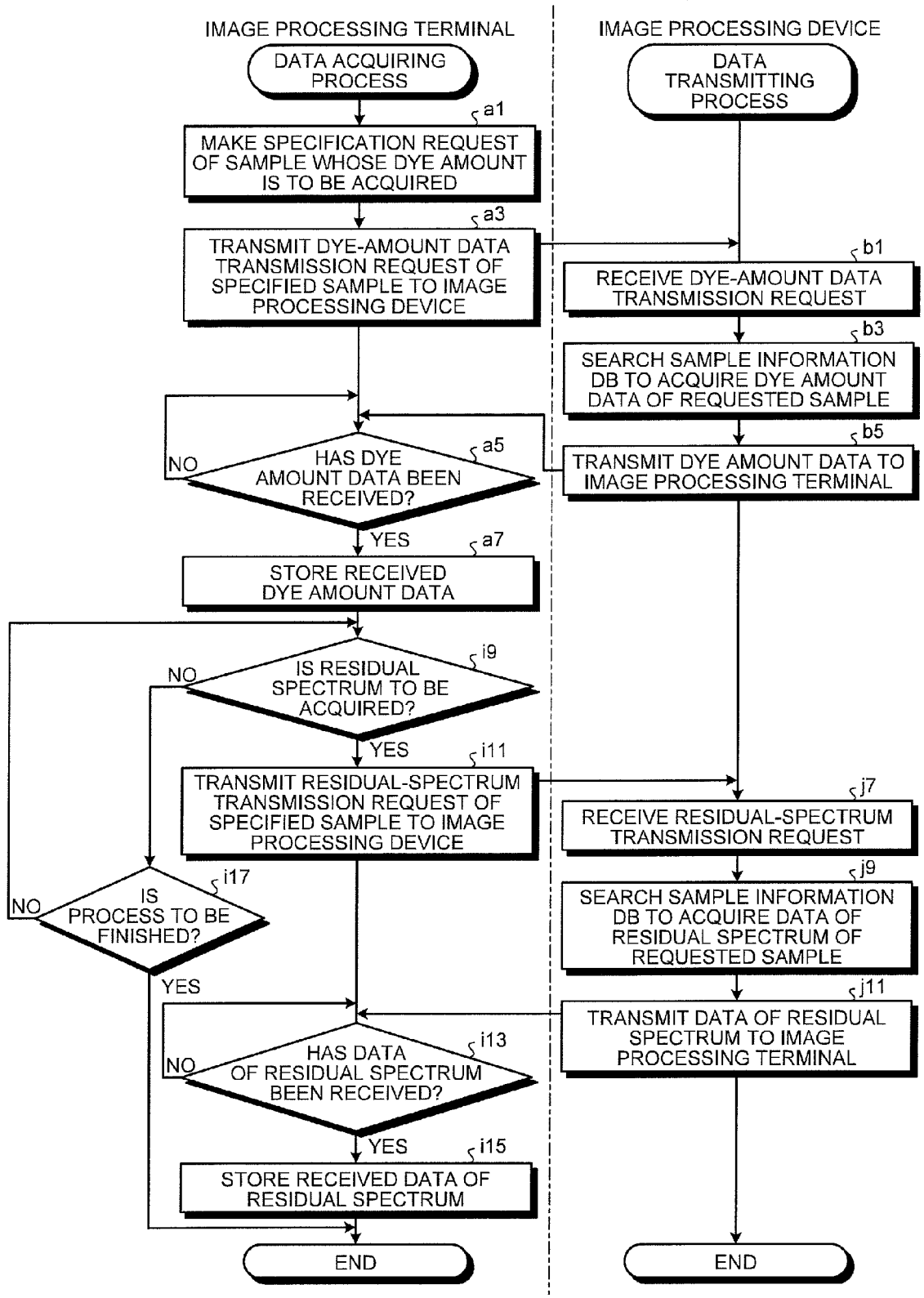
FIG. 17 is a flowchart of a data transmitting process procedure performed by an image processing device in a modification example and a data acquiring process procedure performed by an image processing terminal.

Process procedures performed by the image processing device and the image processing terminal in a modification example are explained here. The process procedures of the image processing device and the image processing terminal at the time of transmitting and receiving dye amount data between the image processing device and the image processing terminal are explained first. FIG. 17 is a flowchart of a data transmitting process procedure performed by the image processing device and a data acquiring process procedure performed by the image processing terminal in the modification example. The processes explained here are realized by the respective units of the image processing device that operate according to the data transmitting program stored in the storage unit of the image processing device, and by the respective units of the image processing terminal that operate according to the data acquiring program stored in the storage unit of the image processing terminal. In FIG. 17, like reference letters or numerals refer to like processing steps explained in the first embodiment.

As shown in FIG. 17, in the modification example, after storing the dye amount data at Step a7 in the data acquiring process, the data acquisition controller determines whether to acquire the residual spectrum. For example, when it is determined that the residual spectrum is necessary in an image synthesizing process described later performed by the image processing terminal in the modification example, the data acquisition controller determines to acquire the residual spectrum. When the process is to be finished without acquiring the residual spectrum (NO at Step i9→YES at Step i17), the process is finished.

When having determined to acquire the residual spectrum (YES at Step i9), the data acquisition controller transmits a residual-spectrum transmission request together with a sample identification number of the sample specified at Step a1 to the image processing device (Step i11), and becomes a standby state until it receives the data of residual spectrum.

On the other hand, in the image processing device, the data transmission controller performs control to receive the residual-spectrum transmission request transmitted from the image processing terminal at step j7 in the data transmitting process. Subsequently, the data transmission controller searches the sample information DB based on the sample identification information transmitted together with the residual-spectrum transmission request, to acquire the data of residual spectrum associated with the sample identification information (Step j9). The data transmission controller then performs control to transmit the acquired data of residual spectrum to the image processing terminal that has transmitted the residual-spectrum transmission request (Step j11).

In the image processing terminal, upon reception of the data of residual spectrum transmitted from the image processing device (YES at Step i13), the data acquisition controller stores the received data of residual spectrum in the received synthesis data in association with the sample identification information (Step i15).

Figure 18:
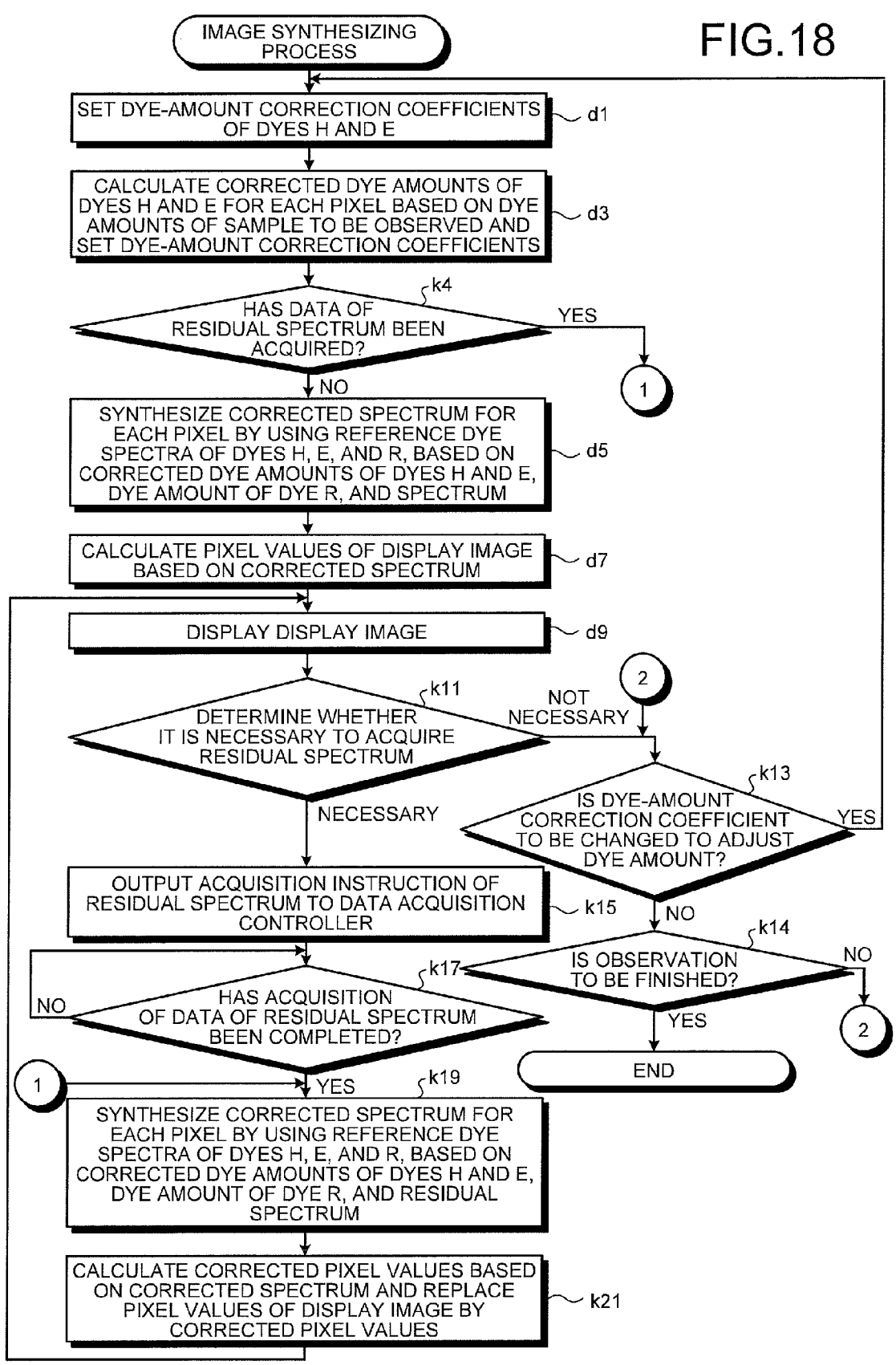
FIG. 18 is a flowchart of an image synthesizing process procedure in the modification example.

The image synthesizing process performed by the image processing terminal in the modification example is explained next with reference to FIG. 18. In FIG. 18, like reference letters or numerals refer to like processing steps explained in the first embodiment. In the modification example, when the corrected dye-amount calculator calculates corrected dye amounts of a sample to be observed for each pixel (Step d3), the corrected spectrum synthesizer determines whether the data of residual spectrum calculated for the sample to be observed has been acquired, by referring to the received synthesis data. When the data of residual spectrum has been acquired (YES at Step k4), the corrected spectrum synthesizer proceeds to Step k19 described later. On the other hand, when the data of residual spectrum has not been acquired yet (NO at Step k4), the corrected spectrum synthesizer proceeds to Step d5, to synthesize a corrected spectrum for each pixel by using the reference dye spectra of the respective dyes, based on the corrected dye amounts of the dye H and the dye E and the dye amount of the dye R.

After the image display controller displays a display image on the display unit at Step d9, it is determined whether it is necessary to acquire the residual spectrum (Step k11). This determination is performed according to a user operation, by controlling to display a notification screen for requesting to specify whether it is necessary to acquire the residual spectrum on the display unit. That is, when the user wishes to observe a sample with a more accurate display image, the user inputs an acquisition instruction of the residual spectrum via the input unit. When acquisition of the residual spectrum is not necessary, control returns to Step k13, where the dye amounts of the respective dyes are adjusted by changing the dye-amount correction coefficients. When a display image is to be synthesized and displayed again (YES at Step k13), control returns to Step d1. When observation of the sample with the display image is to be finished (YES at Step k14), the process is finished.

When acquisition of the residual spectrum is necessary, control proceeds to Step k15, where the arithmetic unit outputs an acquisition instruction of the residual spectrum to the data acquisition controller in the control unit. As a result of process performed at Step k15, the data acquisition controller determines to acquire the residual spectrum at Step i9 in FIG. 17, to proceed to Step i11. In this case, the arithmetic unit becomes a standby state until acquisition of the data of residual spectrum from the image processing device is completed. That is, when the data of residual spectrum is received at Step i13 in FIG. 17, and stored at Step i15 to complete acquisition of the data of residual spectrum (YES at Step k17), control returns to Step k19.

That is, at Step k19, the corrected spectrum synthesizer synthesizes a corrected spectrum for each pixel by using the reference dye spectra of respective dyes, based on the corrected dye amounts of the dye H and the dye E, the dye amount of the dye R, and the acquired residual spectrum of the sample to be observed.

Subsequently, the image synthesizer calculates corrected pixel values of the respective pixels in the display image based on the corrected spectrum synthesized for each pixel, and replaces the pixel values calculated at Step d7 by the corrected pixel values to synthesize a display image (Step k21). Thereafter, control proceeds to Step d9, where the image display controller performs control to display the display image newly synthesized, taking the residual spectrum into consideration, on the display unit.

According to the modification example, identical effects as those of the second embodiment can be achieved, and the residual spectrum can be acquired according to need, thereby enabling to reduce the communication load as compared with a case that the residual spectrum is acquired at all times similarly to the second embodiment. Necessity of acquisition of the residual spectrum is determined according to a user operation; however, it can be automatically determined whether to acquire the residual spectrum.

Figure 19:
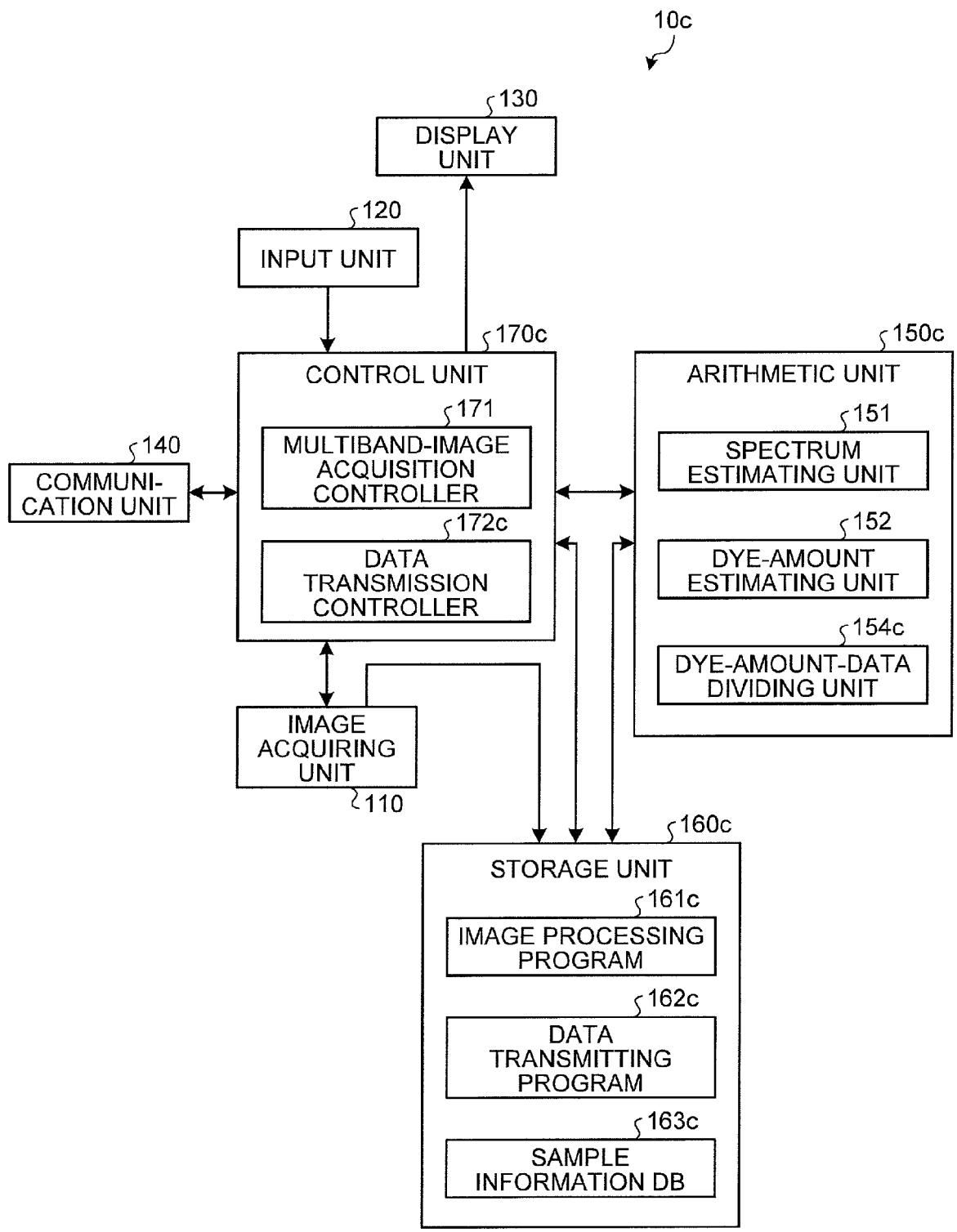
FIG. 19 is a block diagram for explaining a functional configuration of an image processing device according to a third embodiment.

A third embodiment is explained next. FIG. 19 is a block diagram for explaining a functional configuration of an image processing device 10c according to the third embodiment. Like reference letters or numerals refer to like parts explained in the first embodiment. As shown in FIG. 19, the image processing device 10c includes the image acquiring unit 110, the input unit 120, the display unit 130, the communication unit 140, an arithmetic unit 150c, a storage unit 160c, and a control unit 170c that controls respective units.

The arithmetic unit 150c includes the spectrum estimating unit 151, the dye-amount estimating unit 152, and a dye-amount-data dividing unit 154c. The dye-amount-data dividing unit 154c handles dye amounts estimated by the dye-amount estimating unit 152 as floating-point type data, and divides an exponent part and a significand part thereof into high-order bits and low-order bits with a predetermined allocation. Accordingly, the dye-amount-data dividing unit 154c divides the dye amount into a primary floating-point-data portion including the low-order bits of the divided exponent part and the high-order bits of the divided significand part, and a supplementary floating-point-data portion including a sign bit, the high-order bits of the divided exponent part, and the low-order bits of the divided significand part.

Figure 20:
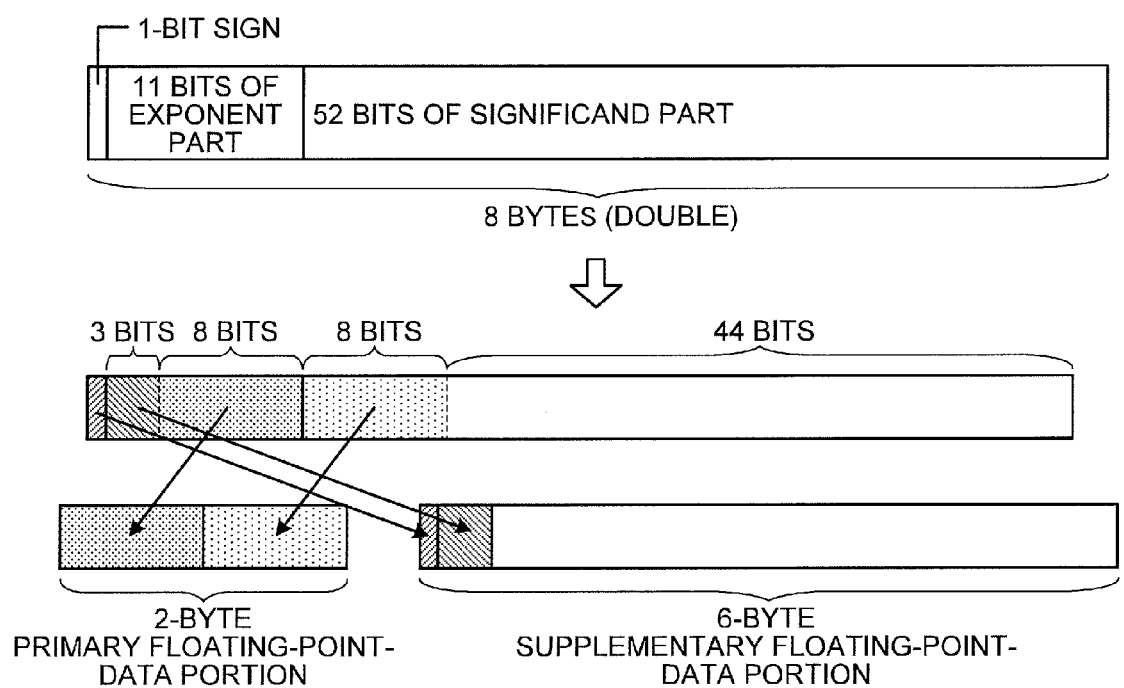
FIG. 20 is an explanatory diagram of a data dividing procedure of a dye amount.
Figure 21:
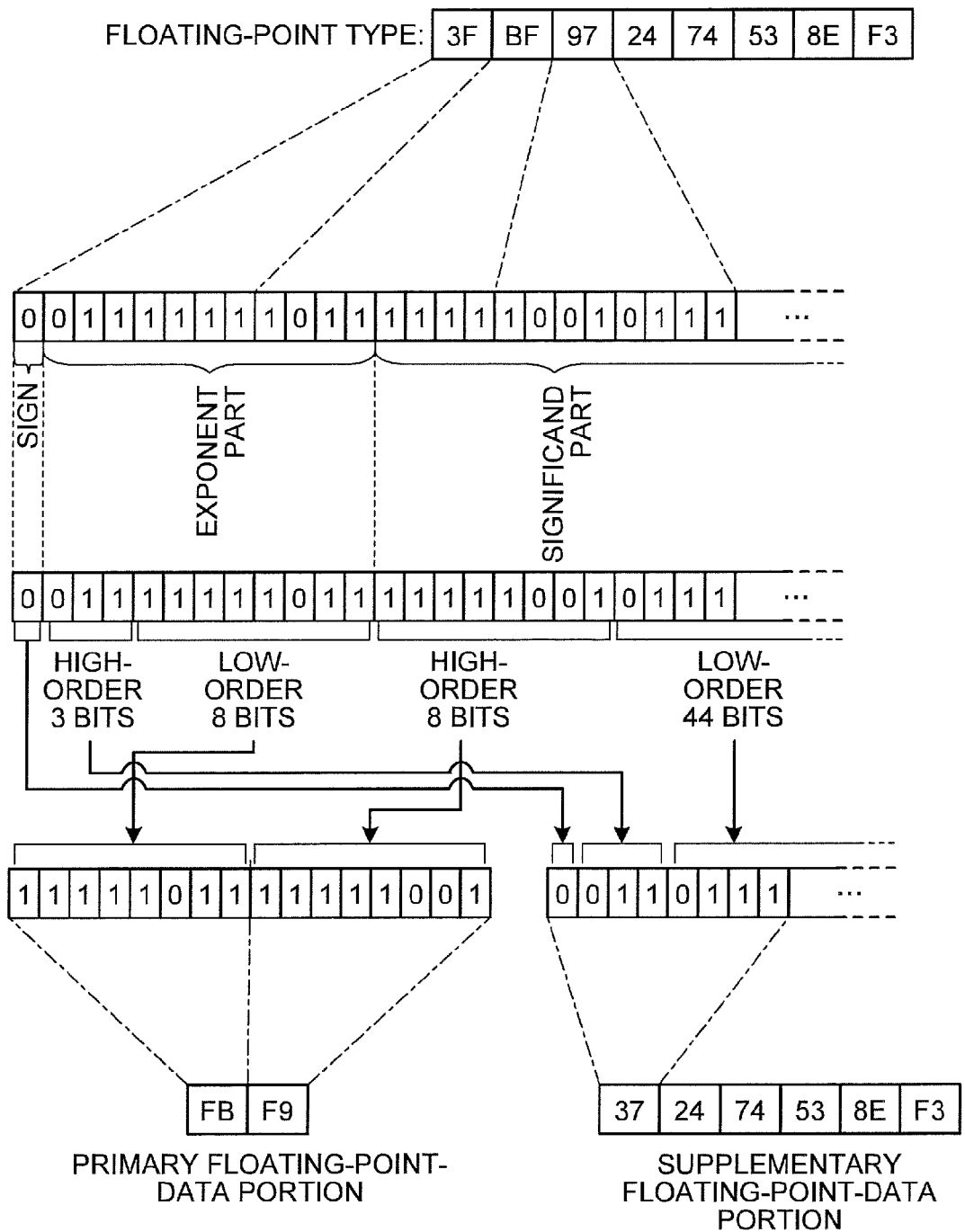
FIG. 21 depicts a specific data dividing example.

Division of the dye amount is explained here. FIG. 20 is an explanatory diagram of a data dividing procedure of the dye amount, and depicts a case that the dye amount data is handled in an 8-byte floating-point type (double type) including 1 bit of the sign bit, 11 bits of the exponent part, and 52 bits of the significand part. FIG. 21 depicts a specific data dividing example for exemplifying a numerical value of "0.1234". As shown in FIGS. 20 and 21, the dye-amount-data dividing unit 154c divides, for example, the exponent part into high-order 3 bits and low-order 8 bits, and divides the significand part into high-order 8 bits and low-order 44 bits. The dye-amount-data dividing unit 154c combines low-order 8 bits of the exponent part and high-order 8 bits of the significand part to form a 2-byte primary floating-point-data portion, and combines 1-bit sign bit, high-order 3 bits of the exponent part and low-order 44 bits of the significand part to form a 6-byte supplementary floating-point-data portion. In an example shown in FIG. 21, the dye amount data of "0.1234 (3FBF972474538EF3(H))" is divided into "FBF9(H)", which is the primary floating-point-data portion, and "372474538EF3(H)", which is the supplementary floating-point-data portion.

FIG. 22 depicts an error when some data elements as samples are divided into the primary floating-point-data portion and the supplementary floating-point-data portion. In the example shown in FIG. 22, an error up to 0.0810% can occur.

According to the primary floating-point-data portion divided in this manner, an exponent range of $10^{255}$ can be expressed by the high-order 8 bits of the exponent part. Further, an amount of data loss due to the high-order 8 bits of the significand part is about 0.10%. When checking with the actual dye amount value, the primary floating-point-data portion combined in this manner can substantially express a dye amount data range.

A percentage of the number of bits of the exponent part and the significand part is not limited to that shown in FIG. 20. For example, high-order 6 bits of the exponent part and high-order 10 bits of the significand part can be combined to form the 2-byte primary floating-point-data portion. In this case, the high-order 6 bits of the exponent part can express the exponent range of $10^9$. The amount of data loss due to the high-order 10 bits of the significand part is about 0.10%. Alternatively, low-order 5 bits of the exponent part and high-order 11 bits of the significand part can be combined to form the 2-byte primary floating-point-data portion. In this case, the high-order 5 bits of the exponent part can express the exponent range of $10^4$. The amount of data loss due to the high-order 11 bits of the significand part is about 0.05%.

An image processing program 161c, a data transmitting program 162c, and a sample information DB 163c are stored in the storage unit 160c. The image processing program 161c realizes a process of estimating dye amounts of a stained sample from a stained sample image, handling the estimated dye amount data as floating-point type data to divide the data into the primary floating-point-data portion and the supplementary floating-point-data portion, and registering the dye amount data in the sample information DB 163c, by designating the primary floating-point-data portion of the respective dye amounts as primary dye amounts and the supplementary floating-point-data portion thereof as supplementary dye amounts (the sample-information registering process). The data transmitting program 162c realizes a process of responding to a request from an image processing terminal 20c (a dye-amount data transmission request) to transmit the primary dye-amount data estimated for a requested sample to the image processing terminal 20c (the data transmitting process). In the sample information DB 163c, data of the samples are accumulated in association with the sample identification information similarly to the first embodiment, and the dye amount data thereof includes respective data elements of the primary dye amounts and the supplementary dye amounts.

The control unit 170c includes the multiband-image acquisition controller 171 and a data transmission controller 172c as the dye-amount transmitting unit. The data transmission controller 172c responds to a dye-amount data transmission request from the image processing terminal 20c and performs control to transmit primary dye-amount data of the dye amounts of the requested sample registered in the sample information DB 163c to the image processing terminal 20c via the communication unit 140.

Figure 23:
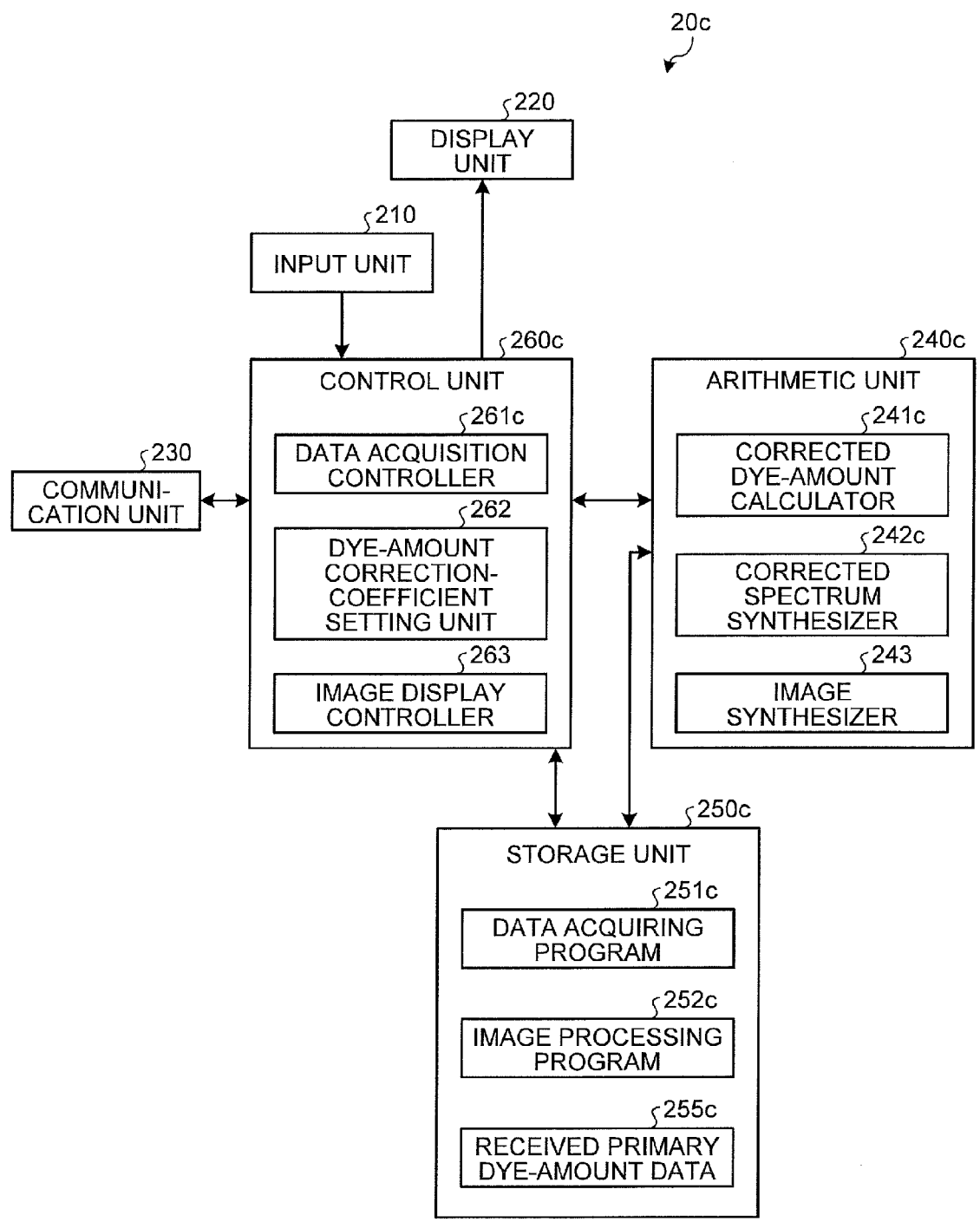
FIG. 23 is a block diagram of an example of a functional configuration of an image processing terminal according to the third embodiment.

FIG. 23 is a block diagram of an example of a functional configuration of the image processing terminal 20c according to the third embodiment. Like reference letters or numerals refer to like parts explained in the first embodiment. As shown in FIG. 23, the image processing terminal 20c includes the input unit 210, the display unit 220, the communication unit 230, an arithmetic unit 240c, a storage unit 250c, and a control unit 260c that controls respective units.

The arithmetic unit 240c includes a corrected dye-amount calculator 241c, a corrected spectrum synthesizer 242c, and the image synthesizer 243 as the pixel-value calculating unit. The corrected dye-amount calculator 241c calculates corrected dye amounts based on the primary dye amounts acquired from the image processing device 10c by using dye-amount correction coefficients. The corrected spectrum synthesizer 242c synthesizes a spectral transmittance based on corrected dye amounts of the dye H and the dye E and the primary dye amount of the dye R, to calculate a corrected spectrum.

A data acquiring program 251c, an image processing program 252c, and received primary dye-amount data 255c are stored in the storage unit 250c. The data acquiring program 251c realizes a process of transmitting a dye-amount data transmission request specifying a sample to the image processing device 10c and acquiring the primary dye-amount data of the dye amounts estimated for the specified sample (a data acquiring process). The image processing program 252c realizes a process of synthesizing a display image based on the primary dye-amount data acquired from the image processing device 10c (an image synthesizing process). The primary dye-amount data acquired from the image processing device 10c is set in the received primary dye-amount data 255c in association with the sample identification information thereof.

The control unit 260c includes a data acquisition controller 261c as a floating-point-data portion receiving unit, the dye-amount correction-coefficient setting unit 262 as the correction-coefficient setting unit, and the image display controller 263. The data acquisition controller 261c performs control to transmit a dye-amount data transmission request specifying a sample to the image processing device 10c via the communication unit 230 and acquire the primary dye-amount data.

Figure 24:
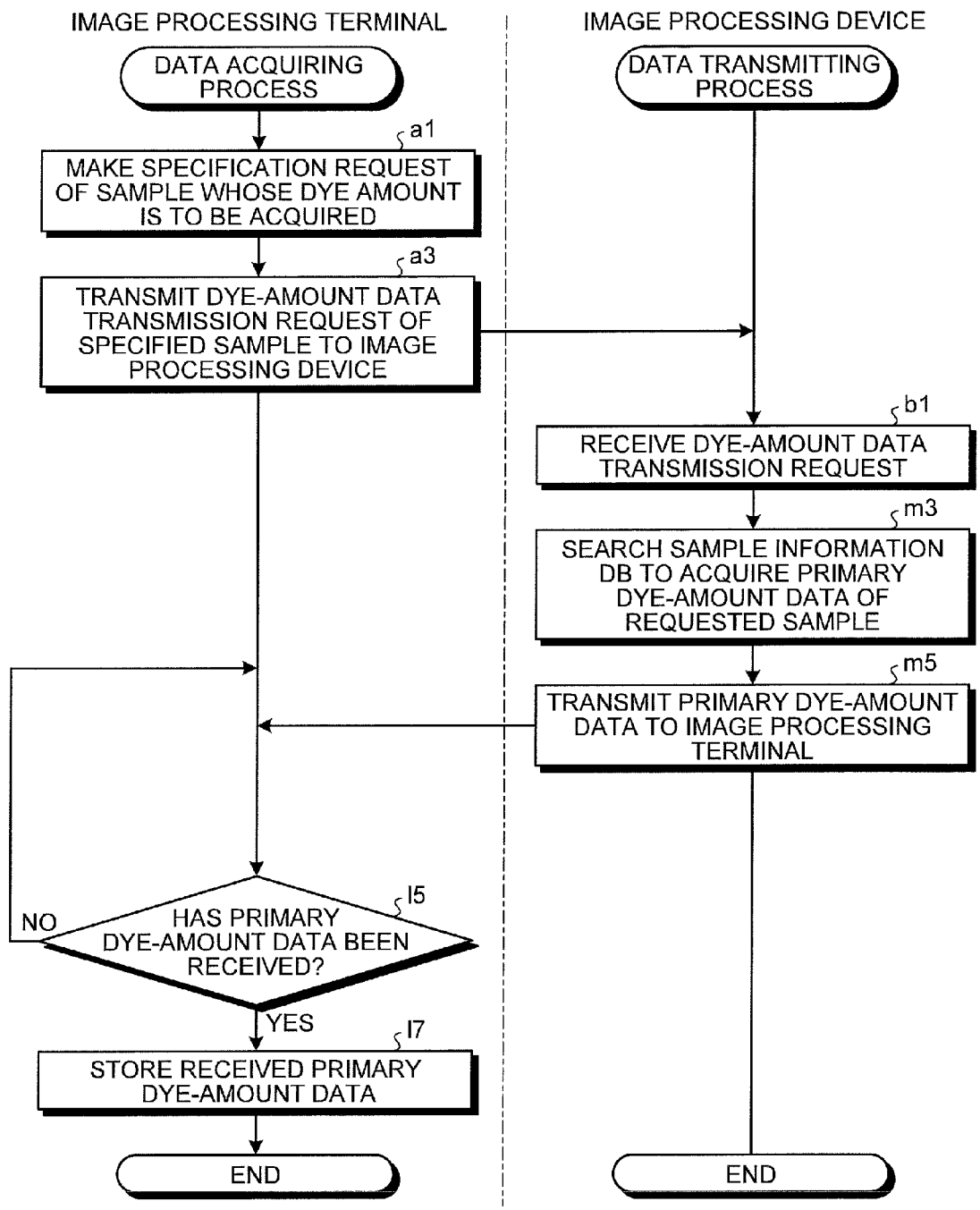
FIG. 24 is a flowchart of a data transmitting process procedure performed by the image processing device and a data acquiring process procedure performed by the image processing terminal according to the third embodiment.

Process procedures performed by the image processing device 10c and the image processing terminal 20c are explained next. Process procedures of the image processing device 10c and the image processing terminal 20c at the time of transmitting and receiving the primary dye-amount data between the image processing device 10c and the image processing terminal 20c are explained first. FIG. 24 is a flowchart of a data transmitting process procedure performed by the image processing device 10c and a data acquiring process procedure performed by the image processing terminal 20c according to the third embodiment. The processes explained here are performed by the respective units of the image processing device 10c that operate according to the data transmitting program 162c stored in the storage unit 160c and by the respective units of the image processing terminal 20c that operate according to the data acquiring program 251c stored in the storage unit 250c. In FIG. 24, like reference letters or numerals refer to like parts explained in the first embodiment.

As shown in FIG. 24, in the image processing terminal 20c, when the data acquisition controller 261c transmits the dye-amount data transmission request to the image processing device 10c at Step a3 in the data acquiring process, the data acquisition controller 261c becomes a standby state until it receives the primary dye-amount data of the specified sample from the image processing device 10c.

On the other hand, in the image processing device 10c, when the data transmission controller 172c receives the dye-amount data transmission request transmitted from the image processing terminal 20c at Step b1, the data transmission controller 172c subsequently searches the sample information DB 163c based on the sample identification information transmitted together with the dye-amount data transmission request, to acquire primary dye-amount data of the dye-amount data associated with the sample identification information (Step m3). The data transmission controller 172c then performs control to transmit the acquired primary dye-amount data to the image processing terminal 20c that has transmitted the dye-amount data transmission request (Step m5).

In the image processing terminal 20c, upon reception of the primary dye-amount data transmitted from the image processing device 10c (YES at Step l5), the data acquisition controller 261c stores the received primary dye-amount data in the received primary dye-amount data 255c in association with the sample identification information (Step l7).

Figure 25:
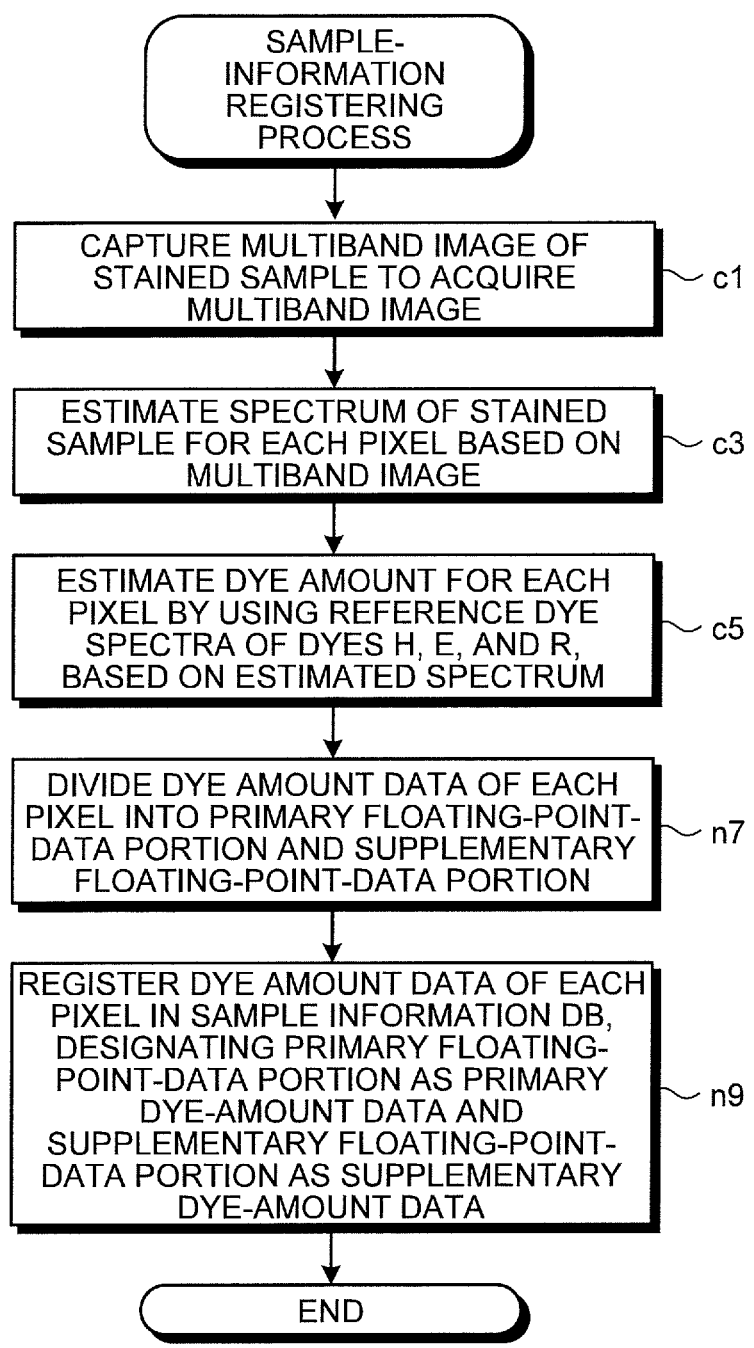
FIG. 25 is a flowchart of a sample-information registering process procedure according to the third embodiment.

A sample-information registering process procedure performed by the image processing device 10c is explained next. FIG. 25 is a flowchart of the sample-information registering process procedure according to the third embodiment. The process explained here is realized by the respective units of the image processing device 10c that operate according to the image processing program 161c stored in the storage unit 160c. In FIG. 25, like reference signs refer to like processing steps explained in the first embodiment.

As shown in FIG. 25, in the sample-information registering process according to the third embodiment, after the dye-amount estimating unit 152 estimates the dye amounts of the stained sample for each pixel, the dye-amount-data dividing unit 154c respectively handles the dye amount data of each pixel as the floating-point type data and divides the dye amount data into the primary floating-point-data portion and the supplementary floating-point-data portion (Step n7).

Subsequently, the arithmetic unit 150c registers the dye amount data in the sample information DB 163c, designating the divided primary floating-point-data portion of the dye amount for each pixel as primary dye-amount data and the supplementary floating-point-data portion as supplementary dye-amount data (Step n9).

Figure 26:
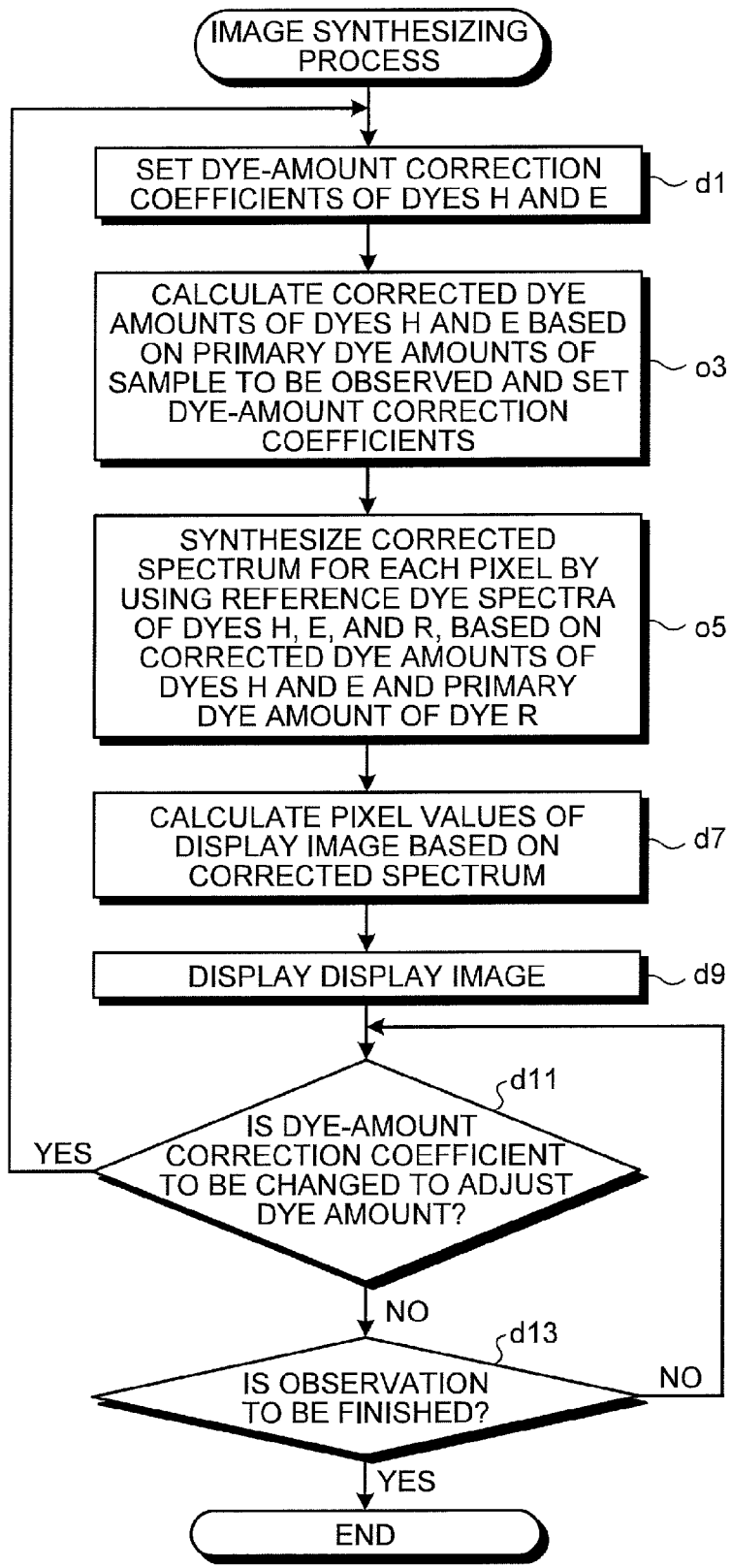
FIG. 26 is a flowchart of an image synthesizing process procedure according to the third embodiment.

An image synthesizing process procedure performed by the image processing terminal 20c is explained next. FIG. 26 is a flowchart of the image synthesizing process procedure according to the third embodiment. The process explained here is realized by the respective units of the image processing terminal 20c that operate according to the image processing program 252c stored in the storage unit 250c. In FIG. 26, like reference signs refer to like processing steps explained in the first embodiment.

As shown in FIG. 26, in the image synthesizing process according to the third embodiment, the dye-amount correction-coefficient setting unit 262 sets the dye-amount correction coefficients of the dye H and the dye E at Step d1. Thereafter, the corrected dye-amount calculator 241c reads the primary dye-amount data of the sample to be observed, which is acquired from the image processing device 10c and stored in the received primary dye-amount data 255c. The corrected dye-amount calculator 241c then calculates corrected dye amounts of the dye H and the dye E for each pixel, after having restored the exponent part and the significand part according to a procedure reverse to the process procedure shown in FIGS. 20 and 21 (Step o3).

Subsequently, the corrected spectrum synthesizer 242c synthesizes a corrected spectrum for each pixel by using the reference dye spectra of respective dyes, based on the corrected dye amounts of the dye H and the dye E and the primary dye amount of the dye R (Step o5). After the corrected spectrum is synthesized, control proceeds to Step d7.

As described above, according to the third embodiment, identical effects as those of the first embodiment can be achieved, and the dye amount data estimated by the image processing device 10c can be divided and the primary dye amount can be transmitted as required in response to a request from the image processing terminal 20c. Accordingly, the data amount to be transmitted and received between the image processing device 10c and the image processing terminal 20c can be reduced, thereby enabling to reduce the communication load.

Figure 27:
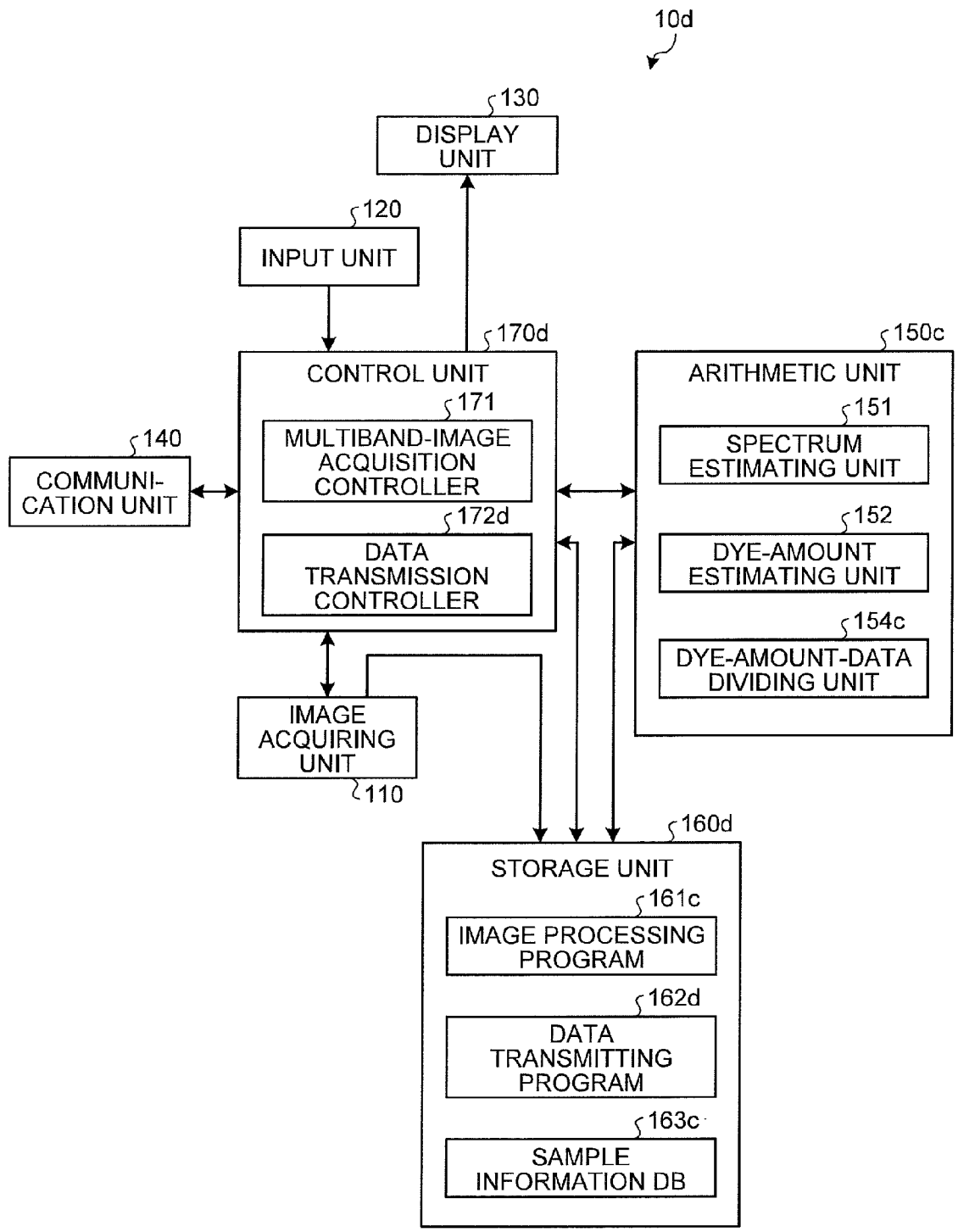
FIG. 27 is a block diagram for explaining a functional configuration of an image processing device according to a fourth embodiment.

A fourth embodiment is explained next. FIG. 27 is a block diagram for explaining a functional configuration of an image processing device 10d according to the fourth embodiment. Like reference letters or numerals refer to like parts explained in the third embodiment. As shown in FIG. 27, the image processing device 10d includes the image acquiring unit 110, the input unit 120, the display unit 130, the communication unit 140, the arithmetic unit 150c, a storage unit 160d, and a control unit 170d that controls respective units.

The arithmetic unit 150c includes the spectrum estimating unit 151, the dye-amount estimating unit 152, and the dye-amount-data dividing unit 154c. The image processing program 161c, a data transmitting program 162d, and the sample information DB 163c are stored in the storage unit 160d. The data transmitting program 162d realizes a process of responding to a transmission request of the primary dye-amount data from an image processing terminal 20d to transmit primary dye-amount data of the dye amounts estimated for a requested sample, and responding to a transmission request of the supplementary dye-amount data to transmit supplementary dye-amount data of the dye amounts estimated for the requested sample, to the image processing terminal 20d (the data transmitting process).

The control unit 170d includes the multiband-image acquisition controller 171 and a data transmission controller 172d as the dye-amount transmitting unit and a supplementary floating-point-data portion transmitting unit. The data transmission controller 172d responds to the transmission request of the primary dye-amount data transmitted from the image processing terminal 20d and performs control to transmit primary dye-amount data of the dye amounts of the requested sample registered in the sample information DB 163c to the image processing terminal 20d via the communication unit 140. Further, the data transmission controller 172d responds to the transmission request of the supplementary dye-amount data transmitted from the image processing terminal 20d and performs control to transmit supplementary dye-amount data of the dye amounts of the requested sample registered in the sample information DB 163c to the image processing terminal 20d via the communication unit 140.

Figure 28:
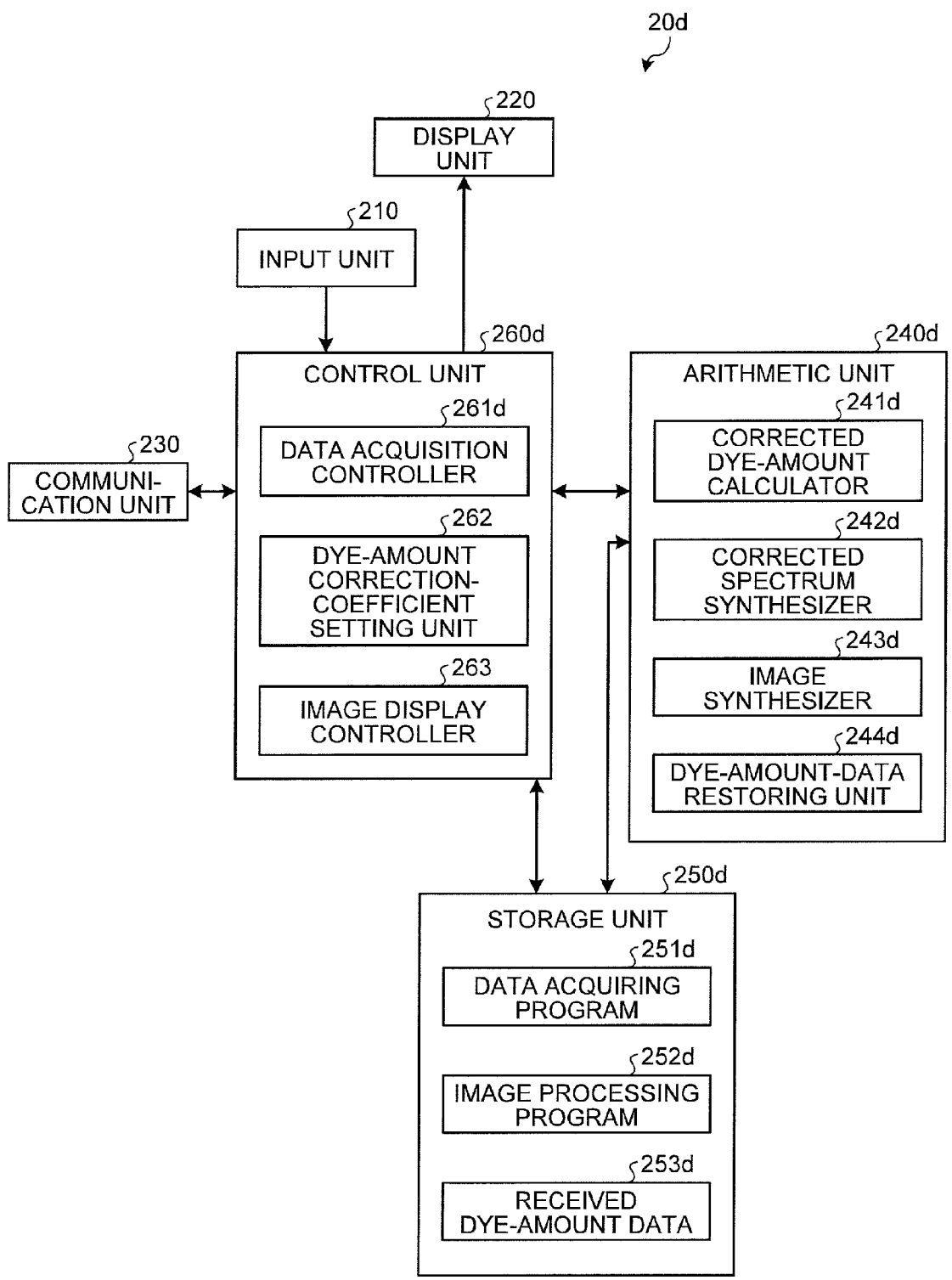
FIG. 28 is a block diagram of an example of a functional configuration of an image processing terminal according to the fourth embodiment.

FIG. 28 is a block diagram of an example of a functional configuration of the image processing terminal 20d according to the fourth embodiment. Like reference letters or numerals refer to like parts explained in the third embodiment. As shown in FIG. 28, the image processing terminal 20d includes the input unit 210, the display unit 220, the communication unit 230, the arithmetic unit 240c, a storage unit 250d, and a control unit 260d that controls respective units.

An arithmetic unit 240d includes a corrected dye-amount calculator 241d, a corrected spectrum synthesizer 242d, the image synthesizer 243 as the pixel-value calculating unit and a second corrected-pixel-value calculating unit, and a dye-amount-data restoring unit 244d as a dye-amount restoring unit. The corrected dye-amount calculator 241d calculates corrected dye amounts by using dye-amount correction coefficients, based on the primary dye amounts acquired from the image processing device 10d or the restored dye amounts restored by the dye-amount-data restoring unit 244d. The corrected spectrum synthesizer 242d synthesizes a spectral transmittance based on the corrected dye amounts of the dye H and the dye E obtained from the primary dye amounts thereof and the primary dye amount of the dye R, or based on the corrected dye amounts of the dye H and the dye E obtained from the restored dye amounts thereof and the restored dye amount of the dye R, to calculate a corrected spectrum. An image synthesizer 243d calculates a pixel value of a display image, by using the corrected spectrum synthesized by the corrected spectrum synthesizer 242d based on the primary dye amounts. When the corrected spectrum synthesizer 242d synthesizes the corrected spectrum based on the restored dye amounts, the image synthesizer 243d uses the corrected spectrum to calculate corrected pixel values (second corrected pixel values), and replaces the pixel values of the display image by the corrected pixel values to synthesize a display image again. The dye-amount-data restoring unit 244d calculates a restored pixel value based on respective data elements of the primary dye amounts and the supplementary dye amounts acquired from the image processing device 10d, to restore dye amount data before being divided into the primary floating-point-data portion and the supplementary floating-point-data portion.

Figure 29:
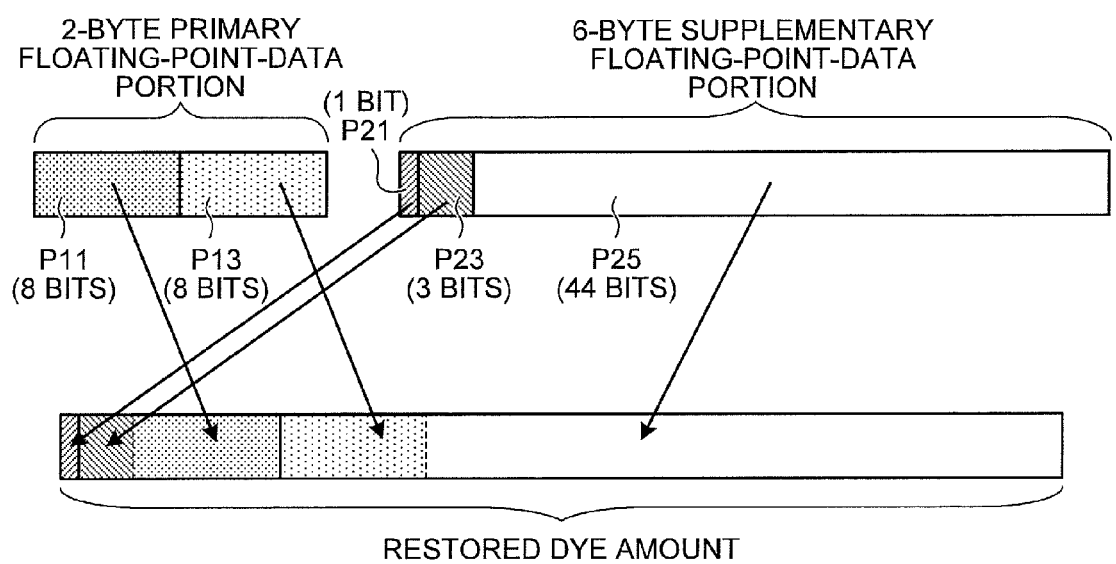
FIG. 29 is an explanatory diagram of a data restoring procedure of dye amounts.

Restoration of the dye amounts is explained here. FIG. 29 is an explanatory diagram of a data restoring procedure of dye amounts, and depicts a state where the primary floating-point-data portion and the supplementary floating-point-data portion of the dye amounts explained in the third embodiment and shown in FIG. 29 are restored. As shown in FIG. 29, the dye-amount-data restoring unit 244d sets high-order 1 bit P21 of the supplementary floating-point-data portion as a sign part of the dye amount data before division. Further, the dye-amount-data restoring unit 244d extracts the second and third bits P23 from the supplementary floating-point-data portion and sets P23 as high-order bits of the exponent part of the dye amount data before division, and extracts high-order 8 bits P11 of the primary floating-point-data portion and sets P11 as low-order bits of the exponent part of the dye amount data before division. Further, the dye-amount-data restoring unit 244d sets low-order 8 bits P13 of the primary floating-point-data portion as high-order 8 bits of the significand part of the dye amount data before division, and low-order 44 bits P25 of the supplementary floating-point data as low-order 44 bits of the significand part of the dye amount data before division. In this manner, the dye-amount-data restoring unit 244d restores the dye amount data before division estimated by the image processing device 10d.

A data acquiring program 251d, an image processing program 252d, and received dye-amount data 255d are stored in the storage unit 250d. The data acquiring program 251d realizes a process of transmitting a transmission request of the primary dye-amount data specifying a sample to the image processing device 10d to acquire the primary dye-amount data of the dye amounts estimated for the specified sample, and transmitting a transmission request of the supplementary dye-amount data to the image processing device 10d at another timing to acquire the supplementary dye-amount data of the dye amounts estimated for the specified sample (a data acquiring process). The image processing program 252d realizes a process of synthesizing a display image by calculating pixel values based on the primary dye amounts acquired from the image processing device 10d, and calculating corrected pixel values based on restored dye amounts restored together with the supplementary dye amounts acquired from the image processing device 10d at another timing, to synthesize a display image by replacing the pixel values by the corrected pixel values (an image synthesizing process). The primary dye-amount data acquired from the image processing device 10d is set in received dye-amount data 253d in association with the sample identification information thereof, and the supplementary dye amounts acquired from the image processing device 10d at the other timing is further set in association therewith.

The control unit 260d includes a data acquisition controller 261d as the floating-point-data portion receiving unit and a supplementary floating-point-data portion receiving unit, the dye-amount correction-coefficient setting unit 262 as the correction-coefficient setting unit, and the image display controller 263. The data acquisition controller 261d performs control to transmit a transmission request of the primary dye-amount data specifying a sample to the image processing device 10d via the communication unit 230 to acquire the primary dye-amount data, and also control to transmit a transmission request of the supplementary dye-amount data to the image processing device 10d to acquire the supplementary dye-amount data.

Figure 30:
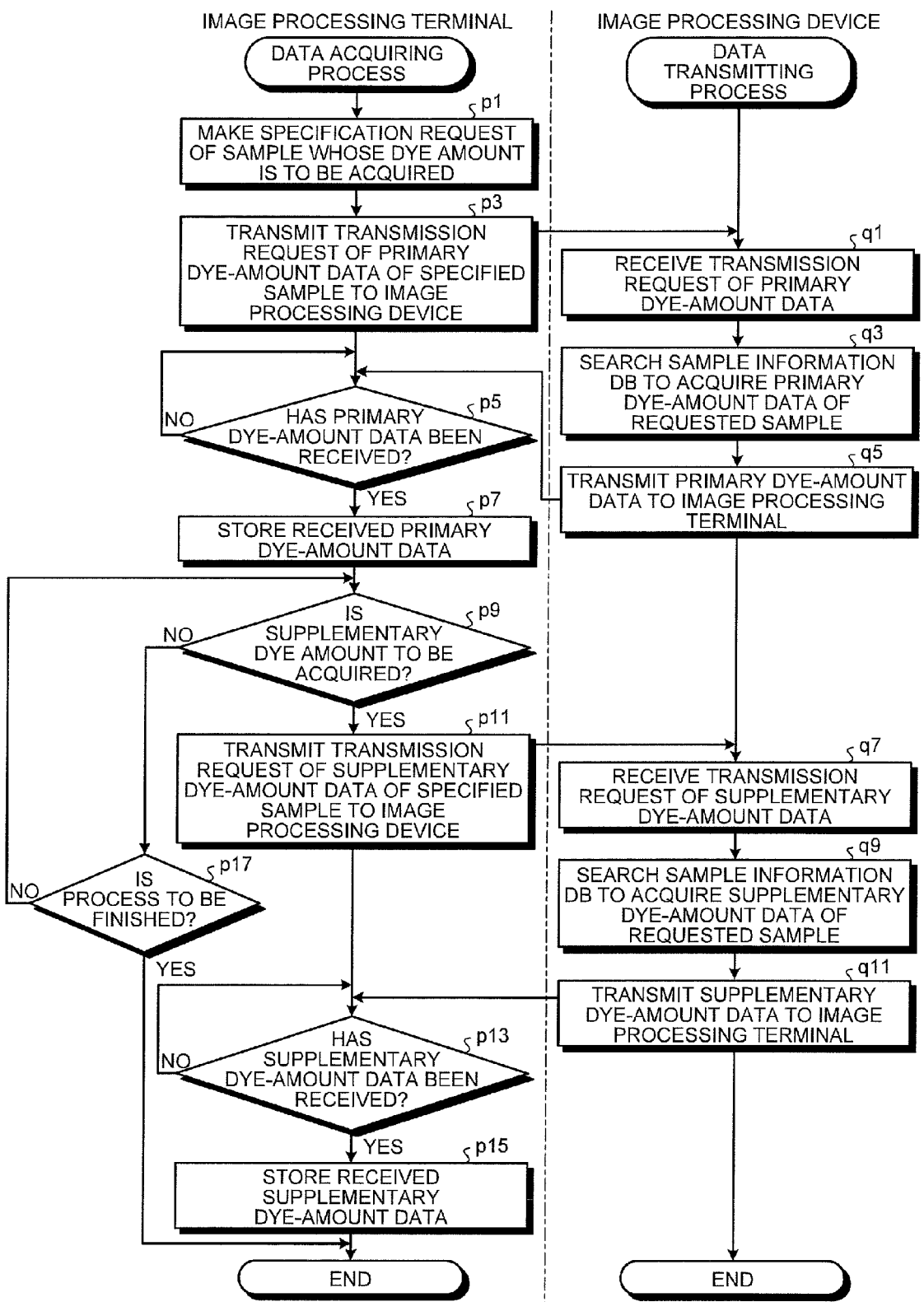
FIG. 30 is a flowchart of a data transmitting process procedure performed by the image processing device and a data acquiring process procedure performed by the image processing terminal according to the fourth embodiment.

Process procedures performed by the image processing device 10d and the image processing terminal 20d are explained next. Process procedures of the image processing device 10d and the image processing terminal 20d at the time of transmitting and receiving the dye amount data between the image processing device 10d and the image processing terminal 20d are explained first. FIG. 30 is a flowchart of a data transmitting process procedure performed by the image processing device 10d and a data acquiring process procedure performed by the image processing terminal 20d according to the fourth embodiment. The processes explained here are realized by the respective units of the image processing device 10d that operate according to the data transmitting program 162d stored in the storage unit 160d and by the respective units of the image processing terminal 20d that operate according to the data acquiring program 251d stored in the storage unit 250d.

As shown in FIG. 30, in the image processing terminal 20d, when a data acquiring process is started, the data acquisition controller 261d performs control to display a specification-request notification screen for a sample, whose dye amounts are to be acquired, on the display unit 220, to request a specification of a sample (Step p1). The data acquisition controller 261d then performs control to transmit a transmission request of the primary dye-amount data to the image processing device 10d together with the sample identification information of the specified sample, according to a response to a specification request notification (Step p3). The data acquisition controller 261d becomes a standby state until it receives the primary dye-amount data of the specified sample from the image processing device 10d.

On the other hand, in the image processing device 10d, the data transmission controller 172d first performs control to receive the transmission request of the primary dye-amount data transmitted from the image processing terminal 20d (Step q1). Subsequently, the data transmission controller 172d searches the sample information DB 163c based on the sample identification information transmitted together with the transmission request of the primary dye-amount data, to acquire the primary dye-amount data associated with the sample identification information (Step q3). The data transmission controller 172d then performs control to transmit the acquired primary dye-amount data as synthesis data to the image processing terminal 20d that has transmitted the transmission request of the primary dye-amount data (Step q5).

In the image processing terminal 20d, upon reception of the primary dye-amount data transmitted from the image processing device 10d (YES at Step p5), the data acquisition controller 261d stores the received primary dye-amount data in the received dye-amount data 253d in association with the sample identification information (Step p7).

Subsequently, the data acquisition controller 261d determines whether to acquire the supplementary dye amounts. For example, when it is determined that the supplementary dye amounts are necessary in the image synthesizing process performed by the image processing terminal 20d, the data acquisition controller 261d determines to acquire the supplementary dye amounts. When the process is to be finished without acquiring the supplementary dye amounts (NO at Step p9→YES at Step p17), the process is finished.

When it is determined to acquire the supplementary dye amounts (YES at Step p9), the data acquisition controller 261d transmits a transmission request of the supplementary dye-amount data to the image processing device 10d together with a sample identification number of the sample specified at Step p1 (Step p11), and becomes a standby state until it receives the supplementary dye-amount data.

On the other hand, in the image processing device 10d, the data transmission controller 172d performs control to receive the transmission request of the supplementary dye-amount data transmitted from the image processing terminal 20d (Step q7). Subsequently, the data transmission controller 172d searches the sample information DB 163c based on the sample identification information transmitted together with the transmission request of the supplementary dye-amount data, to acquire the supplementary dye-amount data associated with the sample identification information (Step q9). The data transmission controller 172d then performs control to transmit the acquired supplementary dye-amount data to the image processing terminal 20d that has transmitted the transmission request of the supplementary dye-amount data (Step q11).

In the image processing terminal 20d, upon reception of the supplementary dye-amount data transmitted from the image processing device 10d (YES at Step p13), the data acquisition controller 261d stores the received supplementary dye-amount data in the received dye-amount data 253d in association with the sample identification information thereof (Step p15).

Figure 31:
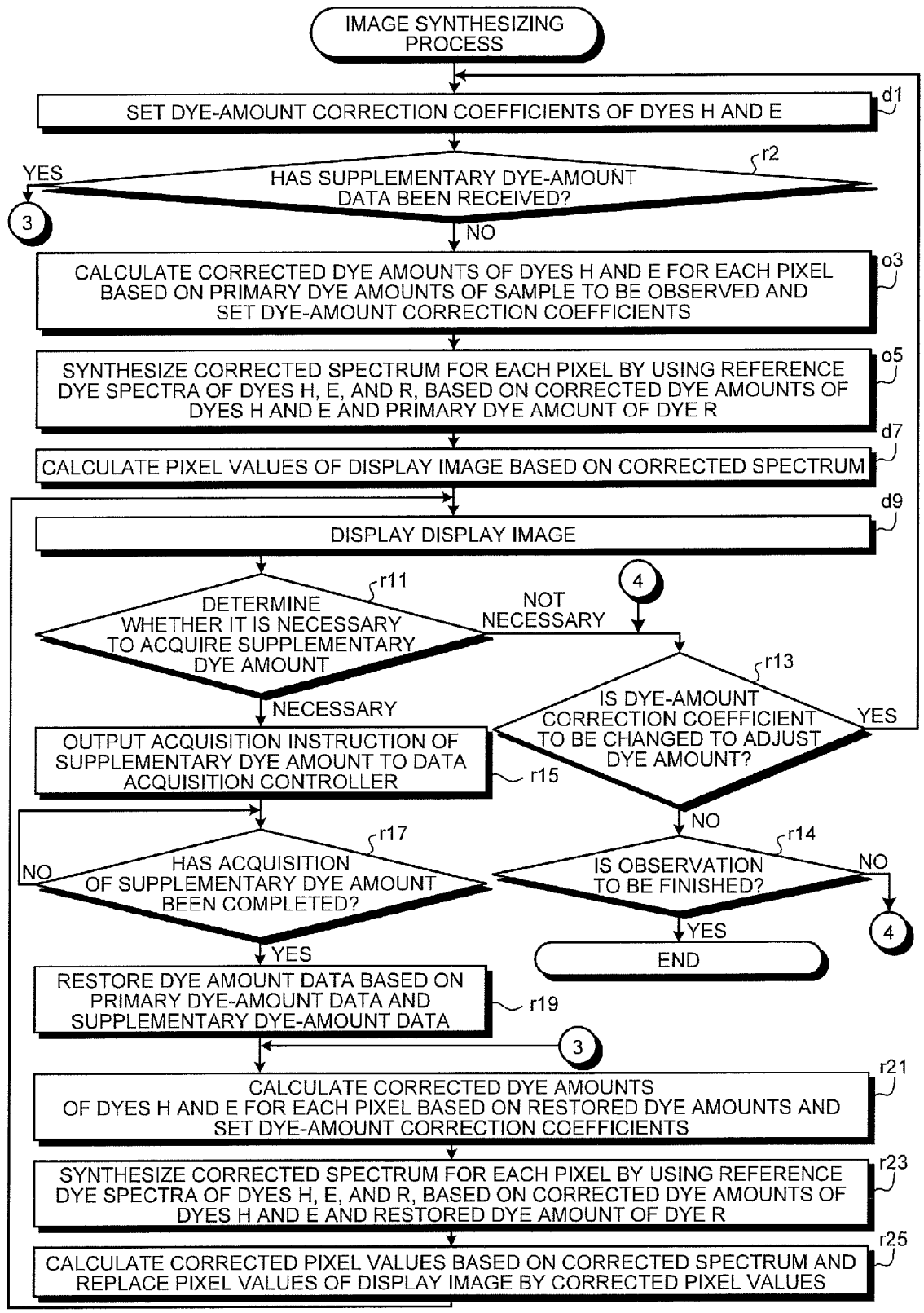
FIG. 31 is a flowchart of an image synthesizing process procedure according to the fourth embodiment.

An image synthesizing process procedure performed by the image processing terminal 20d is explained next. FIG. 31 is a flowchart of the image synthesizing process procedure according to the fourth embodiment. The process explained here is realized by the respective units of the image processing terminal 20d that operate according to the image processing program 252d stored in the storage unit 250d. In FIG. 31, like reference signs refer to like processing steps explained in the third embodiment.

As shown in FIG. 31, at Step d1, the dye-amount correction-coefficient setting unit 262 sets the dye-amount correction coefficients of the dye H and the dye E. Thereafter, the corrected dye-amount calculator 241c refers to the received primary dye-amount data, to determine whether the supplementary dye-amount data has been acquired for the sample to be observed. When the supplementary dye-amount data has been acquired (YES at Step r2), the corrected dye-amount calculator 241c proceeds to Step r21 described later. On the other hand, when the supplementary dye-amount data has not been acquired yet (NO at Step r2), the corrected dye-amount calculator 241c proceeds to Step o3.

At Step d9, after the image display controller 263 displays a display image on the display unit 220, it is determined whether it is necessary to acquire the supplementary dye amounts (Step r11). This determination is performed according to a user operation, for example, by performing control to display a notification screen for requesting to specify whether it is necessary to acquire the supplementary dye amounts on the display unit 220. That is, when a user wishes to observe a sample by a highly accurate display image, the user inputs an acquisition instruction of the supplementary dye amounts via the input unit 210. When it is not necessary to acquire the supplementary dye amounts, control proceeds to Step r13, to change the dye-amount correction coefficients to adjust the dye amounts of respective dyes. When the display image is to be synthesized and displayed again (YES at Step r13), control returns to Step d1. Further, when observation of the sample using the display image is to be finished (YES at Step r14), the process is finished.

When acquisition of the supplementary dye amounts is necessary, control proceeds to Step r15, where the arithmetic unit 240d outputs an acquisition instruction of the supplementary dye amounts to the data acquisition controller 261d in the control unit 260d. As a result of the process at Step r15, the data acquisition controller 261d determines to acquire the supplementary dye amounts at Step p9 in FIG. 30, to proceed to Step p11. In this case, the arithmetic unit 240d becomes a standby state until acquisition of the supplementary dye amounts from the image processing device 10d is completed. That is, when the arithmetic unit 240d receives the supplementary dye-amount data at Step p13 in FIG. 30, and stores the supplementary dye-amount data at Step p15, to complete acquisition of the supplementary dye-amount data (YES at Step r17), control proceeds to Step r19.

That is, at Step r19, the dye-amount-data restoring unit 244d restores the dye amount data based on the primary dye-amount data and the supplementary dye-amount data. Subsequently, the corrected dye-amount calculator 241d calculates corrected dye amounts of the dye H and the dye E by using the dye-amount correction coefficients set at Step d1, based on the restored dye amounts for each pixel (Step r21). The process at Step r21 can be performed after the dye-amount correction coefficients are set again. The corrected spectrum synthesizer 242d then synthesizes a corrected spectrum for each pixel by using the reference dye spectra of respective dyes based on the corrected dye amounts of the dye H and the dye E and the restored dye amount of the dye R (Step r23).

Subsequently, the image synthesizer 243d calculates a corrected pixel value of each pixel of the display image based on the corrected spectrum synthesized for each pixel, and replaces the pixel values calculated at Step d7 by the corrected pixel values to synthesize a display image (Step r25). Thereafter, control proceeds to Step d9, where the image display controller 263 performs control to display a newly synthesized display image on the display unit 220 based on the restored dye amounts.

As explained above, according to the fourth embodiment, identical effects as those of the third embodiment can be achieved, and the supplementary dye amounts can be acquired as required. Therefore, synthesis accuracy of the display image can be improved as compared with a case that only the primary dye amount is acquired similarly to the third embodiment, while suppressing the communication load. It is determined whether it is necessary to acquire the supplementary dye amounts according to a user operation; however, it can be automatically determined whether to acquire the supplementary dye amounts.

Figure 32:
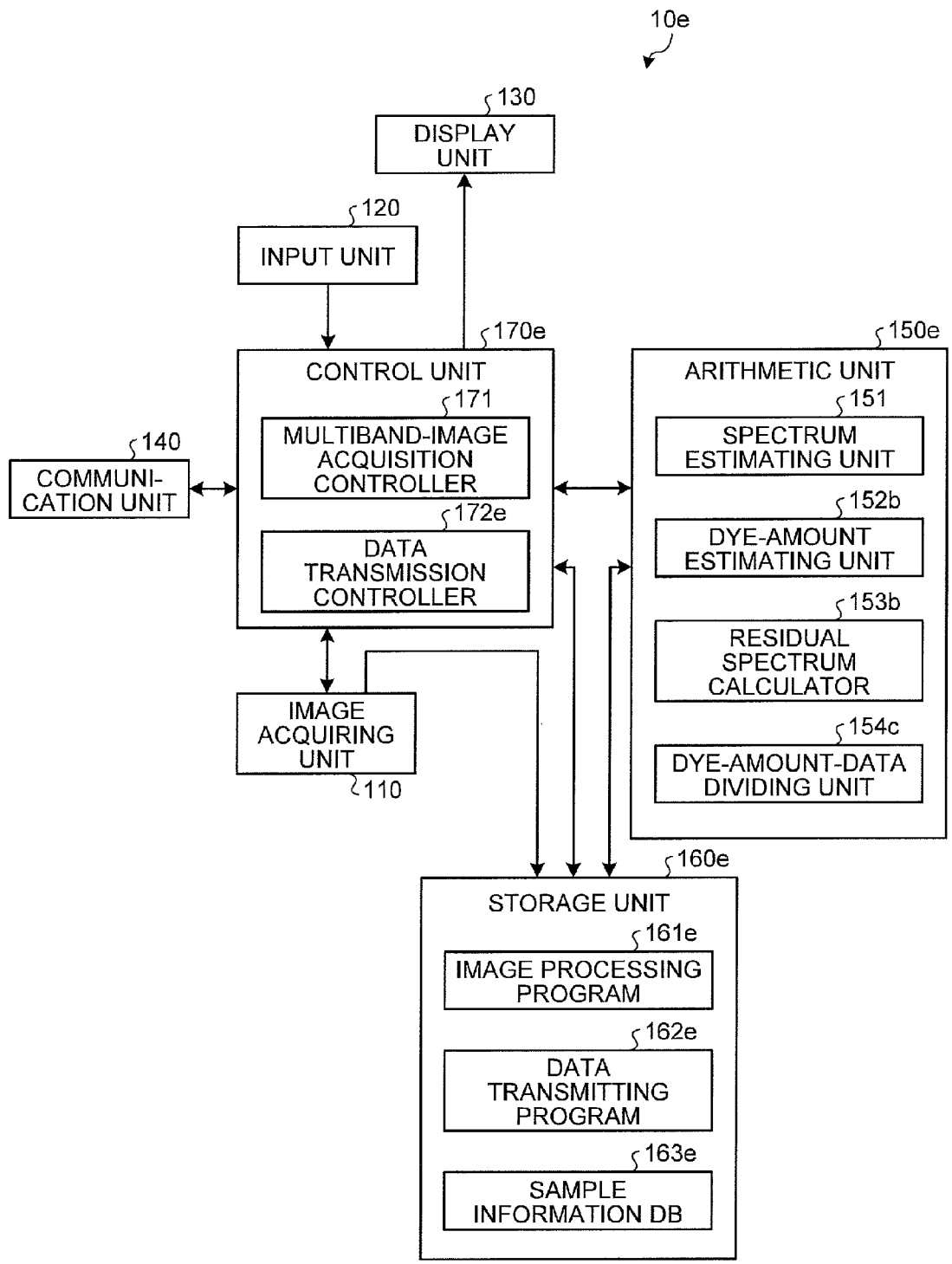
FIG. 32 is a block diagram for explaining a functional configuration of an image processing device according to a fifth embodiment.

A fifth embodiment is explained next. FIG. 32 is a block diagram for explaining a functional configuration of an image processing device 10e according to the fifth embodiment. Like reference letters or numerals refer to like parts explained in the first to fourth embodiments. As shown in FIG. 32, the image processing device 10e includes the image acquiring unit 110, the input unit 120, the display unit 130, the communication unit 140, an arithmetic unit 150e, a storage unit 160e, and a control unit 170e that controls respective units.

The arithmetic unit 150e includes the spectrum estimating unit 151, the dye-amount estimating unit 152b, the residual spectrum calculator 153b, and the dye-amount-data dividing unit 154c.

An image processing program 161e, a data transmitting program 162e, and a sample information DB 163e are stored in the storage unit 160e. The image processing program 161e realizes a process of performing estimation of the dye amounts, a calculation of the residual spectrum, and data division of the dye amount data to register data of the primary dye amounts, the supplementary dye amounts, and the residual spectrum in the sample information DB 163e (a sample-information registering process). The data transmitting program 162e realizes a process of responding to a request from an image processing terminal 20e to transmit primary dye-amount data of the dye amounts upon reception of a transmission request of the primary dye amounts, to transmit supplementary dye-amount data of the dye amounts upon reception of a transmission request of the supplementary dye amounts, or to transmit data of residual spectrum upon reception of a residual-spectrum transmission request (a data transmitting process). Data of the sample is accumulated in the sample information DB 163e in association with the sample identification information, which includes dye amount data including the primary dye-amount data and the supplementary dye-amount data, and the data of residual spectrum.

The control unit 170e includes the multiband-image acquisition controller 171 and a data transmission controller 172e as the dye-amount transmitting unit, the residual-spectrum transmitting unit, and the supplementary floating-point-data portion transmitting unit. The data transmission controller 172e responds to a transmission request of the primary dye-amount data, a transmission request of the supplementary dye amount, or a transmission request of the residual spectrum transmitted from the image processing terminal 20e and performs control to transmit data of the primary dye amounts of the dye amounts, the supplementary dye amounts, or the residual spectrum of the requested sample registered in the sample information DB 163e to the image processing terminal 20e via the communication unit 140.

Figure 33:
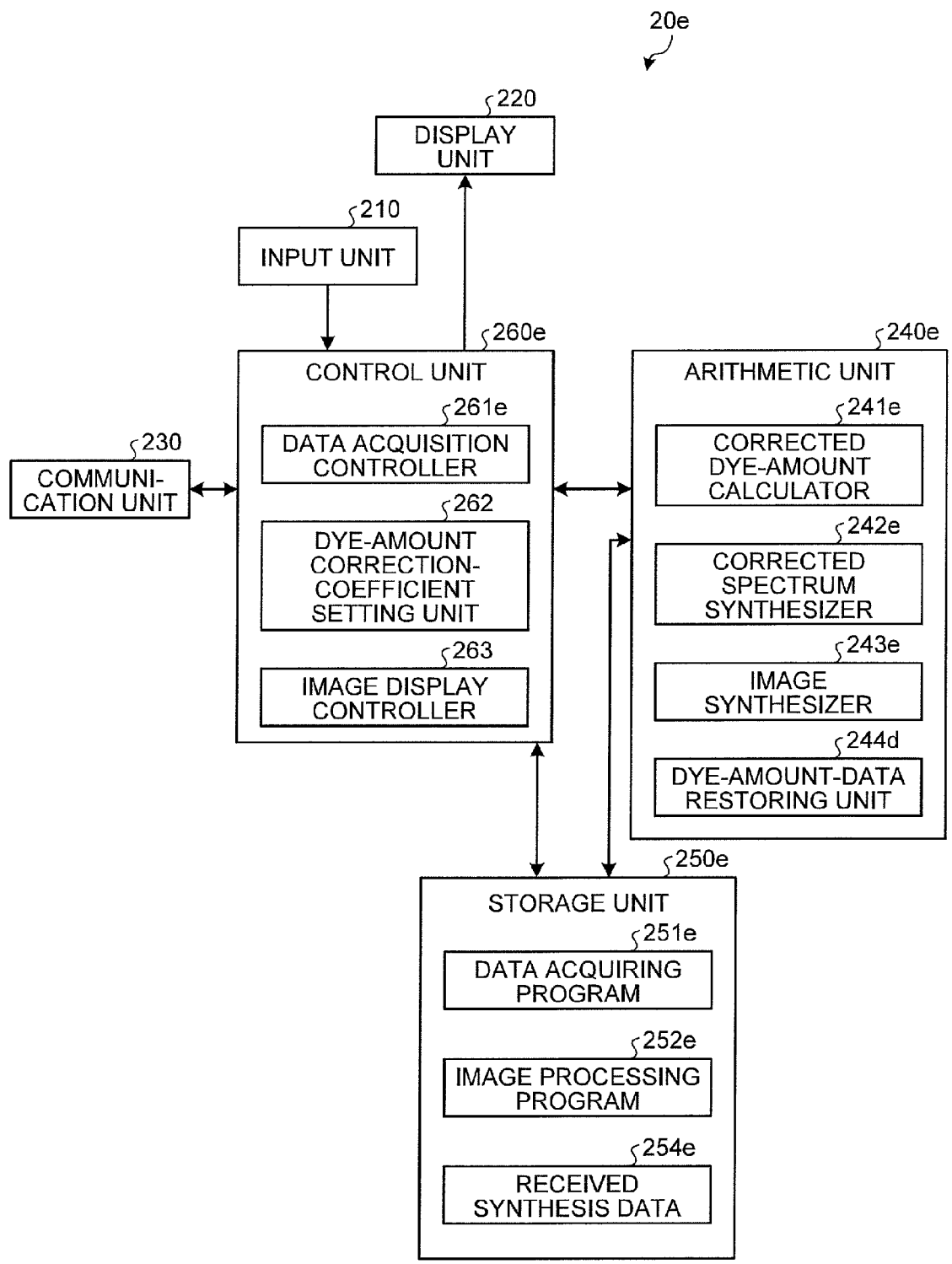
FIG. 33 is a block diagram of an example of a functional configuration of an image processing terminal according to the fifth embodiment.

FIG. 33 is a block diagram of an example of a functional configuration of the image processing terminal 20e according to the fifth embodiment. Like reference letters or numerals refer to like parts explained in the third embodiment. As shown in FIG. 33, the image processing terminal 20e includes the input unit 210, the display unit 220, the communication unit 230, an arithmetic unit 240e, a storage unit 250e, and a control unit 260e that controls respective units.

The arithmetic unit 240e includes a corrected dye-amount calculator 241e, a corrected spectrum synthesizer 242e, an image synthesizer 243e as the pixel-value calculating unit, the first corrected-pixel-value calculating unit, and the second corrected-pixel-value calculating unit, and the dye-amount-data restoring unit 244d as the dye-amount restoring unit. The corrected dye-amount calculator 241e calculates corrected dye amounts by using the dye-amount correction coefficients based on the primary dye amounts or the supplementary dye amounts acquired from the image processing device 10e. The corrected spectrum synthesizer 242e synthesizes a spectral transmittance based on corrected dye amounts of the dye H and the dye E, and the primary dye amount of the dye R, or synthesizes the spectral transmittance based on the corrected dye amounts of the dye H and the dye E, and the restored dye amount of the dye R, to calculate a corrected spectrum. The image synthesizer 243e calculates corrected pixel values (first corrected pixel values), taking the pixel values, the corrected pixel values (second corrected pixel values), or the residual spectrum into consideration, by using the corrected spectrum synthesized by the corrected spectrum synthesizer 242e, to synthesize a display image.

A data acquiring program 251e, an image processing program 252e, and received synthesis data 254e are stored in the storage unit 250e. The data acquiring program 251e realizes a process of transmitting a transmission request of the primary dye-amount data specifying a sample to the image processing device 10e to acquire the primary dye-amount data of the dye amounts, transmitting a transmission request of the supplementary dye-amount data specifying a sample to acquire the supplementary dye-amount data of the dye amounts, or transmitting a transmission request of the residual spectrum specifying a sample to acquire the data of residual spectrum (a data acquiring process). The image processing program 252e realizes a process of synthesizing a display image by calculating pixel values based on the primary dye amounts acquired from the image processing device 10e, and calculating corrected pixel values (second corrected pixel values) based on restored dye amounts restored based on the supplementary dye amounts acquired from the image processing device 10e at another timing, or calculating corrected pixel values (second corrected pixel values) by using the residual spectrum acquired from the image processing device 10e at another timing, thereby synthesizing a display image by replacing the pixel values by the corrected pixel values (an image synthesizing process). The primary dye-amount data acquired from the image processing device 10e, the supplementary dye-amount data acquired from the image processing device 10e at another timing, and the data of residual spectrum acquired from the image processing device 10e at another timing are set in received synthesis data 253e in association with the sample identification information thereof.

The control unit 260e includes a data acquisition controller 261e as the floating-point-data portion receiving unit and the supplementary floating-point-data portion receiving unit, the dye-amount correction-coefficient setting unit 262 as the correction-coefficient setting unit, and the image display controller 263. The data acquisition controller 261e performs control to transmit a transmission request of the primary dye amounts, a transmission request of the supplementary dye amounts, or a transmission request of the residual spectrum specifying a sample to the image processing device 10e via the communication unit 230 to acquire data of the primary dye amounts, the supplementary dye amounts, or the residual spectrum.

Figure 34:
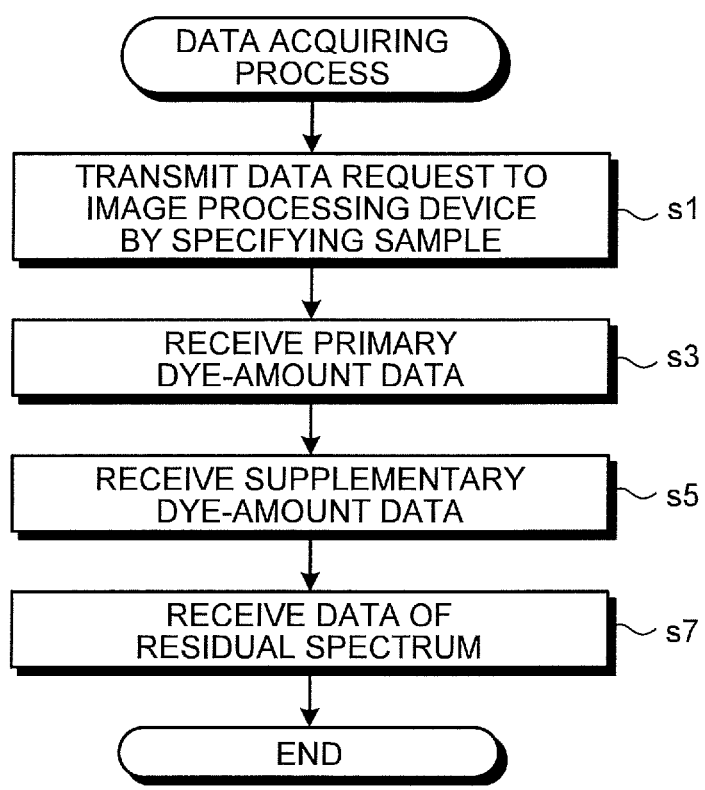
FIG. 34 depicts a data transmitting process procedure performed by the image processing device according to the fifth embodiment.
Figure 35:
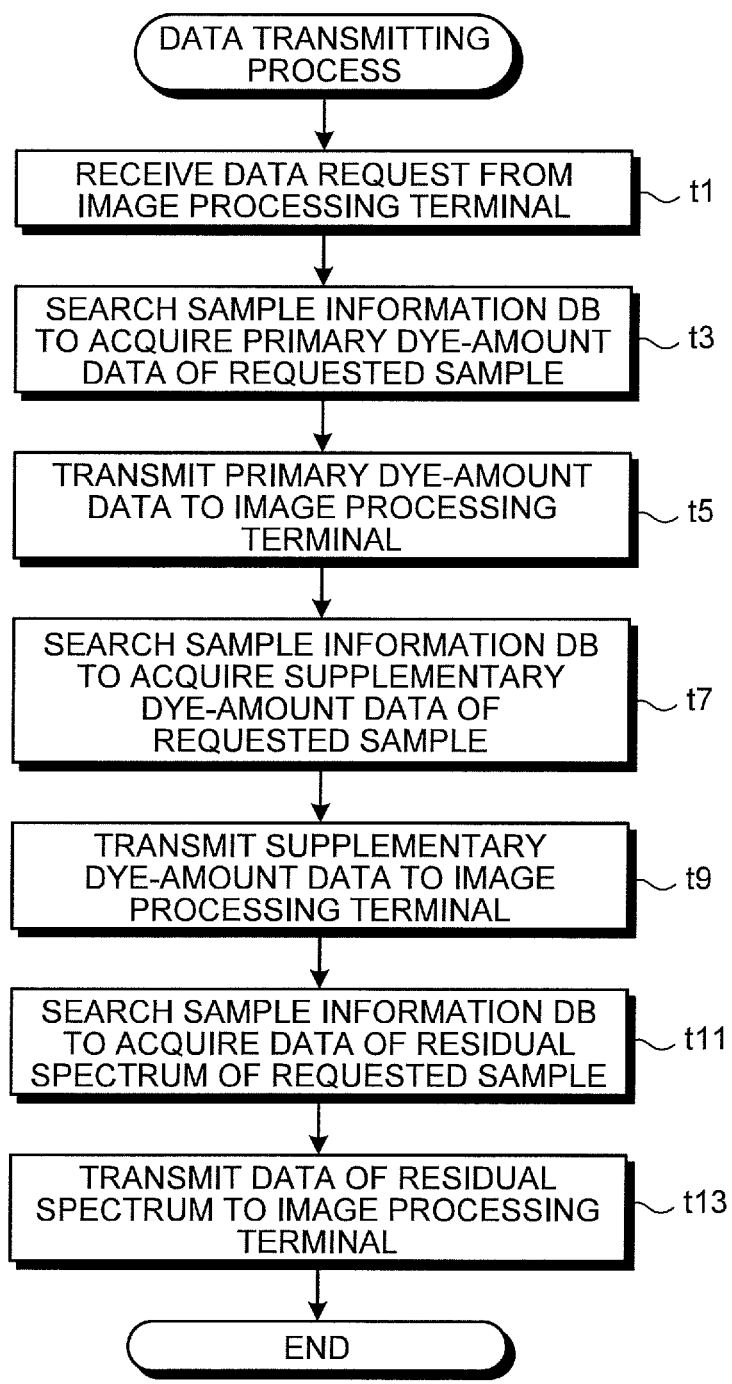
FIG. 35 is a flowchart of a data acquiring process procedure performed by the image processing terminal according to the fifth embodiment.

Process procedures performed by the image processing device 10e and the image processing terminal 20e are explained next. Process procedures of the image processing device 10e and the image processing terminal 20e at the time of transmitting and receiving the synthesis data between the image processing device 10e and the image processing terminal 20e are explained first. FIG. 34 depicts a data transmitting process procedure performed by the image processing device 10e according to the fifth embodiment, and FIG. 35 is a flowchart of a data acquiring process procedure performed by the image processing terminal 20e according to the fifth embodiment. The processes explained here are realized by the respective units of the image processing device 10e that operate according to the data transmitting program 162e stored in the storage unit 160e and by the respective units of the image processing terminal 20e that operate according to the data acquiring program 251e stored in the storage unit 250e.

As shown in FIG. 34, in the image processing terminal 20e, when a data acquiring process is started, the data acquisition controller 261e performs control to transmit any one of a transmission request of the primary dye-amount data, a transmission request of the supplementary dye-amount data, and a transmission request of the residual spectrum to the image processing device 10e together with the sample identification information of a sample at a predetermined timing (Step s1). For example, similarly to the first embodiment, the data acquisition controller 261e performs control to display a specification-request notification screen for a sample whose dye amounts are to be acquired on the display unit 220, and performs control to transmit the transmission request of the primary dye-amount data to the image processing device 10e together with the sample identification information of the specified sample, according to a response to a specification request notification. Alternatively, similarly to the second embodiment, the data acquisition controller 261e performs control to determine whether it is necessary to acquire the supplementary dye amounts or the residual spectrum according to a user operation, and appropriately transmit a transmission request of the supplementary dye-amount data or a transmission request of the residual spectrum to the image processing device 10e at a timing when it is determined to acquire the supplementary dye amounts or the residual spectrum.

The data acquisition controller 261e then receives the data of the primary dye amounts transmitted from the image processing device 10e (Step s3), the data of the supplementary dye amounts transmitted from the image processing device 10e (Step s5), and the data of the residual spectrum transmitted from the image processing device 10e (Step s7).

On the other hand, as shown in FIG. 35, in the data transmitting process performed by the image processing device 10e, the data transmission controller 172e receives the transmission request transmitted from the image processing terminal 20e (Step t1). Subsequently, when the data request is a transmission request of the primary dye-amount data, the data transmission controller 172e searches the sample information DB 163e based on the sample identification information to acquire the primary dye-amount data associated with the sample identification information (Step t3). The data transmission controller 172e then performs control to transmit the acquired primary dye-amount data to the image processing terminal 20e that has transmitted the transmission request (Step t5). Further, when the data request is a transmission request of the supplementary dye-amount data, the data transmission controller 172e searches the sample information DB 163e based on the sample identification information to acquire the supplementary dye-amount data associated with the sample identification information (Step t7). The data transmission controller 172e then performs control to transmit the acquired supplementary dye-amount data to the image processing terminal 20e that has transmitted the transmission request (Step t9). Further, when the data request is a transmission request of the residual spectrum, the data transmission controller 172e searches the sample information DB 163e based on the sample identification information to acquire the data of residual spectrum associated with the sample identification information (Step t11). The data transmission controller 172e then performs control to transmit the acquired data of residual spectrum to the image processing terminal 20e that has transmitted the transmission request (Step t13).

Figure 36:
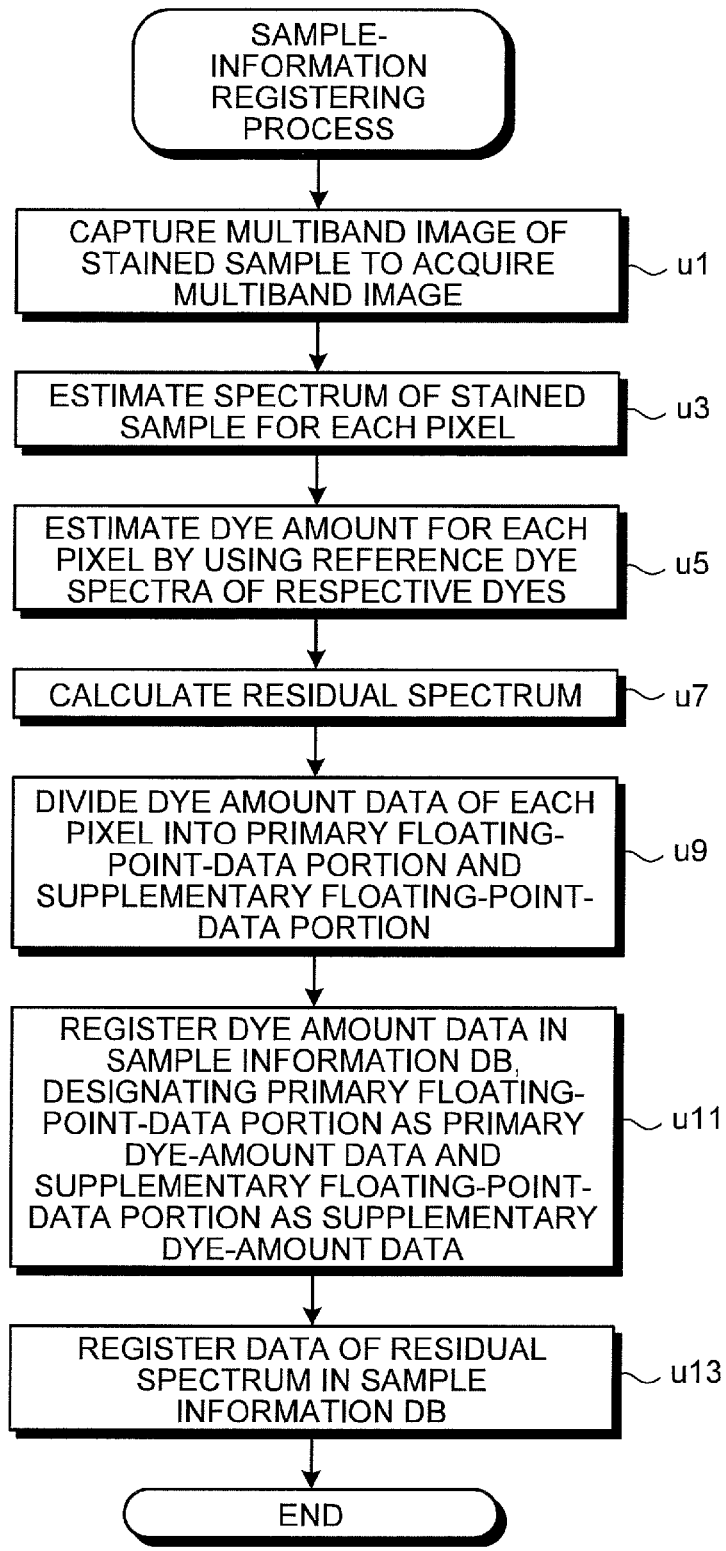
FIG. 36 is a flowchart of a sample-information registering process procedure according to the fifth embodiment.

A sample-information registering process procedure performed by the image processing device 10e is explained next. FIG. 36 is a flowchart of the sample-information registering process procedure according to the fifth embodiment. The process explained here is realized by the respective units of the image processing device 10e that operate according to the image processing program 161e stored in the storage unit 160e.

As shown in FIG. 36, in the sample-information registering process, the multiband-image acquisition controller 171 first captures a multiband image of a stained sample as a dye-amount estimation target by controlling the operation of the image acquiring unit 110, thereby acquiring a stained sample image (Step u1). Subsequently, the spectrum estimating unit 151 estimates a spectrum (estimated spectrum) of the stained sample for each pixel based on the pixel value of the acquired stained sample image (Step u3). Subsequently, the dye-amount estimating unit 152b estimates dye amounts of the stained sample for each pixel by using reference dye spectra of the dye H, the dye E, and the dye R based on the estimated spectrum (Step u5).

Subsequently, the residual spectrum calculator 153b calculates a residual spectrum based on an estimated spectral absorbance obtained from the estimated spectrum and a restored spectral transmittance restored from the estimated dye amounts (Step u7). The dye-amount-data dividing unit 154c then divides the estimated dye amount data for each pixel into a primary floating-point-data portion and a supplementary floating-point-data portion (Step u9). The arithmetic unit 150e registers the dye amount data in the sample information DB 163e, designating the divided primary floating-point-data portion of the dye amounts of each pixel as primary dye-amount data and the supplementary floating-point-data portion as supplementary dye-amount data (Step u11). The arithmetic unit 150e registers the calculated data of residual spectrum in the sample information DB 163e (Step u13).

Figure 37:
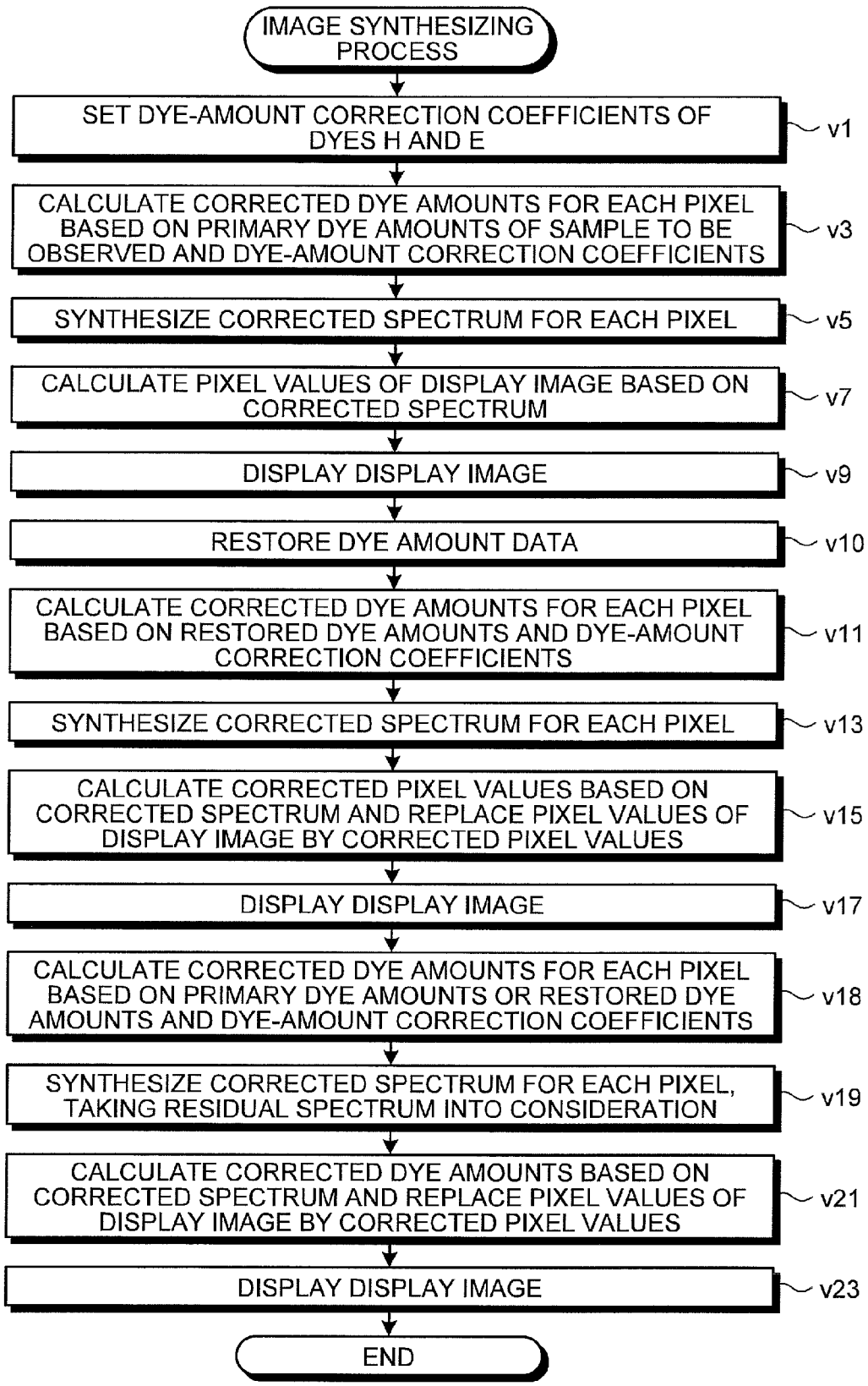
FIG. 37 is a flowchart of an image synthesizing process procedure according to the fifth embodiment.
Figure 38:
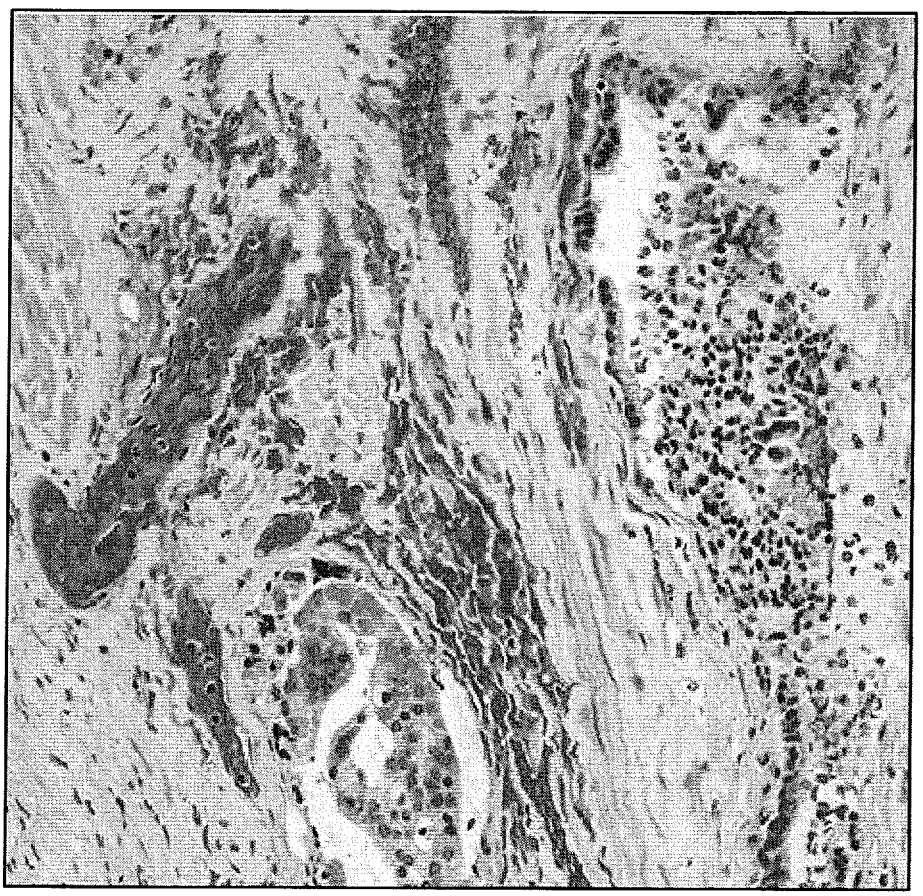
FIG. 38 is an example of a display image.

An image synthesizing process procedure performed by the image processing terminal 20e is explained next. FIG. 37 is a flowchart of the image synthesizing process procedure according to the fifth embodiment. The process explained here is realized by the respective units of the image processing terminal 20e that operate according to the image processing program 252e stored in the storage unit 250e.

First, as shown in FIG. 37, the dye-amount correction-coefficient setting unit 262 sets the dye-amount correction coefficients of the dye H and the dye E, for example, according to a user operation (Step v1). Subsequently, the corrected dye-amount calculator 241e calculates corrected dye amounts of the dye H and the dye E based on the primary dye amounts of the dye H and the dye E of the sample to be observed, which is acquired from the image processing device 10e and stored in the received synthesis data 254e, and the set dye-amount correction coefficients (Step v3). The corrected spectrum synthesizer 242e synthesizes a corrected spectrum for each pixel by using the reference dye spectra of respective dyes based on the corrected dye amounts of the dye H and the dye E and the primary dye amount of the dye R (Step v5). The image synthesizer 243e then calculates pixel values of respective pixels in a display unit based on the corrected spectrum synthesized for each pixel, to synthesize a display image (Step v7). The image display controller 263 then performs control to display the synthesized display image on the display unit 220 (Step v9).

A dye-amount-data restoring unit 244e restores the dye amount data from the data of the primary dye amounts and the data of the supplementary dye amounts stored in the received synthesis data 254e (Step V10). Subsequently, the corrected dye-amount calculator 241e calculates corrected dye amounts of the dye H and the dye E for each pixel by using the dye-amount correction coefficients set at Step v1, based on the restored dye amounts (Step v11). The corrected spectrum synthesizer 242e synthesizes a corrected spectrum for each pixel by using the reference dye spectra of respective dyes, based on the corrected dye amounts of the dye H and the dye E and the restored dye amount of the dye R (Step v13). The image synthesizer 243e then calculates corrected pixel values of respective pixels in the display image based on the corrected spectrum, to synthesize a display image by replacing the pixel values calculated at Step v7 by the corrected pixel values (Step v15). The image display controller 263 performs control to display the newly synthesized display image on the display unit 220 based on the restored dye amounts (Step v17).

When primary dye amounts or the supplementary dye amounts of the dye H and the dye E of the sample to be observed stored in the received synthesis data 254e have been received, and the dye amounts have been already restored, the corrected spectrum synthesizer 242e uses the dye-amount correction coefficients set at Step v1 to calculate corrected dye amounts of the dye H and the dye E for each pixel based on the restored dye amounts of the dye H and the dye E (Step v18). The corrected spectrum synthesizer 242e then synthesizes a corrected spectrum for each pixel by using the reference dye spectra of respective dyes, based on the corrected dye amounts of the dye H and the dye E, the primary dye amount or the restored dye amount of the dye R, and the residual spectrum (Step v19). Subsequently, the image synthesizer 243e calculates corrected pixel values of respective pixels in the display image based on the corrected spectrum, to synthesize a display image by replacing the pixel values calculated at Step v7 by the corrected pixel values (Step v21). The image display controller 263 then performs control to display the newly synthesized display image on the display unit 220, taking the residual spectrum into consideration (Step v23).

As explained above, the fifth embodiment can achieve identical effects as those of the first to fourth embodiments and the modification example.

In the image processing systems according to the respective embodiments and the modification example, a case that the image processing device transmits the dye amounts of each pixel estimated for a sample requested from the image processing terminal to the image processing terminal for all pixels has been explained. However, only dye amounts of a part of pixels can be transmitted. For example, one or plural dyes is predetermined as a decision criterion, and a pixel value of a pixel in which a converted value secondarily calculated from dye amounts of the pixel is larger than a predetermined threshold set in advance can be set as a transmission target. Specifically, a maximum value, a mean value, and a variance value of the dye amount of the dye as the decision criterion of each pixel are calculated as converted values, and subjected to threshold processing. Alternatively, a reference dye amount is predetermined, and a ratio between the converted value of the dye amount of each pixel and a converted value of the reference dye amount is calculated. As the converted value, for example, a maxim value of the dye amounts of respective pixels constituting the dye amounts, a total value or a mean value of the dye amounts of respective dyes, or a variance of the dye amounts of respective dyes can be used. Further, as for the reference dye amount, for example, dye amounts of respective dyes are respectively set as "0", and a pixel value of a pixel in which the calculated ratio is larger than a predetermined threshold can be transmitted.

In the embodiments described above, a case that a spectrum characteristic value of a spectral transmittance is estimated based on a multiband image obtained by imaging a stained sample has been explained. However, the present invention is also similarly applicable to a case that a spectrum characteristic value of a spectral reflectance or absorbance is estimated as a spectral characteristic value.

According to the present invention, dye amounts of a stained sample are estimated in the image processing device, and dye amount data can be transmitted to the image processing terminal via a network as data to be used for synthesizing and displaying a display image of the stained sample. On the other hand, in the image processing terminal, a display image of a stained sample can be synthesized and displayed based on dye amounts acquired from the image processing device, and the dye amounts can be corrected by using predetermined dye-amount correction coefficients. Accordingly, transmission and reception of data to be used for synthesizing and displaying the display image of the stained sample can be efficiently performed without increasing the communication load.

The above and other features, advantages and technical and industrial significance of this invention will be better understood by reading the following detailed description of presently preferred embodiments of the invention, when considered in connection with the accompanying drawings.

What is claimed is:

1. An image processing system in which an image processing device and an image processing terminal are connected to each other via a network, wherein:
   the image processing device comprises:
   a dye-amount estimating unit that estimates a dye amount of a stained sample stained with a predetermined dye based on a stained sample image obtained by capturing a multiband image of the stained sample, for each pixel of the stained sample image;
   a dye-amount transmitting unit that transmits the estimated dye amount of the stained sample to the image processing terminal;
   a spectrum estimating unit that estimates a spectrum at a position on the stained sample corresponding to each pixel of the stained sample image based on the stained sample image;
   a residual-spectrum calculating unit that calculates a residual spectrum based on a spectrum estimated by the spectrum estimating unit and a spectrum to be restored based on the estimated dye amount of the stained sample; and
   a residual-spectrum transmitting unit that transmits the residual spectrum to the image processing terminal;
   the image processing terminal comprises:
   a dye-amount receiving unit that receives a dye amount of the stained sample transmitted from the image processing device;
   a pixel-value calculating unit that calculates a pixel value of a display image of the stained sample by using a predetermined dye-amount correction coefficient based on the received dye amount of the stained sample;
   a residual-spectrum receiving unit that receives the residual spectrum transmitted from the image processing device;
   a first corrected-pixel-value calculating unit that calculates a first corrected pixel value for correcting the pixel value by using the dye-amount correction coefficient, based on the received dye amount of the stained sample and the residual spectrum; and
   an image display unit that displays a display image of the stained sample based on the first corrected pixel value of the display image of the stained sample.

2. The image processing system according to claim 1, wherein the pixel-value calculating unit replaces a pixel value of a display image of the stained sample by the first corrected pixel value.

3. The image processing system according to claim 1, wherein the spectrum indicates a spectrum characteristic value of any one of spectral transmittance, spectral reflectivity, or spectral absorbance.

4. The image processing system according to claim 1, wherein
   the image processing device comprises a dye-amount-data dividing unit that handles the estimated dye amount of the stained sample as floating-point type data, and respectively divides an exponent part and a significand part thereof into high-order bits and low-order bits with a predetermined allocation, thereby dividing the dye amount into a primary floating-point-data portion including the low-order bits of the divided exponent part and the high-order bits of the divided significand part, and a supplementary floating-point-data portion including a sign bit, the high-order bits of the divided exponent part, and the low-order bits of the divided significand part;

the dye-amount transmitting unit of the image processing device transmits the divided primary floating-point-data portion of the dye amount to the image processing terminal;

the dye-amount receiving unit of the image processing terminal receives the primary floating-point-data portion of the dye amount transmitted from the image processing device; and the pixel-value calculating unit of the image processing terminal calculates a pixel value of a display image of the stained sample by using a predetermined dye-amount correction coefficient, based on the received primary floating-point-data portion of the dye amount.

5. The image processing system according to claim 4, wherein:

the image processing device comprises a supplementary floating-point-data portion transmitting unit that transmits the divided supplementary floating-point-data portion of the dye amount to the image processing terminal;

the image processing terminal comprises:

a supplementary floating-point-data portion receiving unit that receives the supplementary floating-point-data portion of the dye amount transmitted from the image processing device; and a dye-amount restoring unit that restores a dye amount of the stained sample based on the primary floating-point-data portion of the dye amount and the supplementary floating-point-data portion of the dye amount;

the pixel-value calculating unit comprises a second corrected-pixel-value calculating unit that calculates a second corrected pixel value of a display image of the stained sample by using the predetermined dye-amount correction coefficient, based on the restored dye amount; and the pixel-value calculating unit replaces a pixel value of a display image of the stained sample by the second corrected pixel value.

6. The image processing system according to claim 1, comprising a corrected-spectrum synthesizing unit that synthesizes a corrected spectrum at a sample point on the stained sample corresponding to each pixel of the stained sample image based on the received dye amount of the stained sample, the predetermined dye-amount correction coefficient, and a dye spectrum of the dye, wherein the pixel-value calculating unit calculates a pixel value of a display image of the stained sample based on the corrected spectrum.

7. The image processing system according to claim 6, wherein synthesis of the corrected spectrum by the corrected-spectrum synthesizing unit is performed by using the Lambert-Beer law.

8. The image processing system according to claim 6, wherein:

the image processing device comprises a dye-spectrum transmitting unit that transmits a dye spectrum of the dye used for synthesis of the corrected spectrum to the image processing terminal; and the image processing terminal comprises a dye-spectrum receiving unit that receives a dye spectrum of the dye transmitted from the image processing device.

9. The image processing system according to claim 1, wherein:

the image processing terminal comprises a storage unit that stores a correspondence relation in which a dye amount of the dye and a pixel value in the dye amount of the dye are associated with each other; and the pixel-value calculating unit reads a pixel value corresponding to the received dye amount of the stained sample based on a correspondence relation stored in the storage unit and sets the pixel value as a pixel value of a display image of the stained sample.

10. The image processing system according to claim 1, wherein the image processing terminal comprises a corrected-coefficient setting unit that sets the dye-amount correction coefficient; and the pixel-value calculating unit calculates a pixel value of a display image of the stained sample by using the set dye-amount correction coefficient.

11. The image processing system according to claim 1, wherein the dye-amount transmitting unit transmits dye amounts of all pixels estimated by the dye-amount estimating unit to the image processing terminal.

12. The image processing system according to claim 1, wherein the dye-amount transmitting unit transmits a dye amount of a predetermined pixel, among dye amounts of each pixel estimated by the dye-amount estimating unit, to the image processing terminal.

13. An image processing device in an image processing system in which the image processing device and an image processing terminal are connected to each other, the image processing device comprising:

a dye-amount estimating unit that estimates a dye amount of a stained sample stained with a predetermined dye based on a stained sample image obtained by capturing a multiband image of the stained sample, for each pixel of the stained sample image;

a dye-amount transmitting unit that transmits the estimated dye amount of the stained sample to the image processing terminal;

a spectrum estimating unit that estimates a spectrum at a position on the stained sample corresponding to each pixel of the stained sample image based on the stained sample image;

a residual-spectrum calculating unit that calculates a residual spectrum based on a spectrum estimated by the spectrum estimating unit and a spectrum to be restored based on the estimated dye amount of the stained sample; and a residual-spectrum transmitting unit that transmits the residual spectrum to the image processing terminal.

14. An image processing terminal in an image processing system in which an image processing device and the image processing terminal are connected to each other, the image processing terminal comprising:

a dye-amount receiving unit that receives a dye amount of the stained sample transmitted from the image processing device;

a pixel-value calculating unit that calculates a pixel value of a display image of the stained sample by using a predetermined dye-amount correction coefficient based on the received dye amount of the stained sample;

a residual-spectrum receiving unit that receives the residual spectrum transmitted from the image processing device;

a first corrected-pixel-value calculating unit that calculates a first corrected pixel value for correcting the pixel value by using the dye-amount correction coefficient, based on the received dye amount of the stained sample and the residual spectrum; and an image display unit that displays a display image of the stained sample based on the first corrected pixel value of the display image of the stained sample.

* * * * *